United States Patent
Connelly et al.

(10) Patent No.: US 12,395,693 B2
(45) Date of Patent: Aug. 19, 2025

(54) REMOVAL OF A MOBILE DEVICE FROM A LOCAL SERVICE DOMAIN

(71) Applicant: Comcast Cable Communications, LLC, Philadelphia, PA (US)

(72) Inventors: Michael Connelly, Philadelphia, PA (US); Hari Venkatram Pedaprolu, King of Prussia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 149 days.

(21) Appl. No.: 17/873,587

(22) Filed: Jul. 26, 2022

(65) Prior Publication Data

US 2022/0360846 A1    Nov. 10, 2022

Related U.S. Application Data

(63) Continuation of application No. 16/985,770, filed on Aug. 5, 2020, now Pat. No. 11,418,836, which is a
(Continued)

(51) Int. Cl.
*H04N 21/436*    (2011.01)
*H04N 21/41*    (2011.01)
(Continued)

(52) U.S. Cl.
CPC . *H04N 21/43615* (2013.01); *H04N 21/41265* (2020.08); *H04N 21/433* (2013.01);
(Continued)

(58) Field of Classification Search
CPC ......... H04L 67/56; H04L 45/02; H04L 63/10; H04L 61/4511; H04L 63/101; H04L 63/1408; H04L 61/255; H04L 65/1043; H04L 12/2898; H04L 49/351; H04L 65/1073; H04W 84/18; H04W 84/12; H04W 88/16; H04W 4/70;
(Continued)

(56) References Cited

U.S. PATENT DOCUMENTS 4,395,596 A    7/1983 Eitman et al.
4,817,132 A    3/1989 Chamberlin et al.
(Continued)

FOREIGN PATENT DOCUMENTS

WO    2000004709 A1    1/2000

OTHER PUBLICATIONS

Extended European Search Report—EP11152571.3—Mailing date: Feb. 6, 2013.
(Continued)

*Primary Examiner* — Quoc Thai N Vu
(74) *Attorney, Agent, or Firm* — Banner & Witcoff, Ltd.

(57) ABSTRACT

A mobile device configurable for direct communication in a wide area wireless network may join a local service domain and receive services through a gateway of that local service domain. The mobile device may be removed from the local service domain if the mobile device has been inactive for a threshold time period, the gateway device receives data indicating that the mobile device has been added to a different service domain, or a reply for a polling message sent to the mobile device has not been received.

20 Claims, 55 Drawing Sheets

Related U.S. Application Data continuation of application No. 16/565,797, filed on Sep. 10, 2019, now Pat. No. 10,771,841, which is a continuation of application No. 12/706,365, filed on Feb. 16, 2010, now Pat. No. 10,455,275.

(51) Int. Cl.
*H04N 21/433* (2011.01)
*H04N 21/4363* (2011.01)
*H04N 21/475* (2011.01)
*H04N 21/488* (2011.01)
*H04N 21/414* (2011.01)

(52) U.S. Cl.
CPC ... *H04N 21/43637* (2013.01); *H04N 21/4755* (2013.01); *H04N 21/4882* (2013.01); *H04N 21/41407* (2013.01)

(58) Field of Classification Search
CPC ....... H04N 21/43615; H04N 21/41265; H04N 21/433; H04N 21/43637; H04N 21/4755; H04N 21/4882; H04N 21/41407
See application file for complete search history.

(56) References Cited

U.S. PATENT DOCUMENTS

| | | | |
|---|---|---|---|
| 5,570,366 A * | 10/1996 | Baker | H04J 3/02 370/312 |
| 6,285,407 B1 | 9/2001 | Yasuki et al. | |
| 6,956,942 B2 | 10/2005 | McKinzie et al. | |
| 7,337,448 B1 | 2/2008 | Dalia et al. | |
| 7,450,701 B2 | 11/2008 | Crockett et al. | |
| 8,453,185 B2 | 5/2013 | Bonfrer | |
| 8,634,703 B1 | 1/2014 | Barton | |
| 2002/0196761 A1 * | 12/2002 | Kaneko | H04W 8/26 709/209 |
| 2003/0036395 A1 | 2/2003 | Proidl | |
| 2003/0194096 A1 | 10/2003 | Kennedy et al. | |
| 2003/0198323 A1 | 10/2003 | Watanabe | |
| 2004/0152493 A1 | 8/2004 | Phillips et al. | |
| 2005/0043011 A1 * | 2/2005 | Murray | H04W 68/00 455/403 |
| 2005/0160466 A1 | 7/2005 | Cho et al. | |
| 2005/0259641 A1 | 11/2005 | Beninato et al. | |
| 2006/0010477 A1 | 1/2006 | Yu | |
| 2006/0053454 A1 | 3/2006 | Chang | |
| 2007/0109990 A1 * | 5/2007 | Bennett | H04L 12/2898 370/465 |
| 2007/0165858 A1 * | 7/2007 | Bakshi | H04L 9/0844 380/247 |
| 2007/0212017 A1 | 9/2007 | Ben-Romdhane et al. | |
| 2007/0232262 A1 | 10/2007 | Uematsu et al. | |
| 2008/0096517 A1 | 4/2008 | Appleyard et al. | |
| 2008/0108328 A1 | 5/2008 | Lovell | |
| 2008/0224988 A1 | 9/2008 | Whang | |
| 2008/0235733 A1 | 9/2008 | Heie et al. | |
| 2008/0261514 A1 | 10/2008 | Pratt et al. | |
| 2009/0046987 A1 | 2/2009 | White et al. | |
| 2009/0150925 A1 | 6/2009 | Henderson | |
| 2009/0168766 A1 * | 7/2009 | Eyuboglu | H04L 65/1095 370/353 |
| 2009/0199287 A1 | 8/2009 | Vantalon et al. | |
| 2009/0220216 A1 | 9/2009 | Marsh et al. | |
| 2009/0298475 A1 * | 12/2009 | Czaja | H04W 48/04 455/412.2 |
| 2010/0058394 A1 | 3/2010 | Goergen et al. | |
| 2010/0071007 A1 | 3/2010 | Meijer | |
| 2010/0095332 A1 | 4/2010 | Gran et al. | |
| 2010/0144327 A1 | 6/2010 | Karnalkar et al. | |

OTHER PUBLICATIONS

Web page downloaded from <http://en.wikipedia.org/wiki/Public_address> on Jul. 29, 2009.
Web page downloaded from <http://www.reference.com/browse/wiki/Public_address_system> on Jul. 29, 2009.
Web page downloaded from <http://www.icall.com/iphone/> on Nov. 3, 2009.
European Office Action—EP App. 11152571.3—mailed Jul. 3, 2015.
Response to European Office Action—EP Appl. 11152571.3—submitted Oct. 30, 2015.
Nov. 30, 2016—(CA) Office Action—App 2730482.
Nov. 8, 2017—Canadian Office Action—CA 2730482.
Jun. 29, 2020—Canadian Office Action6—CA 2,730,482.
Jun. 2, 2021—Canadian Office Action—CA 2,730,482.
Jun. 23, 2022—CA Office Action—CA App. No. 2,730,482.
Feb. 16, 2024—Canadian Office Action—CA App. No. 2,730,482.

* cited by examiner

| Name 201 | Cred. 202 | Identities 203 | Device IDs 204 | Dev. priority 205 | Indicators 206 | Appl./Service 207 | CPE gw 208 | Account 209 | Pri./non-pri. 210 |
|---|---|---|---|---|---|---|---|---|---|
| User A | UID<br>PW | Email ID 1<br>Email ID 2<br>TN1<br>TN2<br>IM ID1<br>Web site url | Device 101<br>Device 102<br>Device 103<br>Device 104 | Priority 0<br>Priority 1<br>Priority 2<br>Priority 3 | Visual indicator 1<br>Ringtone 1 | personalized TN<br>SMS<br>email<br>weather<br>news<br>horoscope | <MAC addr><br><IP addr> | <acct. no.> | Primary |

FIG. 2

| Sesion ID | CPE gateway | Default TN | Login status | User ID |
|---|---|---|---|---|
| NCS ID 1 | TN1 | Yes | Yes | User A |
| NCS ID 2 | TN2 | No | Yes | User B |
| NCS ID 3 | TN3 | No | No | User C |

| ┌2101 | ┌2102 | ┌2103 | ┌2104 | ┌2105 | ┌2106 | ┌2107 | ┌2108 |
|---|---|---|---|---|---|---|---|
| Acct. No. | NCS ID | TN | Default TN | Nickname | User name | GUID | Login status |
| 10000 | aaln0/... | TN1 | Yes | Mike | Mike12345 | <guid x> | Yes |
| 10000 | aaln1/... | TN2 | No | Jack | Jack678910 | <guid y> | No |

FIG. 21

| Private User Identity | Public User Indentity | TN | Preferences |
|---|---|---|---|
| User1@comcast.net | Primaryuser1@comcast.net | xxx-xxx-xxxx | Xxx |
| User2@comcast.net | Primaryuser2@comcast.net | yyy-yyy-yyyy | Yyy |

FIG. 22

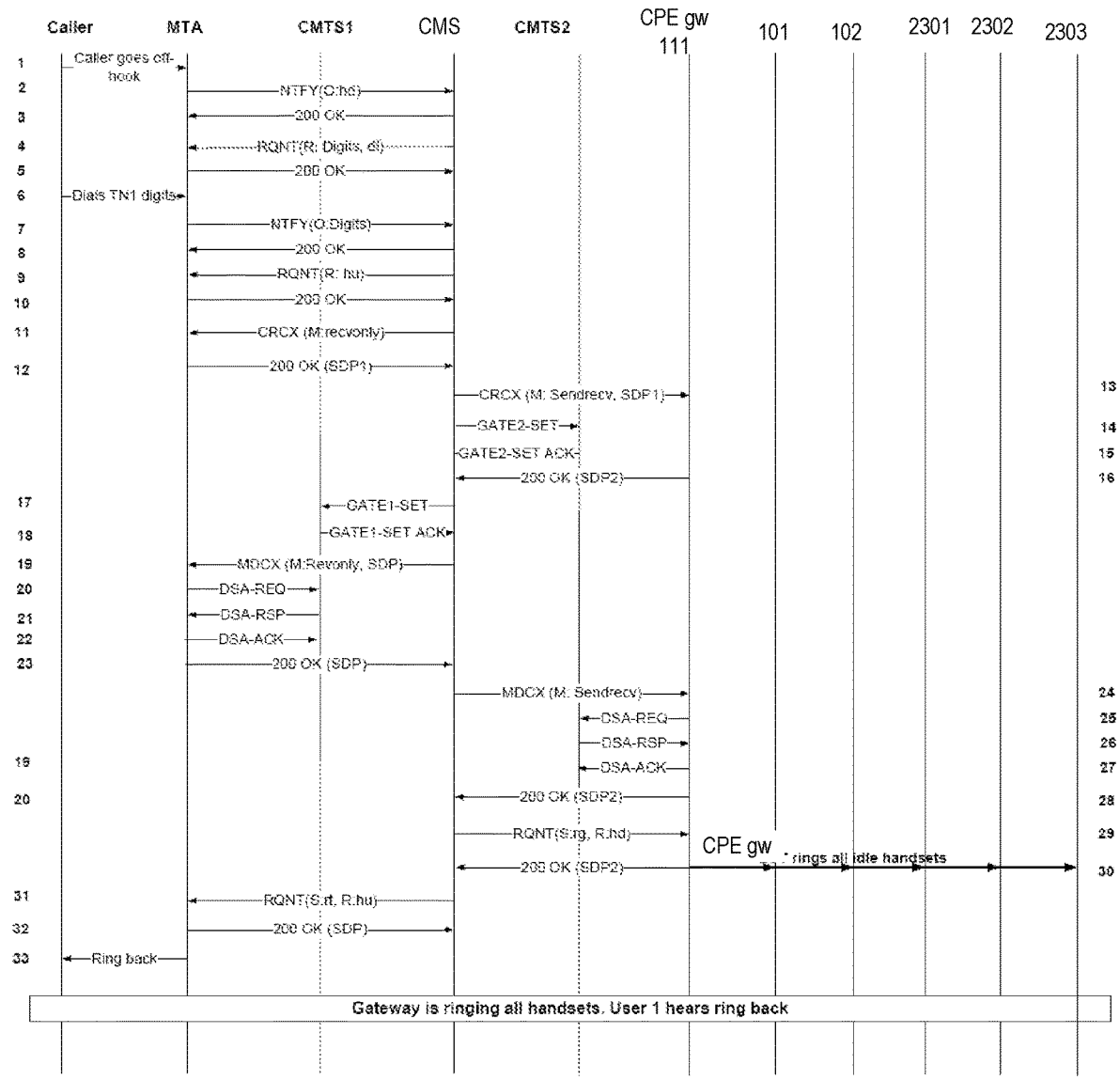
FIG. 24B
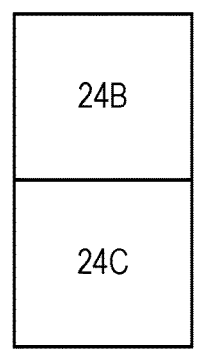

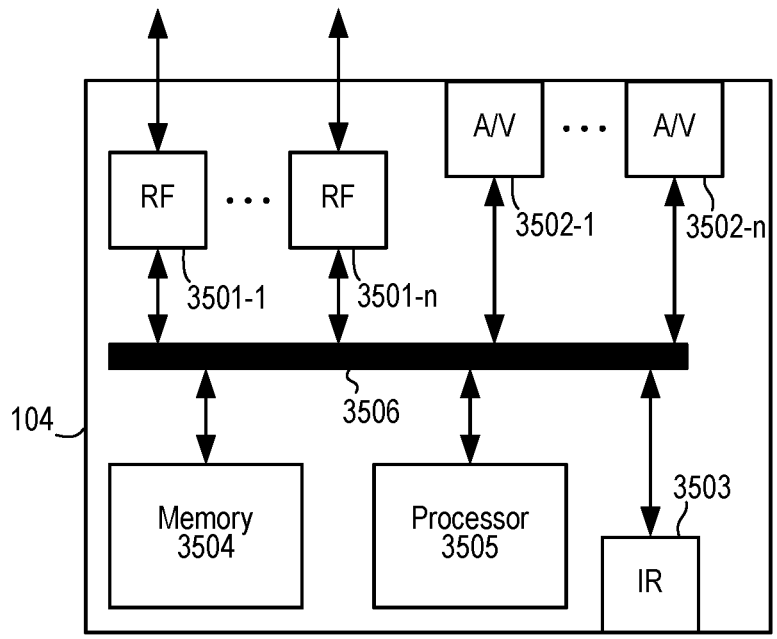
FIG. 35
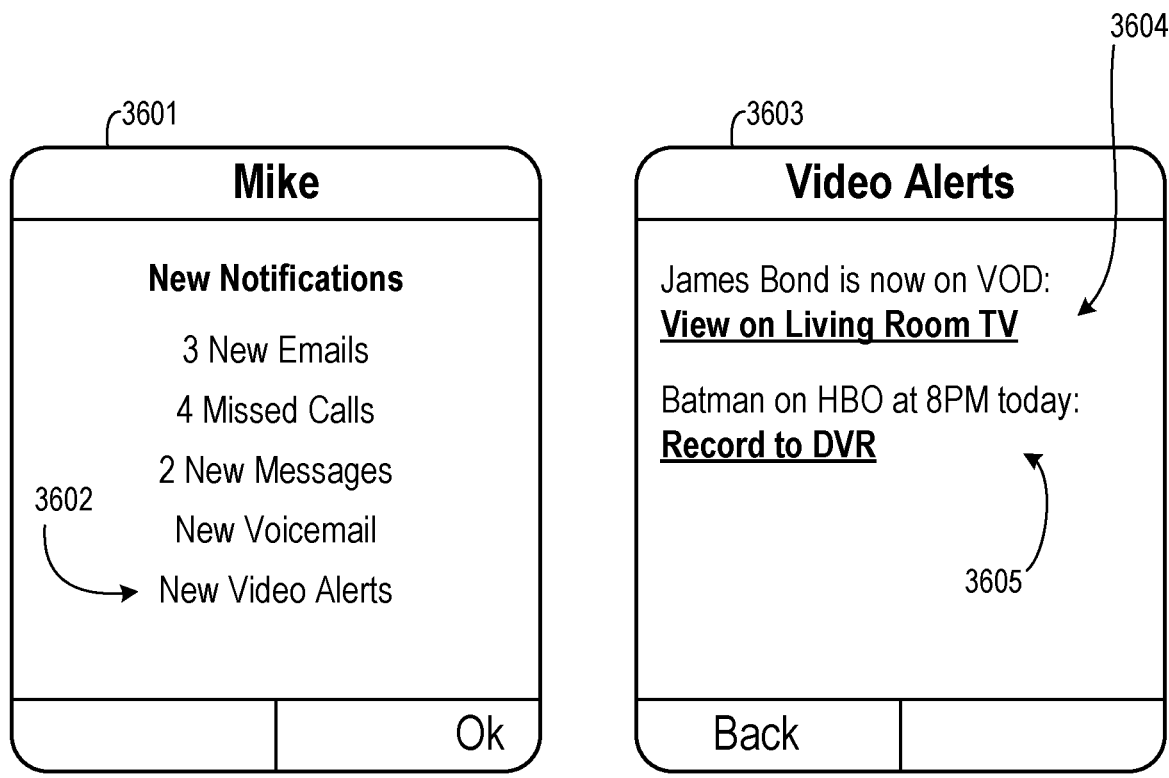
FIG. 36A
FIG. 36B

REMOVAL OF A MOBILE DEVICE FROM A LOCAL SERVICE DOMAIN

CROSS-REFERENCE TO RELATED APPLICATIONS

This application is a continuation of U.S. application Ser. No. 16/985,770, filed Aug. 5, 2020, which is a continuation of U.S. application Ser. No. 16/565,797, filed Sep. 10, 2019, now U.S. Pat. No. 10,771,841, which is a continuation of U.S. application Ser. No. 12/706,365, filed on Feb. 16, 2010, now U.S. Pat. No. 10,455,275, the entireties of which are incorporated by reference.

BACKGROUND

It has become increasingly common for residential and business consumers to receive multiple types of communication services. For example, users in a home may all communicate with the outside world through telephone calls, emails, instant messages, etc. In many cases, a user may employ multiple devices to take advantages of these services. As the range of available services increases, and as users seek to receive more of those services on different types of devices, management of individual user identities, preferences, contact information, and other types of data becomes increasingly complex. This complexity can be compounded when multiple users share communication devices.

SUMMARY

This Summary is provided to introduce a selection of concepts in a simplified form that are further described below in the Detailed Description. This Summary is not intended to identify key features or essential features of the invention.

In some embodiments, a profile-based system is employed to manage user identities and preferences, devices, content and/or other aspects of service delivery. The user profiles may be maintained in one or more servers or other elements located in an external network and accessed via a customer premises equipment (CPE) gateway of a local network. The profiles can be used to map users to identities, devices, services, and other features that affect the manner in which a particular user communicates with (or through) the external network.

Numerous other features can be provided in one or more additional embodiments. For example, elements in an external network may provide a notification summary to inform a specific user about pending events in any of one or more services. The notification summary may, in at least some embodiments, consolidate information about pending events and synchronize notification across multiple devices. As but another example, profiles may be employed to facilitate a user selection of a particular telephone number for a voice call session. Depending on profile settings, a user may also be permitted to join a pre-existing voice call session.

Profiles may also be used to control the manner in which notifications of incoming voice call sessions or of other types of events are provided. In some embodiments, for example, each user may have one or more unique audio and/or visual indicators specified in his or her profile. Those indicators can then be used with notifications to that user of incoming communications and other events directed to that user. Profiles can also be used to control the manner in which notifications of multiple simultaneous events are directed to different users.

Additional embodiments include systems and techniques for providing "public address" type messages to multiple users. Yet other embodiments include a network-based address book that permits users to share selected contact data with other users.

In some embodiments, a handset or other end device in a local service domain can receive video service notifications. The video service notifications can provide information to a user of the end device about a video service (e.g., a television program or a movie) available within the local network. The video service notification can include a request for a response to the notification, with the request having a corresponding URI or other type of link to cause a desired action (e.g., to commence recording or playing content associated with a particular video service). In still other embodiments, a mobile device configurable for direct communication in a wide area wireless network can join a local service domain and receive services through a gateway of that local service domain Still further embodiments combine some or all of the above-described features and/or additional features described herein.

BRIEF DESCRIPTION OF THE DRAWINGS

Some embodiments of the present invention are illustrated by way of example, and not by way of limitation, in the figures of the accompanying drawings and in which like reference numerals refer to similar elements. For convenience, the first portion of each reference numeral corresponds to the drawing figure in which the corresponding drawing element is first introduced.

FIG. 2 shows an example of a profile for a specific user according to some embodiments.

FIG. 21 shows a table according to some embodiments mapping various types of information regarding TNs and users associated with a subscriber account that corresponds to a particular CPE gateway.

FIG. 22 is an example of a table that could be generated and pushed to a CPE gateway in some embodiments that employ Session Initiation Protocol (SIP) signaling for call set up.

FIGS. 24A-24C show call flow signaling in some embodiments.

FIG. 35 is a block diagram of a set top terminal according to some embodiments.

FIGS. 36A-36D are examples of video service notifications according to some embodiments.

DETAILED DESCRIPTION

Some embodiments are described in the context of a network providing television, high speed data communication, telephony and other services to subscribers over a hybrid fiber-coaxial (HFC) cable plant using one or more protocols conventionally used in such networks. However, the invention is not limited to networks using a specific type of communication medium or to a specific set of communication protocols.

Figure 1:
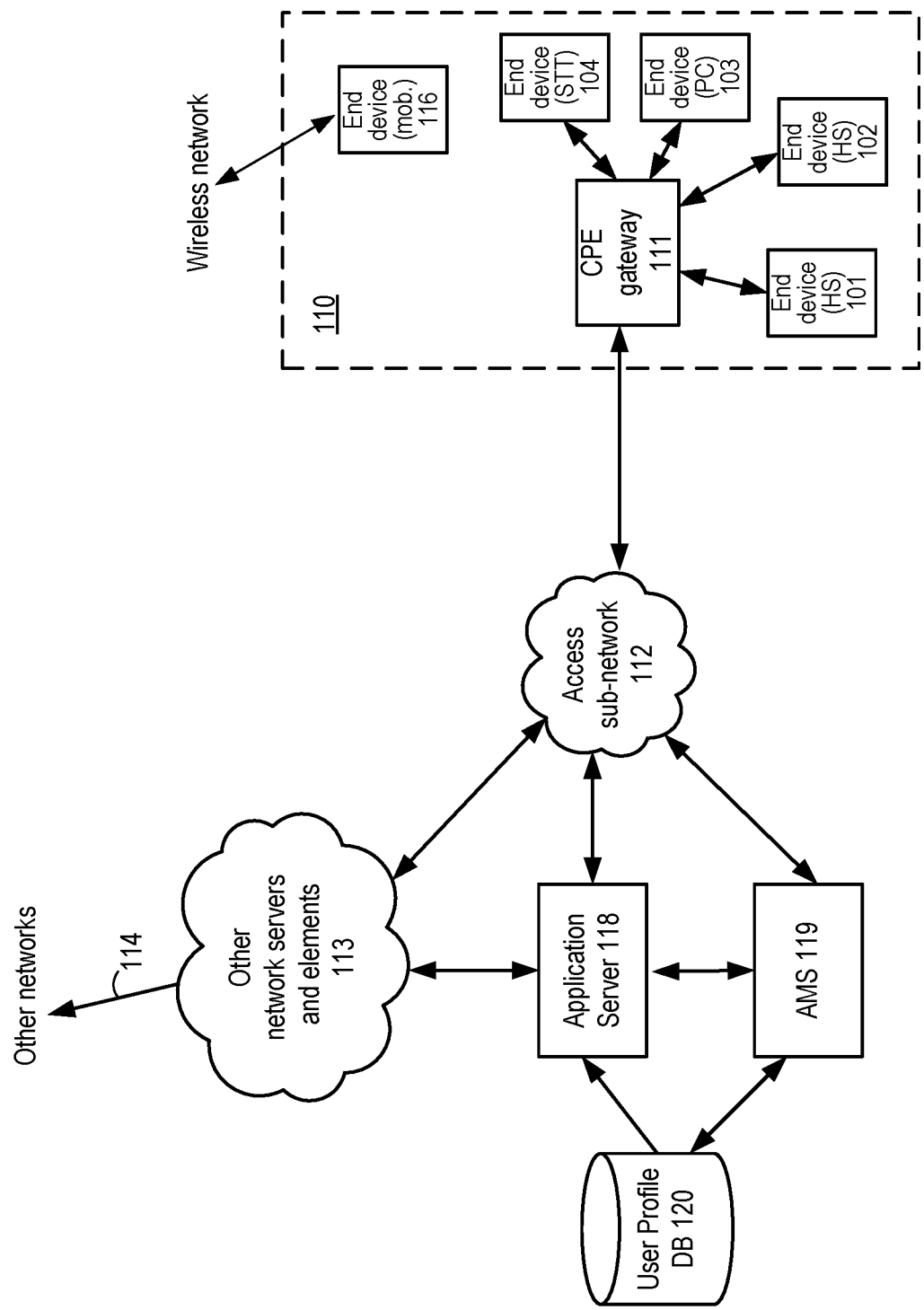
FIG. 1 is a block diagram showing an architecture for a network in which at least some embodiments may be implemented.

FIG. 1 is a block diagram showing an architecture for a network 100 in which at least some embodiments may be implemented. A plurality of end devices 101, 102, 103 and 104 at a subscriber premises 110 communicate through a customer premises equipment gateway ("CPE gateway" or "gateway") device 111 with other elements of network 100. Devices 101-104 and CPE gateway 111 form a local network, and users sharing devices 101-104 may form a user group. A variety of services, as described below, are provided to end devices in the domain of CPE gateway 111. Accordingly, local devices communicating (and receiving services) through CPE gateway 111 can also be considered within a local service domain of CPE gateway 111. The portion of network 100 beyond premises 110 forms an external network relative to the local service domain of CPE gateway 111 and the local network of premises 110.

In the example of FIG. 1, devices 101 and 102 are digital enhanced cordless telecommunications (DECT) handsets with advanced features, device 103 is a personal computer and device 104 is a Set-Top Terminal (STT) with a television (not shown) connected thereto. Additional details of devices 101-104 and examples of other types of end devices are provided below. Network 100 includes a plurality of subscriber premises each having a CPE gateway and one or more end user devices communicating with network 100 through that CPE gateway in a manner similar to that described herein for subscriber premises 110. For convenience, however, only a single subscriber premises 110 is shown.

CPE gateway 111 communicates with the external network portion of network 100 through an access sub-network 112. Sub-network 112 includes a cable modem termination system (CMTS), downstream modulators, fiber nodes and other elements commonly found in an HFC access network. Because the existence and operation of such elements is known, further details of access sub-network 112 are not included herein. One group of network 100 elements with which CPE gateway 111 communicates through sub-network 112 is collectively represented as a cloud 113. Included in cloud 113 are numerous servers and other network elements with which devices 101-104 at premises 110 and with which other end devices at other premises exchange information. Those servers and network elements include call management servers and other elements used to provide voice telephony, short message service (SMS) servers, instant messaging servers, web servers, servers providing various types of content described herein, etc. In some embodiments, cloud 113 may include NCS (Network-based Call Signaling) elements. In other embodiments, cloud 113 might also (or alternatively) include IP Multimedia System (IMS) elements (e.g., call state control function elements at the IMS service layer). Additional elements in cloud 113 may include video on demand (VOD) servers, remote DVR (rDVR) web servers, and other video head end elements.

Cloud 113 also includes links 114 to other networks. Network 100 may communicate with a wide area wireless network providing mobile telephony and other types of mobile services to mobile telephones, "smart" phones, personal digital assistants (PDAs) and other types of wireless handheld devices such as smart phone 116. CPE gateway 111 also communicates through sub-network 112 with an application server 118 and an account management server (AMS) 119, each of which is described in more detail below. For convenience, various routers and other intermediate network elements between elements of network 100 are not shown in FIG. 1.

In at least some embodiments, and as discussed in more detail below, individual users at a subscriber premises can have unique profiles stored in a user profile database (DB) 120. Profiles stored in DB 120 control the manner in which specific users receive information from and/or send information to network 100. In particular, an operator of network 100 may provide (or forward) numerous different services to premises 110. Examples of such services can include voice telephony over any of multiple telephone numbers associated with premises 110, internet access and/or other high-speed data service, email service, SMS (short message service), instant messaging (IM) service, television, etc. Additional examples of services include, but are not limited to: a network-based address book; gaming services; services to deliver personalized news, horoscopes, financial quotes, sports reports, etc.; location-specific weather, traffic information, news, etc.; personalized greeting messages; voice mail; multimedia messaging service (MMS); audio, visual and/or text-based chat; etc. Many of those services have specific types of information used for identifying a particular user, user-specific settings and preferences, and other types of configuration data that affect how the service is provided. Each of multiple individuals sharing end devices 101-104 at premises 110 may have a separate profile stored in DB 120 that represents the identifying information, settings, preferences and other configuration data for each of those services relative to that individual. Further details and examples of profiles and configuration data in profiles are described below.

In some embodiments, user profiles are linked to a specific subscriber account. As used herein, a "subscriber" is a person, corporation or other entity that has arranged to obtain access to, and one or more services from, network 100, and an "account" is a construct used to group various data items related to providing a subscriber with services in the network. In some embodiments, an operator of network 100 establishes an account for premises 110 that includes various sub-accounts, with each of those sub-accounts corresponding to a specific user profile. A subscriber may be, for example, a head of a family residing at premises 100, and each of the sub-accounts may be used by individual family members. This is only one example, however, and an account need not be assigned to a particular type of entity or be associated with a single premises or gateway.

Profiles stored in DB 120 can be created and managed from end devices 101-104 and/or other devices and are device-agnostic. In other words, individual users may create and manage their profiles from various types of devices and may receive content delivery, notifications and other services in a synchronized manner across multiple devices and device types.

FIG. 2 shows an example of a profile 200 for a specific user stored in database 120. A first field 201 contains a name for profile 200. This name can be, e.g., a name of the user or some variant of that user's name A second field 202 contains credentials for the user. The credentials can include a user identification (UID) (e.g., the user name or some other name used to identify the user) and a password. The credentials could also include other types of data (e.g., encryption keys, etc.) and could include multiple separate sets of credentials (e.g., separate passwords and/or UIDs for different services). The next set of fields 203 contain identities for the user in various services. Examples of an identity include a telephone number (TN) and/or a session identifier associated with a TN, an email address, an instant messaging (IM) identifier, a game handle, etc. In some embodiments, the service to which a particular identity applies is implicit from the format of the identity (e.g., a ten-digit TN is implicitly linked to telephony-related services), but separate fields linking identities to services could also be included. In some implementations of some embodiments, each subscriber account is provided with a set of TNs (e.g., five TNs) that can be assigned to individual users, with one of those TNs acting as a default TN. Further examples of user/TN linking are described below.

Fields 204 contain identifiers for specific end devices over which the user wishes to receive notifications (described in more detail below) and other aspects of various services. The identifiers in fields 204 can be, e.g., media access control (MAC) addressed of identified devices. In the example of FIG. 2, the profile contains the identifiers of end devices 101-104 shown at premises 110 in FIG. 1. However, this need not be the case. For example, end devices at a premises may include devices (e.g., a game console) that a particular family member may not use, and that family member may thus decide that he or she does not want any services for him or her directed to that never-used device. As another example, one member of a family may have a smart phone that is not used by other family members (e.g., phone 116), and thus other family members would not identify that smart phone in their profiles.

Field 205 contains priorities that the user has assigned to each of the devices identified in fields 204. In some embodiments, a user can configure a profile so that notifications of various events (e.g., incoming calls, new emails, updated news or other information, etc.) are first sent to one or more primary devices, then to one or more secondary devices if the notification is not attended at a primary device, then to one or more tertiary devices, etc. In some such embodiments, notifications are sent to all devices by default if no priorities are specified in a profile. A user could also configure a profile so that notifications for events in one service are sent to some end devices and notifications for events in a different service are sent to different devices.

Fields 206 contain pointers to various audio and/or visual indicators that are to be employed when notifying the user of an event associated with a service. An audio indicator can be a ring tone or other type of sound. A visual indicator can be a specific color to which a display screen should be set, a picture or other graphic, a video clip, etc. A visual indicator could also include a specific type of pop-up message to be provided on certain devices (e.g., a "toaster" pop-up indicator on a bottom corner of a computer window) and/or whether such an indicator is to be allowed, specific text to be flashed on a display, an indicator that a display screen is to be flashed, an indicator that an LED or other light is to be flashed, etc. Although only a single audio indicator and a single visual indicator are shown in FIG. 2, a single profile could specify multiple audio and/or visual indicators. For example, a user may specify a first audio and/or visual indicator combination to be used for notifications for one type of service (e.g., incoming telephone calls), a second audio and/or visual indicator combination to be used for notifications for another type of service (e.g., IM messages), etc. Examples of other types of notifications are included below.

Fields 207 indicates various services the user is authorized to receive. In some cases, the authorizations in fields 207 are controlled by a subscriber, while in other instances the operator of network 100 controls such authorizations. For example, the operator of network 100 may make one set of services available to subscribers who pay a basic fee, a larger set of services available to subscribers paying a slightly higher fee, etc. In some embodiments, each account has a primary user who can control the degree to which other, non-primary users can access and/or modify their profiles, and thus control the degree to which those other users can access certain services. By way of illustration, a parent/primary user may restrict a child from using certain news or other services, from making long distance telephone calls, from receiving IM messages or other incoming communications between certain hours, etc. In a similar manner, a primary user could limit the degree to which a non-primary user could modify other aspects of a profile. As but one illustration, a non-primary user may be prevented from changing end devices identified in that non-primary user's profile.

Field 208 contains a sub-network 112 MAC address and/or IP address for CPE gateway 111. Field 209 contains an identifier of the account with which profile 200 is associated. A field 210 indicates whether the profile is for a "primary" user.

A profile could include numerous other types of configuration information for a particular user. A profile could indicate the extent to which a particular user has "barge-in" rights to join an ongoing telephone call or other service session (described below). A profile could specify the types of notifications a user wishes to receive and/or the devices on which the user wishes to receive certain types of notifications. By way of illustration, a user may keep a DECT end device used for business purposes in a home office, and thus not want to receive IM or personal email notifications, sports updates or other distracting non-business notifications on that DECT device. A profile could include presence information (e.g., one or more fields to indicate whether a user has logged into or is currently utilizing a specific and device, the last end device the user utilized, etc.). A profile could also be used to contain personalization data that controls the types of notifications to be provided for certain services, examples of which include: the types of news stories for which a user would like to receive notifications; specific companies about which a user would like to receive financial update service notifications; a specific zodiac sign for which the user would like to receive a daily horoscope notification; sports teams for which the user would like to receive game score notifications; location information for services providing weather, traffic, local news or other location-related notifications; etc. As but one additional example, a profile may specify how notifications of emails, voice mails, IM messages, and other types of incoming communications are to be synchronized, how often such notifications are to be delivered, the devices from which such notifications can be accessed, etc. A profile could control the manner in which personalized greeting messages from a user are formatted and/or certain content to be included in such messages (e.g., a picture of the user). A profile could be used to control a user's access to a network-based address book. A profile could identify other users in a community of users (e.g., other family members) to be provided certain multicast messages and/or indicate users from whom multicast messages are to be relayed.

Data within a profile can also be used by other network elements to determine whether a particular user and/or device is authorized for a particular service, and thus provide access control. A profile could further be used for auto detection of devices and services, for authorization of additional devices for services, for other types of configuration management, and various other purposes. Accordingly, the data items shown in FIG. 2 are merely examples of the types of data that can be contained in a user profile. Moreover, the table of FIG. 2 is merely one example of how profile data can be stored in accordance with some embodiments. The actual format of profile data and/or of the tables or other data structures used to organize and store profile data will vary among different embodiments.

Users access profiles in database 120 through account management system (AMS) 119 (FIG. 1). Specifically, AMS 119 provides configuration management and access control functions through which users create, update and otherwise manage their individual profiles. In at least some embodiments, AMS 119 provides these functions through a web page or other portal that a user can access through any of end devices 101-104 and/or through a separate web portal (e.g., accessible over device 116 or remotely from premises 110). Upon accessing the profile management portal, a user can create a profile having data such as shown in FIG. 2 and/or modify individual elements of the profile data. In some implementations, each family or other local user group associated with subscriber account will have a primary user (e.g., a parent) with highest privileges to control the profiles of other individual users (e.g., children) within that group. Those other users will have limited privileges for creation and management of their own profiles, but will not be able to modify the profiles of other users.

Application server 118 receives notifications from other application servers and network devices that are destined for particular identities associated with a particular user (e.g., emails to a specific email address, instant messages to a specific IM ID, etc.). In some embodiments, messages for setting up voice telephony sessions and messages containing coded voice data for such sessions are exchanged with CPE gateway 111 by call managements servers (CMS), CMTSs and other network elements directly, but information regarding such sessions is forwarded to application server 118 (by CPE gateway 111 and/or from other elements within network 100). Server 118 then consults user profile DB 120 and extracts various data from the profile(s) applicable to the identities being notified. That data may include, e.g., devices to which the notifications are to be forwarded, the CPE gateway through which such devices can be reached, visual and/or audio indicators to be used for the notification, etc. Server 118 then pushes the notifications and the profile data to the appropriate CPE gateway. In some embodiments, profile data for users in a local user group associated with an account is pushed to and cached on CPE gateway 111 when gateway 111 is booted, and updates are pushed to gateway 111 as such updates are made. Other operations performed by application server 118 may include consolidating and/or reconciling notifications from multiple sources and/or services for an individual user, concurrent delivery of notifications to multiple end devices for a particular user, and synchronization of notifications across multiple devices.

In some embodiments, AMS 119 and application server 118 interface with user profile DB 120 using an XML interface, a web services interface, or other appropriate interface. Network elements in cloud 113 may similarly communicate with application server 118 over an XML interface, a web services interface or other appropriate interface. AMS 119, user profile database 120 and application server 118 may each be implemented as multiple servers for redundancy and/or to increase the amount of analysis, data storage and other services being performed simultaneously. In some embodiments, application server 118 and/or AMS 119 may be IMS application servers that communicate with CPE gateway 111 via intermediary IMS call state control function elements within cloud 113.

Figure 3:
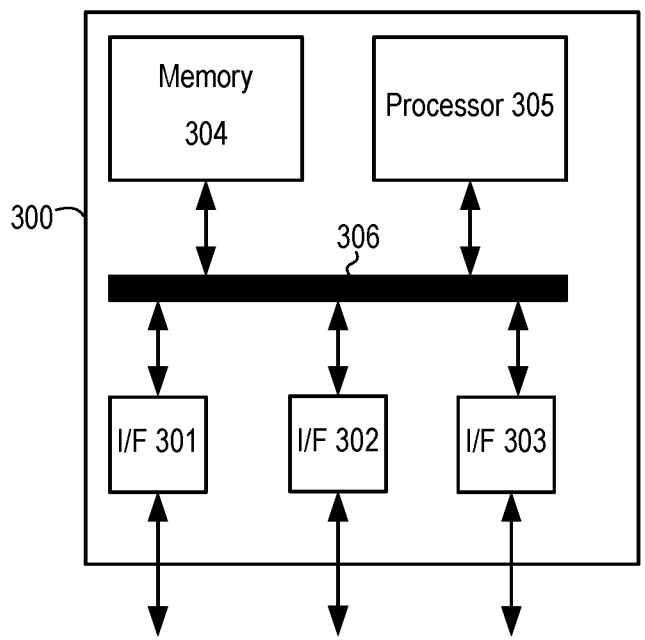
FIG. 3 is a partially schematic block diagram of a server according to some embodiments.

FIG. 3 is a partially schematic block diagram of a server 300 that can act as one of AMS 119, user profile DB 120 and/or application server 118. Server 300 includes one or more hardware interfaces 301-303 that provide physical connections by which server 300 communicates with other servers or elements in network 100. In at least some embodiments, hardware interfaces 301-303 include one or more Ethernet cards. Server 300 further includes memory 304 for storing instructions and data and a processor 305 for executing instructions and controlling operation of server 300. Although a single block is shown for memory 304 and a single block shown for processor 305, memory and computational operations of server 300 could respectively be distributed across multiple memory devices and multiple processors located within server 300 and/or across memory and processors located on multiple platforms. Memory 304 may include volatile and non-volatile memory and can include any of various types of storage technology, including one or more of the following types of storage devices: read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory. Processor 305 may be implemented with any of numerous types of devices, including but not limited to one or more general purpose microprocessors, one or more application specific integrated circuits, one or more field programmable gate arrays, and combinations thereof. In at least some embodiments, processor 305 carries out operations described herein according to machine readable instructions stored in memory 304 and/or stored as hardwired logic gates within processor 305. Processor 305 communicates with and controls memory 304 and interfaces 302-303 over one or more buses 306.

Returning to FIG. 1, and as previously indicated, end devices 101-104 communicate with network 100 through CPE gateway 111. For example, CPE gateway 111 receives notifications and other service data from application server 118 and forwards same to the appropriate end devices. CPE gateway 111 similarly forwards call signaling and other data from end devices 101-104 to various elements of network 100. CPE gateway 111 may also perform any of numerous additional functions in various embodiments. For example, CPE gateway 111 may provide the session ID of an outgoing call (e.g., a NCS ID in systems using an NCS-based protocol or a SIP session ID in systems using SIP-based protocol) to application server 118. CPE gateway 111 also interfaces with application server 118 (e.g., using a web service interface such as SOAP/XML), interfaces with AMS 119 (e.g., using a SOAP/XML interface) for profile creation and update, maps a Session ID to a TN, determines a profile and its attributes from a TN and maps a session ID to those profile attributes by communicating with application server 118, and pushes the personalized profile attributes along with a session ID to an end device. CPE gateway 111 may also act as a proxy to forward user credentials from an end device to AMS 119 and forward profile attributes from application server 118 to the end device.

Figure 4:
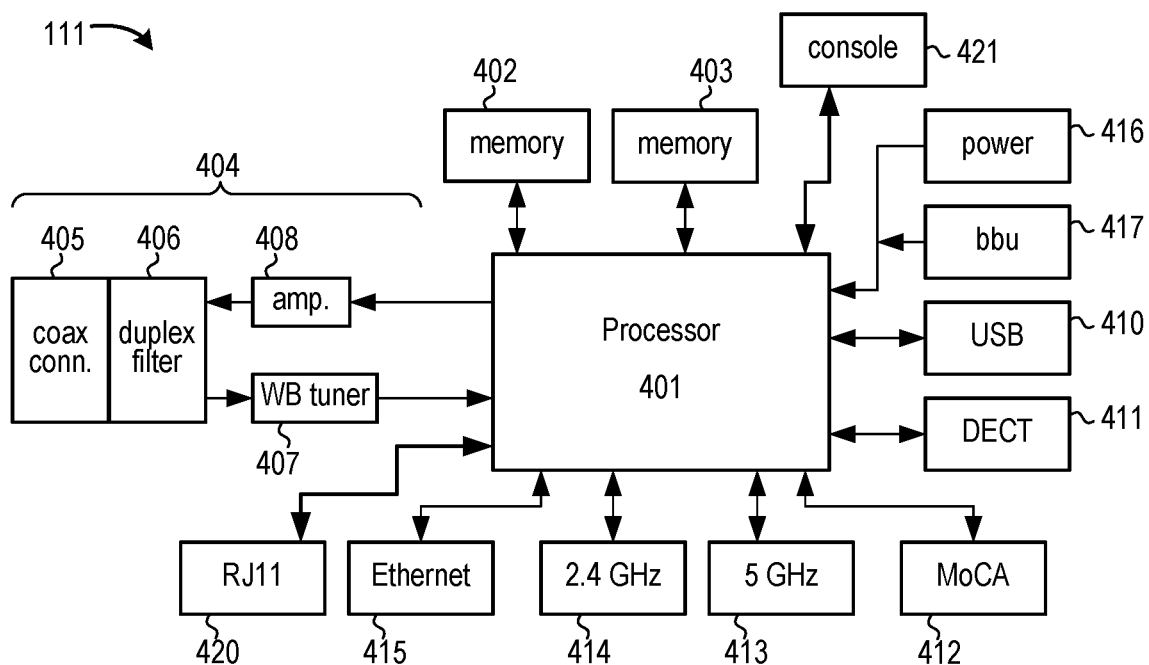
FIG. 4 is a block diagram of a CPE gateway according to some embodiments.

CPE gateway 111 interfaces with each end device on a physical layer (e.g., wired or wireless) using protocols specific to the end device. CPE gateway 111 may be incorporated with components performing additional operations (e.g., a Data over Cable System Interface Specification (DOCSIS) cable modem). FIG. 4 is a block diagram of CPE gateway 111 according to some embodiments. A main processor 401 is configured to execute instructions so as to perform various operations as described herein, to perform various DOCSIS MAC and PHY (physical) layer operations, and to control operation of other components of CPE gateway 111. Instructions executed by main processor 401 may be hard-wired logic gates and/or may be instructions read from memory 402 or 403. Main processor 401 communicates with network 100 across an RF interface 404 that includes a coaxial cable connector 405, a duplex filter 406, a wideband tuner 407 and an upstream communication amplifier 408. Main processor 401 communicates with end devices through various additional interfaces that include additional hardware and/or firmware. Such interfaces can include a USB interface 410, a DECT 6.0 interface 411, MOCA (Multimedia Over Coax) interface 412, 2.4 GHz WiFi interface 414, 5 GHz WiFi interface 413, Ethernet interface 415 and RJ11 interface 420. In other embodiments, a CPE gateway may also include other types of interfaces for communicating with other types of end devices. Examples of such interfaces include but are not limited to a CAT-iq (Cordless Advanced Technology-Internet and Quality) interface for communication with CAT-iq end devices, a DLNA (Digital Living Network Alliance) interface for communicating with other devices in a premises, a femtocell interface for communicating with mobile telephones and other mobile devices, etc. A power supply 416 and/or battery backup 417 provide electrical power. User input to CPE gateway 111 may be provided over one of the aforementioned interfaces or via a separate collection of buttons or other controls in a console 421.

Figure 5:
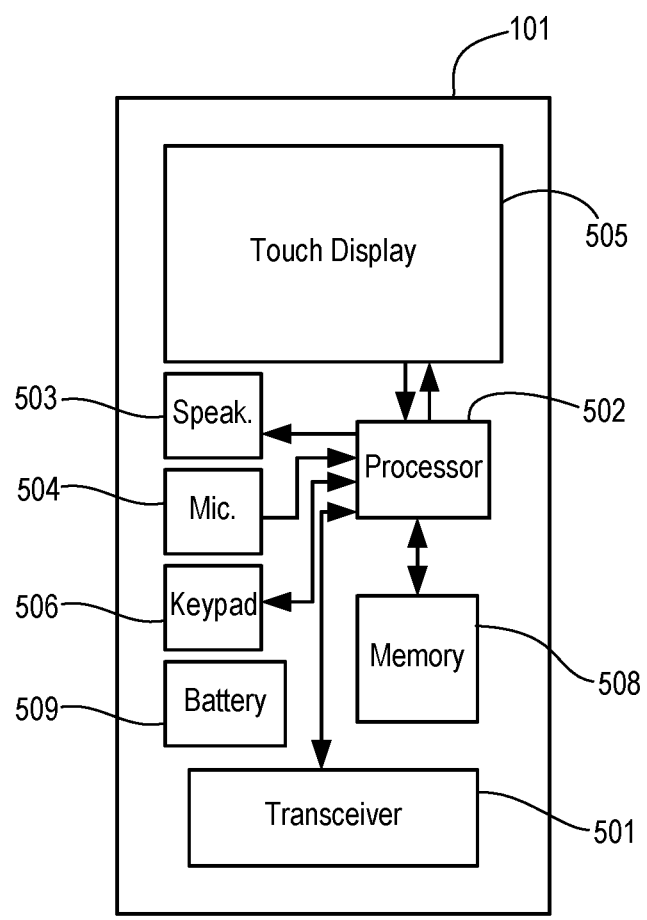
FIG. 5 is a block diagram of an end device according to some embodiments.

In the example of FIG. 1, end devices 101 and 102 are DECT handsets communicating with CPE gateway over DECT interface 411 in FIG. 4. FIG. 5 is a block diagram of end device 101, with end device 102 being similar. DECT handset device 101 includes a transceiver 501 that receives and demodulates wireless signals from interface 411 and that modulates and transmits signals to interface 411. A processor 502 is configured to execute instructions so as to perform various operations as described herein and to control operation of other components of device 101. Those instructions may be stored in memory 508 as executable instructions and/or as hard wired logic within processor 502. Processor 502 is also configured to perform one or more types of CODEC (coder/decoder) operations to convert data to audio for output through speaker 503 and to convert sound received through microphone 504 into data. Processor 502 outputs video data to a display 505 and receives user input through a keypad 506 and/or through touch sensitive portions of display 505. Processor 502 is configured to provide a browser or other graphical user interface (GUI) on display 505 by which a user of device 101 can receive visual indicators for notifications, access various services, configure a user profile, etc. A battery 509 provides electrical power to device 101.

End device 103 in FIG. 1 is a personal computer. Similar to the platform 300 described in connection with FIG. 3, device 103 includes one or more hardware interfaces that provide physical connections over which device 103 communicates with CPE gateway 111. Those hardware interfaces may be wireless interfaces communicating with one or interfaces 413 or 414 (FIG. 4), a USB interface communicating with interface 410, an Ethernet interface communicating with interface 415, etc. Device 103 further includes memory for storing instructions and data and a processor for executing instructions and controlling operation of device 103. That memory may include volatile and non-volatile memory and can include any of various types of storage technology, including one or more of the types of storage devices described in connection with FIG. 3. The processor of device 103 may be implemented with any of numerous types of devices, including but not limited to one or more general purpose microprocessors, one or more application specific integrated circuits, one or more field programmable gate arrays, and combinations thereof. In at least some embodiments, the processor of device 103 carries out operations described herein according to machine readable instructions stored in the memory of device 103 and/or stored as hardwired logic gates within the device 103 processor. Device 103 may include (or be communicatively coupled to) a display and a speaker to provide video and audio output, respectively. A keyboard and/or mouse provide user input to device 103.

Other types of end devices can include other types of cordless or wired telephones, Set Top Terminals, game consoles, etc. Each of the devices may also include memory and processor(s) configured to execute instructions so as to carry out operations described herein. Such devices may also include and/or be communicatively coupled to output devices (e.g., speakers and/or display screens) and input devices (e.g., keyboards, keypads, game controllers, remote control units for navigating and selecting elements of onscreen menus, etc.).

As previously indicated, end devices 101-104 and other end devices provide content and service data to users and allow users to create and/or manage individual profiles. The above-described end devices communicate with external network elements outside of premises 110 using CPE gateway 111 as a proxy device. Other types of end devices (not shown) may communicate with application server 118, AMS 119 and/or other elements of network 100 without using CPE gateway 111. For example, personal digital assistant (PDA) or smart phone 116 may interface with network 100 via a separate wide area wireless network (e.g., a third generation (3G) mobile networking and telecommunication network).

Each of the above-described end devices may be shared by multiple users in a user group associated with premises 110. For example, handset devices 101 and 102 may be available for use by any member of a family residing at premises 110, computer device 103 may be a computer that all members of the family use, etc. Even though devices 101-104 are not dedicated to specific users, any of the users in the group can have a unique experience when utilizing one of end devices 101-104. For example, a user receiving an incoming telephone call, email or other communication on any of various ones of those devices can receive a notification that employs a user-specific audio and/or visual indicator derived from that user's profile maintained in DB 120. Each of end devices 101-104 also provides an interface for a user to communicate with AMS 119 and application server 118 for accessing the user's profile and to retrieve various notifications and other information. This interface may be a web service interface such as SOAP/XML, a web browser interface, or another application running on the device. In some embodiments, an end device may also implement a mechanism for temporary authorization to access a user profile if the device is not currently associated with that user's profile.

Figure 6:
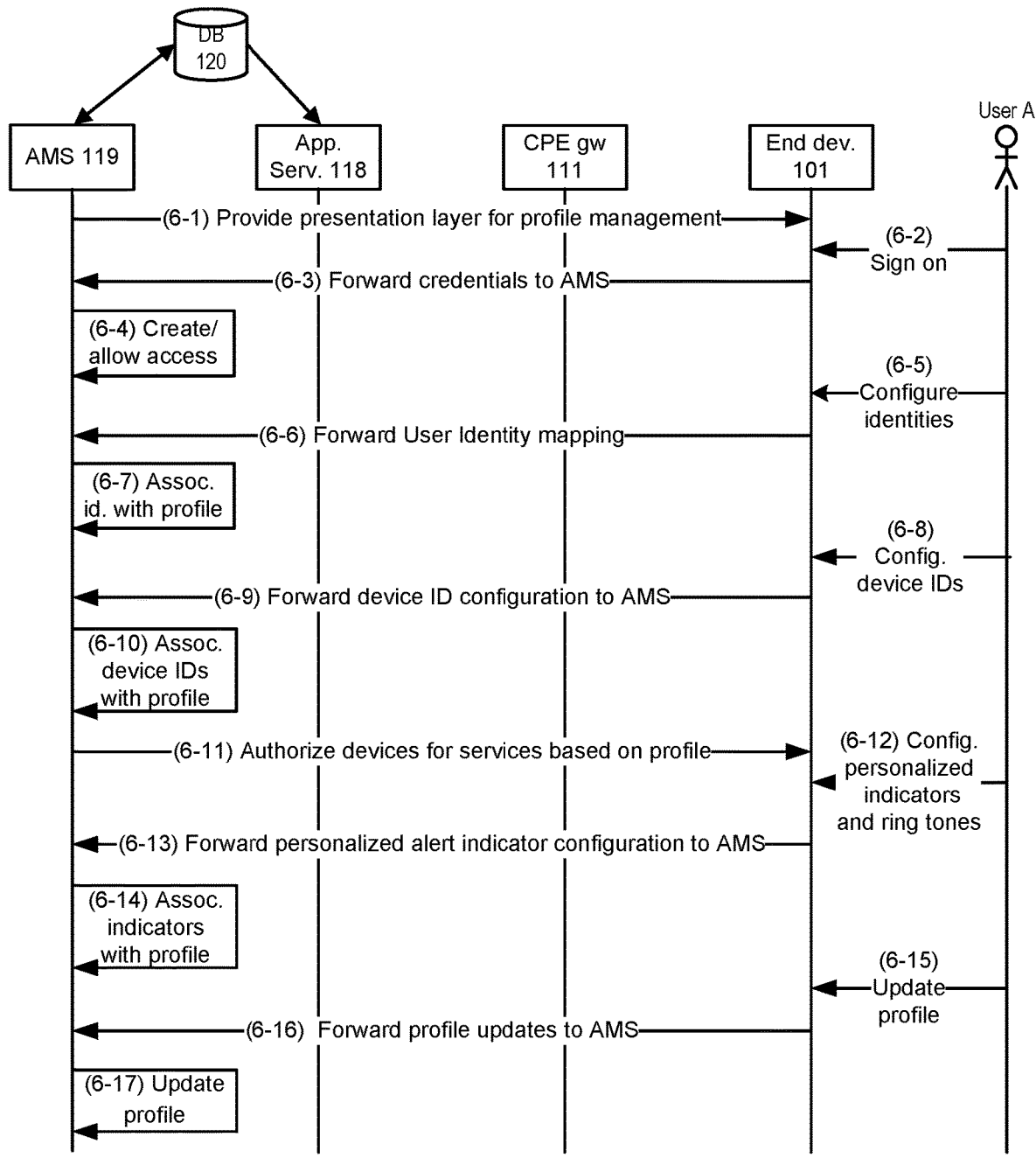
FIG. 6 is a communication diagram showing information flows in connection with a user creating and managing a profile according to some embodiments.

FIG. 6 is a communication diagram showing information flows in connection with a user ("user A") creating and managing a profile using end device 101 at premises 100 (FIG. 1). Although end device 101 is used in the present example, other end devices at premises 110 could also be used. On line 6-1, AMS 119 provides a profile management presentation layer to end device 101 via CPE gateway 111. As used herein, "presentation layer" refers to a collection of user interface components (e.g., applications or applets permitting a user to select icons or fill in data fields) and user interface process components (e.g., applications and applets controlling the user interface components and sending user-supplied data to AMS 119). Although not shown in FIG. 6, AMS 119 may have provided the profile management presentation layer in response to various types of stimuli. As but one example, user A may have touched a region of display screen 505 (FIG. 5) corresponding to a "create/modify profile" command, which may have caused end device 101 to send a signal to CPE gateway 111, which in turn caused CPE gateway 111 to forward a signal to AMS 119.

Upon receiving the profile management presentation layer, end device 101 provides a screen for user A to sign on by providing a user ID and password or by providing other credentials. If user A has not signed on in a previous session, the user ID and password could be provided to user A by the operator of network 100 or by the primary user on the account (if user A is not the primary user). In some embodiments, a default profile is initially established for each TN linked to a particular account. The default profile includes minimal information (e.g., a different color visual indicator and a different ring tone) for each TN so that calls to different TNs can be distinguished without requiring any setup by a subscriber. Users can then modify those profiles to include other types of information. In some implementations, an account may be allowed to have more profiles than TNs, thus requiring certain profiles to share a particular TN. In some cases, a subscriber may wish to create a temporary profile (e.g., for a houseguest) specifying certain types of services that can be accessed through a specific device (e.g., a DECT handset in a guest bedroom).

User A signs on (line 6-2), and end device 101 forwards user A's credentials to AMS 119 via CPE gateway 111 (line 6-3). After verifying the received credentials, AMS 119 either creates a profile for user A or opens a pre-existing profile and permits user A to access that profile (line 6-4). After AMS 119 informs end device 101 that user A may access the profile (not shown in FIG. 6), user A inputs identities such as an email ID, a TN (e.g., one of multiple telephone cumbers previously associated with the account for premises 110), an instant messaging ID, etc. (line 6-5). End device 101 sends those identities to AMS 119 via CPE gateway 111 (line 6-6), and AMS 119 associates those identities with the user A profile by storing appropriate data in the user A profile in DB 120 (line 6-7). User A then inputs identifications for devices to be associated with the user A profile (line 6-8), which information is forwarded to AMS 119 via CPE gateway 111 (line 6-9) and associated with the user A profile in DB 120 by AMS 119 (line 6-10). AMS 119 then authorizes the identified devices for services based on the profile by informing CPE gateway 111 and end device 101 (line 6-11). In some embodiments, this authorization may flow through application server 118. End device 101 is informed in line 6-11 because user A is currently logged in through end device 101, but other authorized end devices may not receive a specific notification of authorization as part of line 6-11.

In line 6-12, user A configures personalized audio and visual indicators by inputting the necessary information into end device 101. User A may, e.g., provide names of files containing ring tones, images, etc. and/or cause such files to be uploaded. The personalized audio and video indicators are forwarded to AMS 119 (line 6-13), which then associates the personalized audio and video indicators with the user A profile in DB 120 (line 6-14). User A may provide additional user profile attributes and/or updates (line 6-15) that are also forwarded to AMS 119 (line 6-16) and associated with the user A profile (line 6-17).

In some embodiments, a user could login from multiple end devices and update the user's profile concurrently from those devices. The latest update on the profile would then be updated by AMS 119 and synchronized across the end devices. For updating the profile, the upstream system may auto-detect the end device based on user credentials and provide the user interface for profile update. The user profile stored in DB 120 by AMS 119 is device agnostic and maintained at the upstream network and can be derived from multiple devices to deliver multiple services (i.e., the user can use the network based profile and access the identities and content from any device for any service).

Figure 7:
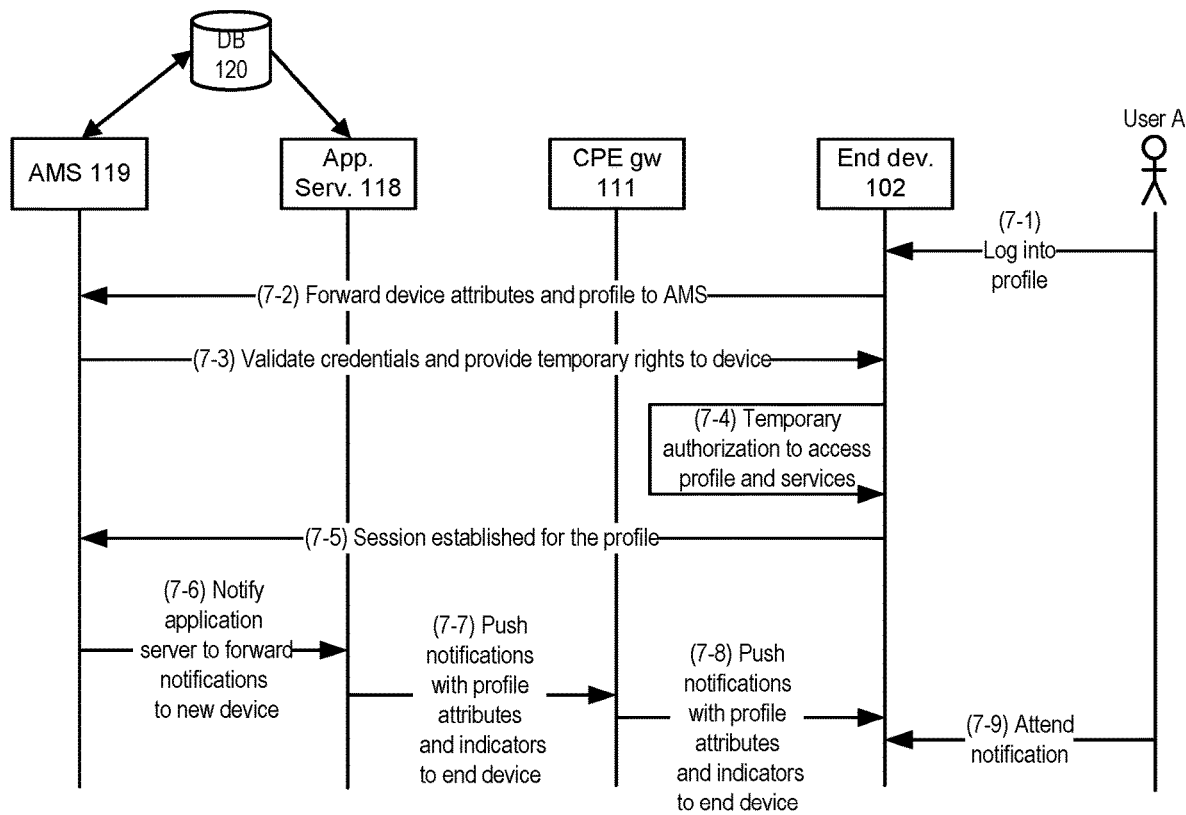
FIG. 7 is a communication diagram showing information flows in connection with a user accessing a profile from a temporary device according to some embodiments.

FIG. 7 is a communication diagram showing information flows in connection with user A accessing a profile from a temporary device. In some embodiments, a user can login to the system for receiving services from an end device that was not previously associated with that user's profile. For example, user A may have previously configured his or her profile so that incoming telephone calls and message are directed to (handset) end device 101 and (computer) end device 103, but not to (handset) end device 102 or (STT) end device 104. If user A logs in using handset end device 102, AMS 119 will provide temporary rights to device 102 and user A will receive all notifications at device 102 as long as the session is authorized with proper credentials and active. User A logs in with his or her user name and password using end device 102 at line 7-1. Those credentials are forwarded to AMS 119 via CPE gateway 111 (line 7-2), which then validates those credentials and provides temporary access rights to device 102 for user A (line 7-3). Device 102 then processes that authorization (line 7-4) and establishes a session via CPE gateway 111 with AMS 119 (line 7-5). AMS 119 then advises application server 118 that notifications from applications and services identified in the user A profile should be forwarded to device 102 (line 7-6). When application server 118 receives such a notification it is pushed to device 102 via CPE gateway 111 (lines 7-7 and 7-8). User A can then attend to a notification on device 102 just as he or she would using device 102 or device 103 (line 7-9).

Although not shown in FIG. 7, application server 118 in some embodiments sends a message to CPE gateway 111 after line 7-6 indicating that notifications of events for identities in the user A profile should be sent to device 102. In this manner, CPE gateway 111 will know to cause device 102 to generate notifications of such events. As indicated above, external network messages relating to new voice calls may come to CPE gateway 111 directly from a CMS, CMTS or other network elements without passing through application server 118. However, other types of services may send messages containing data for a particular user identity to CPE gateway 111 through application server 118. In either case, CPE gateway 111 will use information previously received from AMS 119 to cause end device 102 to generate an appropriate notification.

Numerous types of notifications can be provided through an end device in a manner similar to that described in connection with FIG. 7 and in connection with other drawings figures. Some notifications may inform a specific user of an incoming call to a TN mapped in that user's profile, of a missed call and/or of a voice mail message. Other types of notifications may inform a user of other telephony-related events (e.g., a call-back from a previously busy TN). Still other types of notifications may inform a user of a new IM message, SMS message, MMS message, email or other type of message. Table 1 lists a number of different types of notification events corresponding to various different service types.

TABLE 1

| Service type | Notification events |
| --- | --- |
| voice/telephony | incoming call; missed call; new voice mail; call-back; emergency call; presence indication |

TABLE 1-continued

| Service type | Notification events |
|---|---|
| messaging | new IM; new SMS message; new MMS message; new email; network status message; presence indication |
| profile management | change in profile; request to change profile; user login/logout/presence information |
| news | update or alert |
| sports | update or alert |
| local news/weather/traffic | update or alert |
| financial | stock quote or other update or alert |
| horoscope | daily horoscope |
| alarm/calendar | wake-up alarm; calendar reminder |
| system management | full mail box; full voice mail box; user login/logout; other system alerts; emergency notifications |
| emergency alerts/home alarm | update or alert |
| advertisements | update or alert; sale notices, etc. |
| other personalized services | update or alert |

Table 1 is not intended as an exhaustive list of possible notifications. Other types of notifications can be provided in various embodiments and/or are described below.

Figures 8, 9:
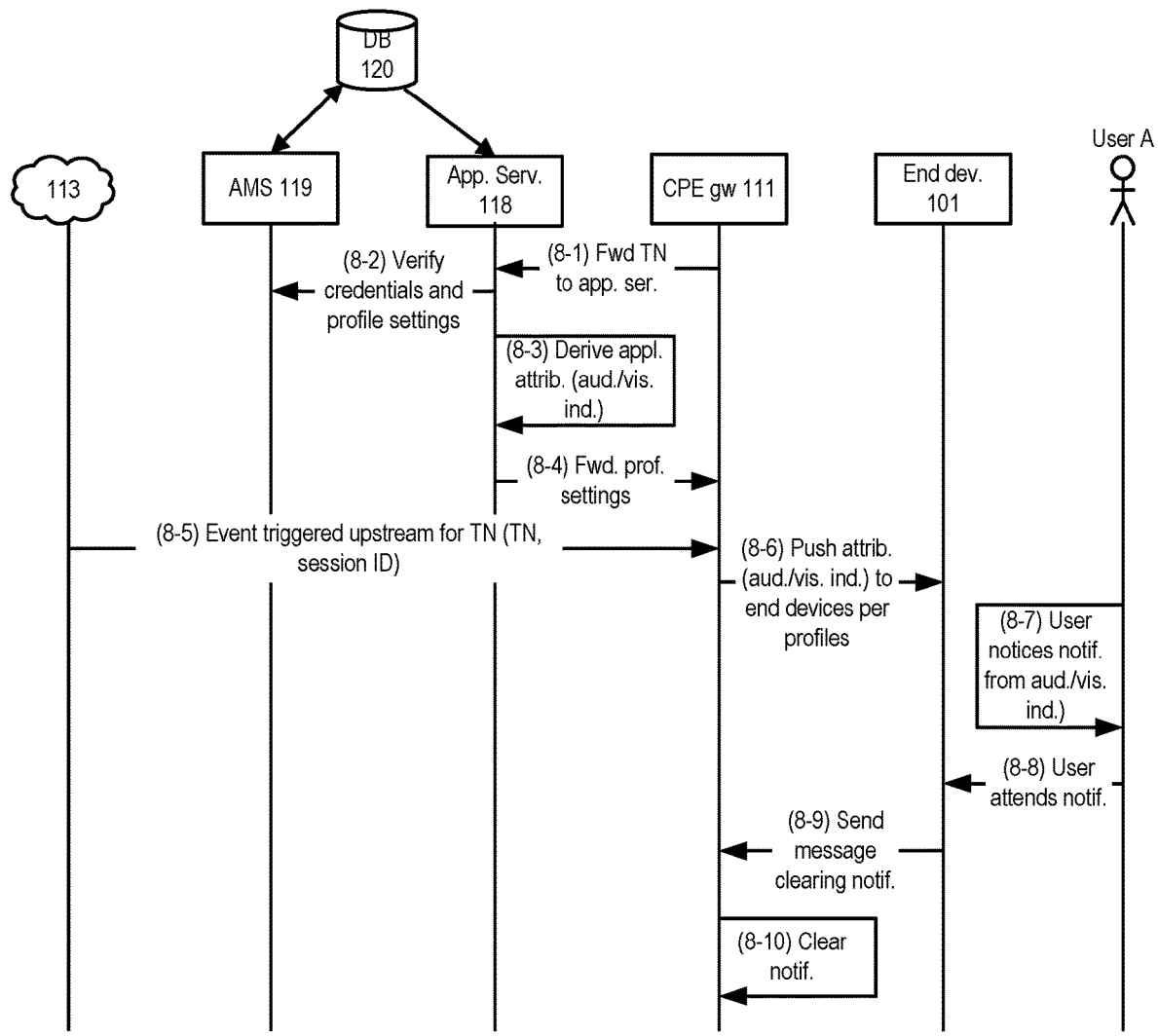
FIG. 8 is a communication diagram showing an example of notification according to some embodiments.
FIG. 9 shows an example of how NCS session IDs, TNs, user IDs and other data could be mapped at a CPE gateway and at an application server according to some embodiments.

FIG. 8 is a communication diagram showing one example of notification in a session-based network (e.g., as part of a NCS or SIP session). In particular, FIG. 8 shows the call flow to receive personalized notifications for a voice call at an end device based on a user profile. Shared end devices in a local network (e.g., the local network shown for premises 110 in FIG. 1) will use the personalized audio and visual indicators stored in the profile of a called user to notify that user of an incoming call. At line 8-1, CPE gateway 111 is booted and forwards its MAC address or other identifier to application server 118. The example of FIG. 8 assumes that user profiles have already been created (e.g., as described in connection with FIG. 6) and are mapped to the TNs of the account associated with CPE gateway 111. Application server 118 then consults user profile DB 120 and/or AMS 119 and verifies credentials and profile settings (line 8-2) and then obtains information from those profiles (line 8-3). In particular, application server 118 identifies the audio and visual indicators for each of those user profiles, user-to-TN mappings from those profiles, and other user-specific attributes. Application server 118 then forwards the user attributes to CPE gateway 111 at line 8-4. CPE gateway 111 stores those attributes for future use in generating notifications to users of incoming telephone calls and other events. If CPE gateway 111 was at this point unplugged and then plugged back in, the steps of lines 8-1 through 8-4 would be repeated.

At line 8-5, CPE gateway 111 receives an event trigger from an upstream network element indicating an incoming call directed to one of the TNs of the account associated with CPE gateway 111. If the event trigger related to a different service, it would (in at least some embodiments) have been routed to CPE gateway 111 through application server 118. Upon receiving the event trigger message, CPE gateway 111 determines the appropriate audio and visual indicators mapped to the called TN and uses those indicators to cause end devices to generate notifications of the incoming call in accordance with one or more of the profiles for which data was received at line 8-4 (line 8-6). When user A notices the audio and/or visual indicators on end device 101, user A recognizes that a call to user A is incoming (line 8-7). User A attends to the notification at line 8-8. As used herein, "attending" a notification refers to providing an input that acknowledges the notification and that may (in some cases) cause the notification to be canceled and/or cleared. A notification can be attended by accepting an incoming session or communication (e.g., answering a telephone call, accepting a new email or IM message, etc.), by rejecting an incoming session or communication, by indicating that the notification has been received but will be addressed later (e.g., transferring a call to voice mail, by acknowledging a new message notification without opening the new message, etc.), and/or by other means. End device 101 then sends a message to application server 118 via CPE gateway 111 clearing the notification at line 8-9. The notification to user A for the incoming call is the then cleared (line 8-10). CPE gateway 111 may also send a signal to application server 118 indicating that the notification can be cleared (not shown). Other elements of the call setup are not shown in FIG. 8, but may be in accordance with known internet telephony call setup procedures. If user A attend the notification in line 8-8 by accepting the incoming call, the call would continue after the notification was cleared at lines 8-9 through 8-10.

FIG. 9 shows one example of how NCS (Network-based Call Signaling) session IDs, TNs, user IDs and other data could be mapped at CPE gateway 111 and at application server 118. The first NCS session ID (NCS ID 1) is mapped a first TN (TN1). TN1, which is also the default number for CPE gateway 111 (as discussed in more detail below), is mapped to user A (i.e., is linked to user A by user A's profile). In the example of FIG. 9, user A is also logged into the local network of CPE gateway 111 (through an end device not indicated in FIG. 9). In a similar manner, NCS ID 2 is mapped to TN1 (a non-default number) and user B, with user B also being logged in. NCS ID 3 is mapped to TN3 and user C, who is not currently logged in.

When there is a new telephone call, email message, instant message or other type of event associated with one of the services provided to users associated with a particular account, a visual and/or audio notification of that event will be provided for a reasonable amount of time so that the event can be noticed and differentiated by the appropriate user(s). For example, a notification of an incoming telephone call to a TN mapped to user A will have audio and/or video indicators specified by user A's profile and may be generated on multiple end devices. Once user A attends to and clears that notification on one of those end devices, the visual notification will be cleared and discontinued on all the end devices. If there are other pending notifications for other events and/or other users, audio and/or visual notifications for those notifications will continue to be provided on other end devices, and will also be provided on the device just utilized by user A to attend a notification if that device is not still in use (e.g., if user A attended the notification by directing the call to voice mail). If there are multiple pending notifications, they may be played in a predefined sequence (e.g., based on order of receipt at application server 118 or CPE gateway 111). When all users attend their notifications, the visual alert indicators will be turned off on all the handsets.

Notifications could be provided in various ways. For example, distinct visual and audio indicators could be provided for each type of event when used by a single user. By way of illustration, a user may specify one combination of audio and visual indicators for telephone call notifications and a different combination of audio and visual indicators for instant messaging notifications. Distinct audio and visual indicators could also be used to identify a user to whom a notification is directed. For example, user A's profile may indicate that user A is mapped to TN1, has specified song 1 as a ring tone and red as a visual indicator, and identifies handset end devices 101 and 102. User B's profile may indicate that user B is mapped to TN2, has specified song 2 as a ring tone and blue as a visual indicator, and also identify handset devices 101 and 102. An incoming call to TN1 would result in playing of song 1 and display of red on devices 101 and 102. An incoming call to TN2 would result in playing of song 2 and display of blue on devices 101 and 102. A call to TN1 followed by a call to TN2 before the TN1 call is answered would result in devices 101 and 102 each playing song 1 while displaying red for a first time period, followed by playing song 2 while displaying blue for another time period, with the cycle repeating until one of the notifications is attended or times out (e.g., if a caller hangs up).

Figure 10:
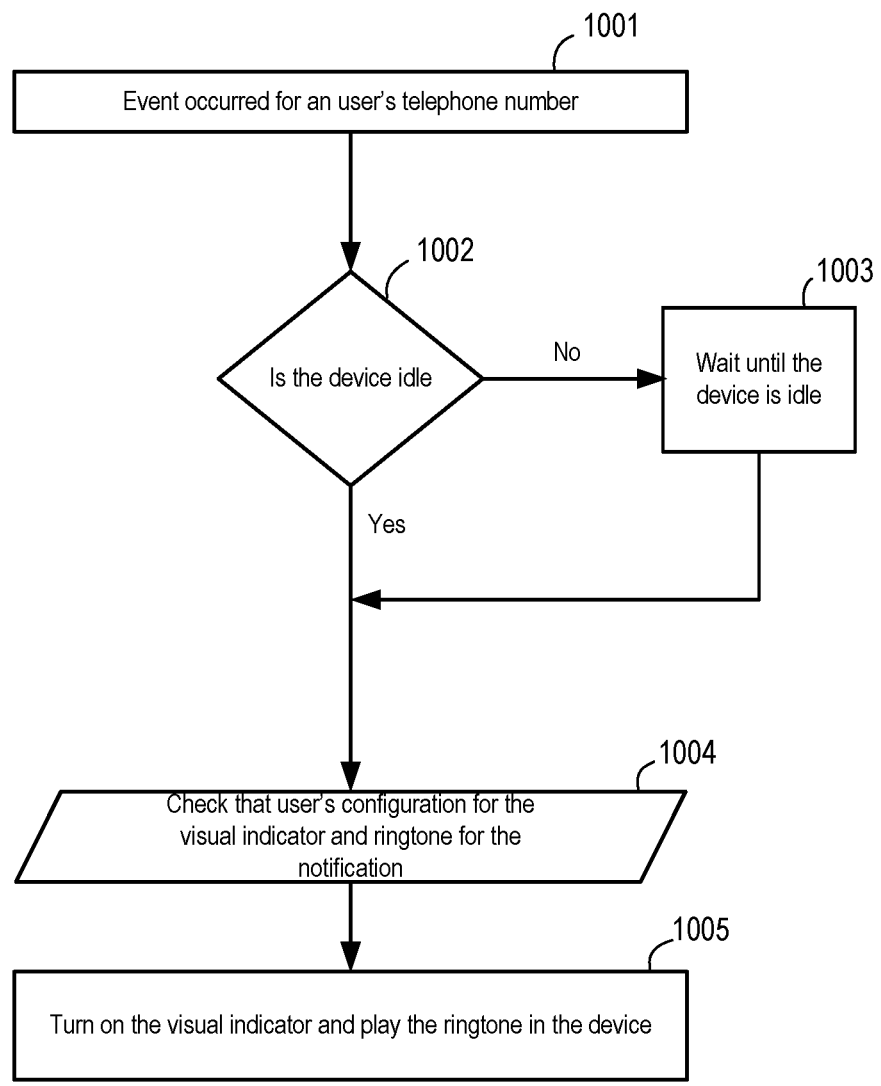
FIG. 10 is a flow chart illustrating operations performed by a CPE gateway to create a notification according to some embodiments.

FIG. 10 is a flow chart illustrating operations performed by CPE gateway 111 to create a notification of a call to TN1 on end device 101, which is mapped to user A in the user A profile. CPE gateway 111 would simultaneously perform similar operations with regard to additional end devices mapped in user A's profile. In block 1001, CPE gateway 111 receives a message indicating an incoming call to TN1. In block 1002, CPE gateway 111 determines if end device 101 is idle. If so, CPE gateway 111 proceeds on the yes branch to block 1004 and determines the correct audio and visual indicators. Those indicators may have been previously stored (e.g., as described in connection with FIG. 8). CPE gateway 111 then causes device 101 to provide a notification of the incoming call with those indicators (block 1005). If device 101 had not been idle in block 1002, gateway 111 would have proceeded to block 1003 and waited until device 101 became idle, at which point gateway 111 would have then proceeded to block 1004. If the caller were to hang up before CPE gateway 111 transitioned from block 1003 to block 1004, the notification provided in block 1004 could be of a missed call. Operations similar to those of FIG. 10 could be performed for other types of notifications or to provide notifications of multiple pending events. If CPE gateway 111 received notifications in block 1001 of a call to TN1 and to TN2 (as described above in a previous example), the audio and visual indicators for both calls would be determined in block 1004 (song 1/red and song 2/blue), and the notifications would be provided in sequence in block 1005.

Figure 11:
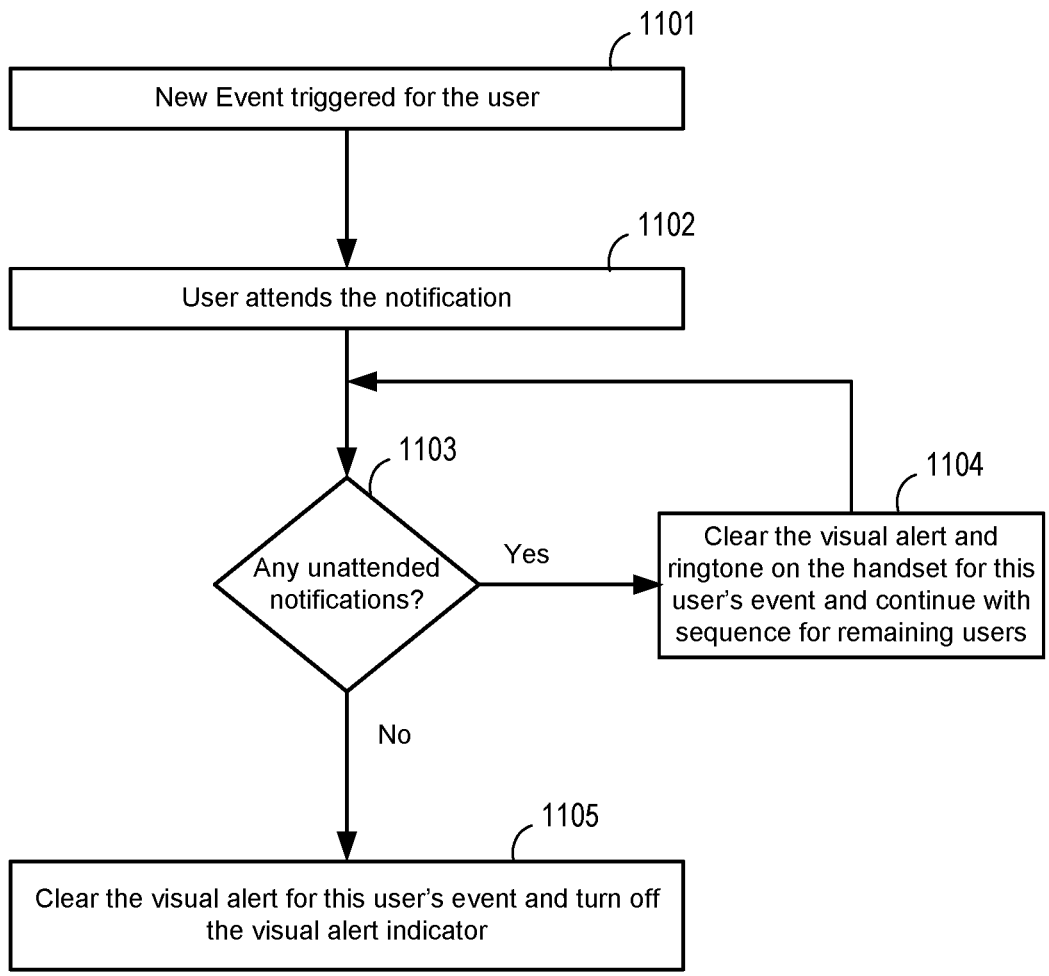
FIG. 11 is a flow chart illustrating operations performed by a CPE gateway according to some embodiments when a user attends a notification.

FIG. 11 is a flow chart illustrating operations performed by CPE gateway 111 when a user attends a notification. As with the example of FIG. 10, CPE gateway 111 may perform the operations of FIG. 11 in parallel for multiple end devices. CPE gateway 111 receives a message indicating an incoming event for user A in block 1101 and forwards a notification with the appropriate indicators. CPE gateway 111 receives an indication in block 1102 that the user has attended the notification. In block 1103, CPE gateway 111 determines if there are any additional unattended notifications for user A. If not, CPE gateway 111 proceeds on the "no" branch to block 1105, clears the notification (including, e.g., sending an appropriate message to application server 118), and causes the end device to discontinue the indicators. If there are additional unattended indicators, CPE gateway 111 proceeds on the "yes" branch to block 1104, clears the notification attended in block 1102, and provides the next notification (or sequence of notifications).

Once a notification is attended by a user, the notification may be cleared on the device utilized for attending the notification and on all other devices. Notifications as described above could also be provided in SIP-based IMS networks. Notifications with audio and/or video indicators could be provided on other types of devices. In some embodiments, notifications with only audio or visual indicators might be provided through some devices (e.g., audio only in an end device without a display screen, visual only for devices the user has specified in a profile as visual-only, etc.).

Figure 12:
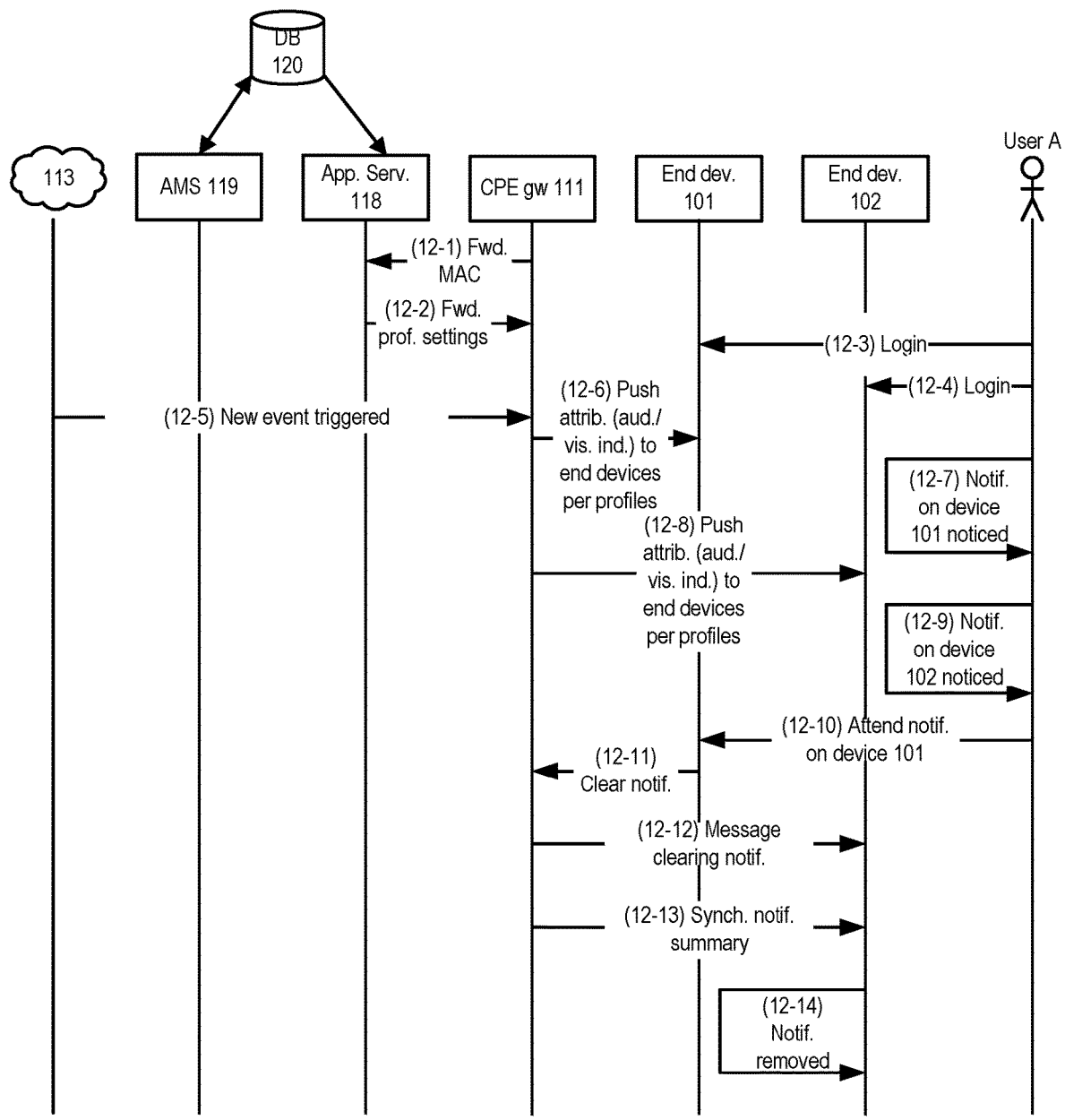
FIG. 12 is a communication diagram showing notifications to multiple devices and synchronization of notification status according to some embodiments.

FIG. 12 is a communication diagram showing notifications to multiple devices and synchronization of notification status. CPE gateway device 111 is booted and forwards identifying information to application server 118 at line 12-1. Application server 118 verifies the identifying information for CPE gateway 111 via AMS 119 and DB 120 (not shown), receives profile information from DB 120 via AMS 119 (also not shown), and forwards profile settings to CPE gateway 111 for users associated with an account linked to CPE gateway 111 at line 12-2. User A logs in with end device 101 at line 12-3 and with end device 102 and line 12-4. At line 12-5 CPE gateway 111 receives a message indicating an event trigger and that references one of the user identities in the user A profile. In some embodiments, the message received by CPE at line 12-5 would come from a CMS or other element in network 100 for a voice call, but would come through application server 118 for other types of services. CPE gateway 111 consults the profile data cached at line 12-2 and determines the appropriate audio and visual indicators, and then causes device 101 to produce a notification using those indicators (line 12-6). User A notices this notification at line 7 but does not yet attend. CPE gateway 111 causes device 102 to produce a notification (using the same indicators) at line 12-8, which user A notices without attending at line 12-9. User A attends the notification on device 102 at line 12-10, resulting in device 102 signaling same to CPE gateway 111 (line 12-11). CPE gateway 111 may also signal application server 118 that the notification has been attended (not shown). CPE gateway 111 then signals device 101 to clear the notification (line 12-12) and synchronizes a notification summary (described below) at device 101 (line 12-13). Device 101 then shows the notification removed (line 12-14). As in previous drawing figures, FIG. 12 does not show other call-set up signaling messages and messages containing voice data that would be transmitted between CPE gateway 111 and a CMS or other network element.

Figure 13:
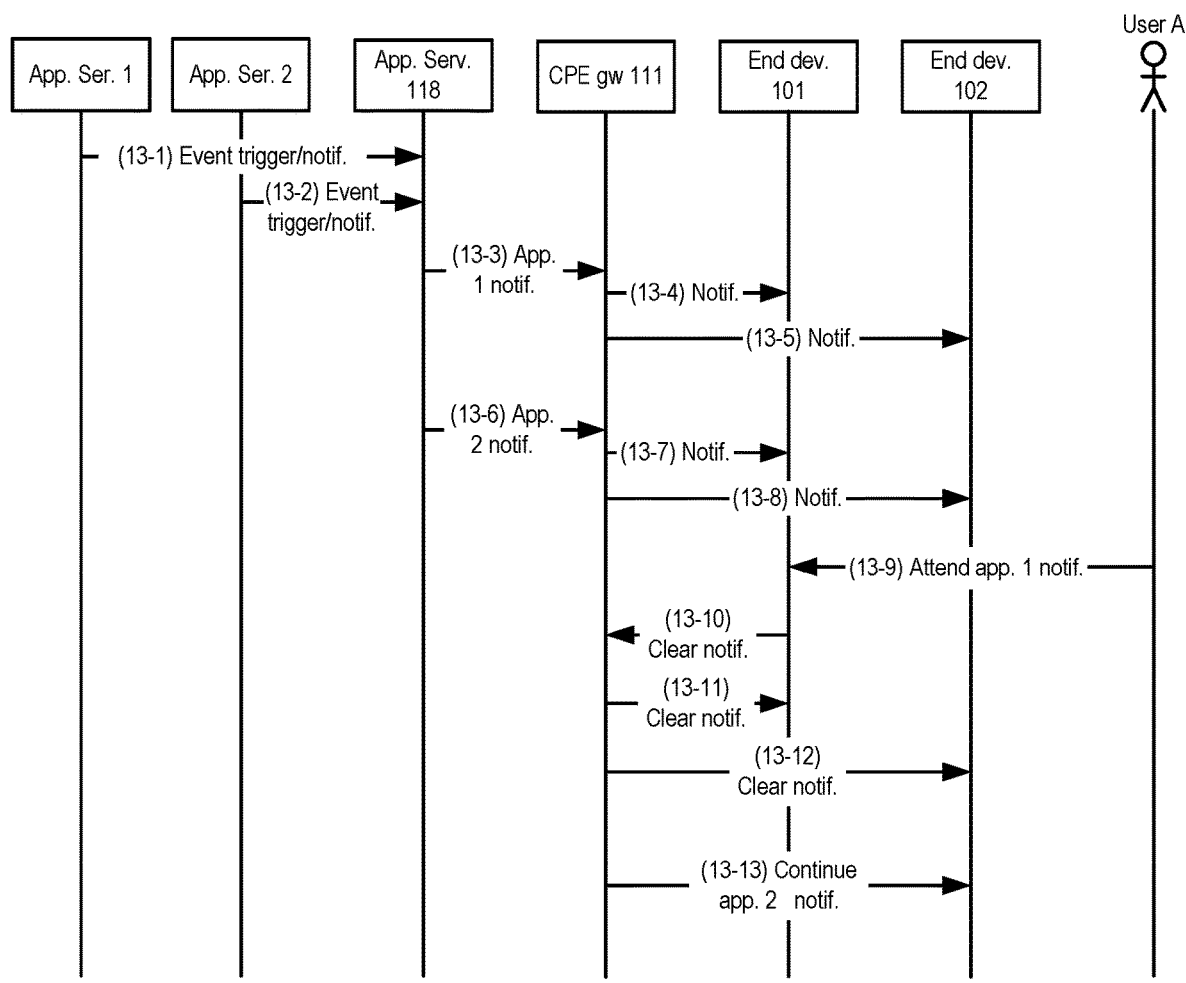
FIG. 13 is a communication diagram showing information flows, according to some embodiments, when identities, services and user profiles are overlaid so as to provide delivery of notifications and content from multiple services to multiple destinations.

In some embodiments, identities, services and user profiles can be overlaid so as to provide delivery of notifications and content from multiple services to multiple destinations. FIG. 13 is a communication diagram showing information flows in one such scenario. The example of FIG. 13 assumes a profile such as is shown in FIG. 2 (e.g., mapping user A to TN1 and the services shown in field 207 of FIG. 2 and specifying notifications to devices 101-104). At line 13-1 application server 118 receives a notification from a first application service (e.g., an email). Application server 118 receives a notification from a second application service at line 13-2 (e.g., a news update for the news service specified in the user A profile). The example of FIG. 13 further assumes that profile information for user A has previously been stored at CPE gateway 111 in a manner such as shown in FIG. 8. In other embodiments, application server 118 could retrieve user A profile information from user profile DB 120 and/or AMS 119 upon receipt of the notifications of lines 13-1 and 13-2. Application server 118 provides the email notification to CPE gateway 111 at line 13-3, whereupon CPE gateway 111 causes devices 101 and 102 to provide email notifications with the appropriate audio and visual indicators for user A (lines 13-4 and 13-5). Notifications would also be provided through devices 103 and 104 if those devices could accommodate such notifications, but devices 103 and 104 are not further discussed in connection with FIG. 13. Application server 118 provides the news notification to CPE gateway 111 at line 13-6, with CPE gateway 111 causing devices 101 and 102 to provide the news notifications with the appropriate audio and visual indicators for user A at lines 13-7 and 13-8. User A attends the email notification on device 101 at line 13-9. This is forwarded to CPE gateway 111 (lines 13-10), which clears the email notification (lines 13-11 and 13-12) and continues the news notification (line 13-13). If user A discontinues use of device 101 before the news notification is attended, CPE gateway would then cause device 101 to resume the news notification.

Various features in some embodiments offer multiple advantages over many pre-existing systems. In many existing systems where users might wish to receive notifications at multiple end devices from multiple sources, delivery mechanisms are specific to the service and to the device. In such systems, notifications are often not synchronized or coordinated. For example, one end device may receive a notification long after that notification has been received by and attended on a different end device. As another example, a notification may be simultaneously received at two end devices, but will continue to show on one of those devices after being attended on the other of those devices. As yet another example, a user receiving multiple notifications from multiple different sources may be forced to separately retrieve information about notifications from each of those sources and/or be forced to individually configure notification preferences using a separate interface and/or connection for each source. By consolidating notifications at the network level and forwarding those notifications according to a user profile maintained at the network level, these and other concerns can be addressed.

In some embodiments, each user can access a user-specific notification summary GUI to obtain information about all pending notifications. In some embodiments, and as discussed below, that summary GUI will provide a consolidated and scrollable summary of pending alerts with links to obtain additional information about each notification. Because the alert summary is generated at each end device from information maintained in a consolidated form at the network level, attending a notification on one end device will cause the notification summary to be appropriately updated if accessed from any other end device. As with other aspects of the manner in which network services are provided, a user can configure his or her notification summary, with such configuration information being maintained in the user's profile.

As indicated above, a user can configure a profile to specify the types of notifications that the user wishes to receive and/or the devices to which certain types of notifications should be provided. A user could similarly configure a notification summary to include information about certain types of notifications but not include information about others.

In some embodiments, a user can also configure a profile to control numerous other aspects of the manner in which notifications are provided and the manner in which such notifications are reflected in a notification summary For example, a user can configure a profile so that notifications and/or notification summaries are prioritized based on class or type of notification (e.g., the service instantiating the notification, whether the notification is of a new call or message), based on state of the notification (e.g., the number of unread emails referenced in an email notification), the level of notification intensity, the staleness of the notification (e.g., the time since the notification was initially provided), the current activities of the user, etc. A profile could also be configured to provide a cursory level view of notifications and/or indications of whether notifications have been attended.

In some embodiments, the severity of a notification will be set by the provider or initiator of the event causing the notification, but a user may be able to override such severity settings for some or all notifications (e.g., all non-emergency notifications). In some embodiments, emergency notifications may be accompanied by a specific audio and/or visual indicator even if a user has configured his or her profile to not provide any audio or visual notifications.

Figure 14:
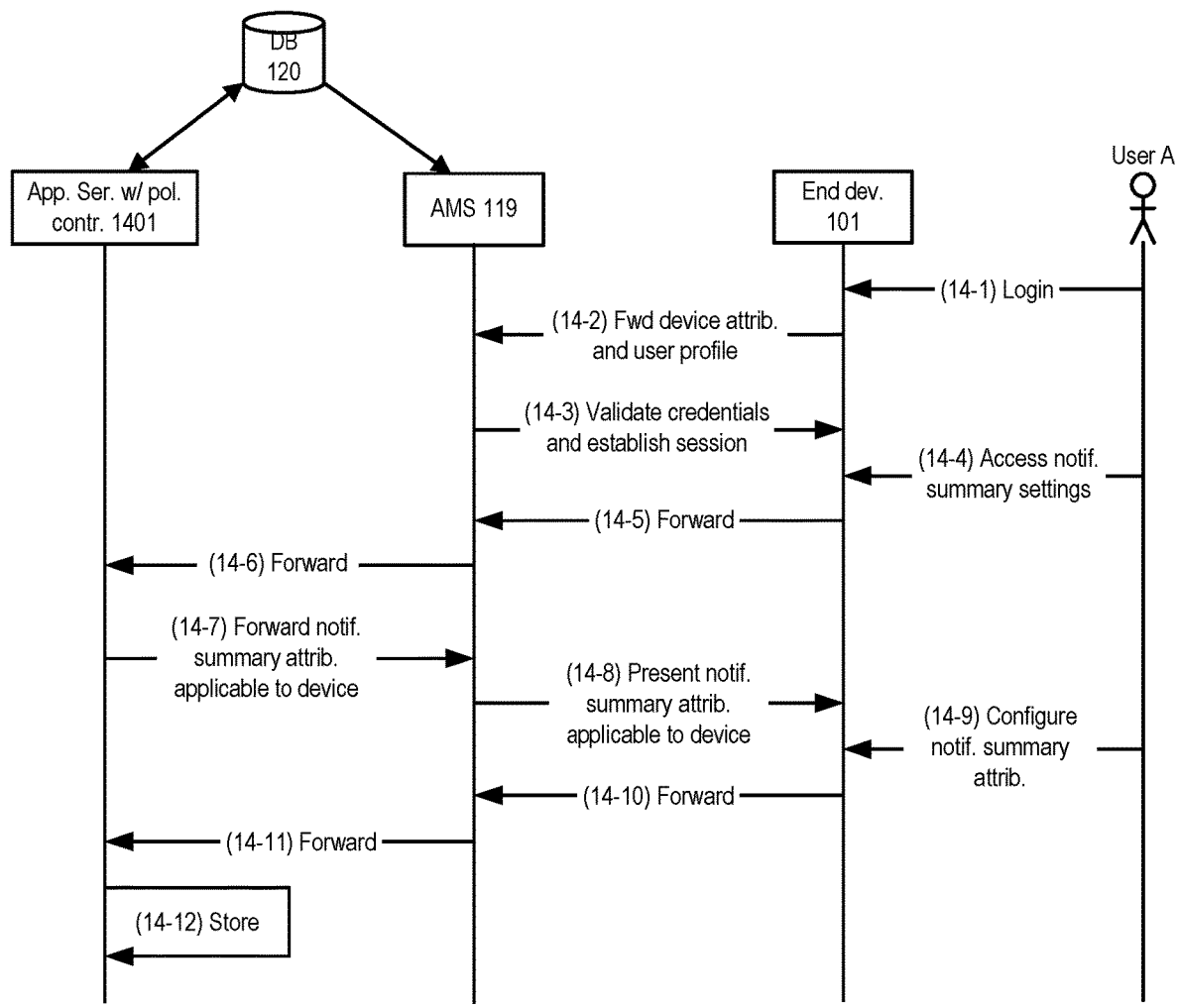
FIG. 14 is a communication diagram showing user configuration of notification summary attributes according to some embodiments.

FIG. 14 is a communication diagram showing user configuration of notification summary attributes. The user logs in using end device 101 at line 15-1. This is forwarded to AMS 119 via CPE gateway 111 (not shown) at line 14-2. The user credentials are validated by AMS 119 and a profile configuration session established (line 14-3). The user then accesses the notification summary settings in the profile configuration session (line 14-4), which access request is forwarded to AMS 119 (line 14-5) and to an application server with policy control 1401 (line 14-6). Application server with policy control 1401, which could be the same as application server 118 (FIG. 1) or could be a separate server, implements policies specified by the user profile. At line 14-7, notification summary attributes for the user are forwarded to AMS 119, which then provides those attributes through the profile configuration session GUI to device 101 at line 14-8. The user makes changes to the notification summary attributes at line 14-9, which are forwarded to AMS 119 at line 14-10, and to application server with policy control 1401 at line 14-11. At line 14-12, the attributes are stored. In some embodiments, modification of notification summary aspects of a user profile is completely conducted by AMS 119, with AMS storing any modifications in DB 120, and with application server 118 or application server 1401 then accessing the modifications.

Figure 15:
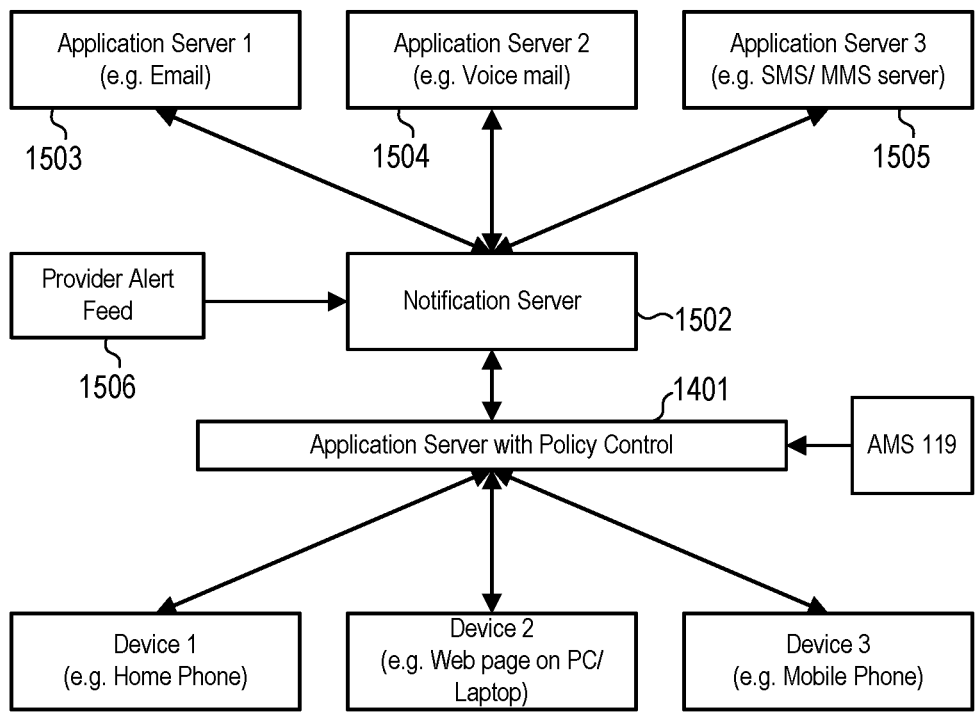
FIG. 15 shows architectural elements of a network implementing notifications and notification summaries according to some embodiments.

FIG. 15 shows architectural elements of network 100 implementing notifications and notification summaries according to some embodiments. Application server with policy control 1401, which may be part of application server 118 of FIG. 1 or a separate server, controls the notification system of network 100 so as to deliver notifications to end devices in accordance with appropriate profile data. Server 1401 also provides the notification summary GUI to end devices via, e.g., WML. Additional aspects of the notification summary GUI are provided below. Notification server 1502, which may also be a part of application server 118 from FIG. 1 (e.g., a separate set of programming routines in server 118) or a separate server, consolidates notifications from multiple servers and provides them to application server 1401. Notification server 1502 also receives status updates for notifications from end devices and forwards messages to upstream network elements to modify the status of notifications so as to synchronize notifications. Such synchronization can be performed by a push or pull model. In a pull model, a notification summary is updated from the network whenever an end device initiates the notification summary GUI. In a pull model, notification server 1502 pushes changes to end devices whenever any notification state is changed. Application servers 1503, 1504 and 1505 are in the network cloud 113 of FIG. 1, and represent servers that initiate various types of notifications. Server 1503 is an email server, server 1504 is a voice mail server, and server 1505 is an SMS/MMS server. Provider alert feed 1406 pushes notifications to end devices from the operator of network 100. Notifications from alert feed 1506 could include emergency messages, advertisements, etc.

End devices can be configured to display notifications and the notification summary GUI. In some embodiments, data caching at the end devices or a CPE gateway can be employed to reduce bandwidth consumption. In some embodiments, notification data will not be stored on an end device, but some end devices can be configured (either directly or through a profile) to store notification information. Notification information stored on an end device might not be synchronized, however. End devices in some embodiments may implement a client application to receive and display notifications from application server 1401 and to send the actions/commands related to those notifications so that such notifications can be updated in network 100 and synchronized across devices.

In some embodiments, each of application server 1401, AMS 119, notification server 1502 and end device clients can be implemented as software services in a component based model for easy portability across platforms and devices.

End device client applications may connect to application server 1401 using any of various messaging protocols, and can be implemented as a browser-based application. Other types of display applications could be used, however. Indeed, notifications could be conveyed through end devices in a variety of different manners. As but one example, various available operating systems provide functions and APIs to deliver messages to multiple clients. In some embodiments, application server 1401 can support the server functionality to deliver notifications to multiple clients by using OS-specific messaging methods. As another example, notifications can be delivered to multiple clients by implementing a standard set of protocols between application server 1401 and end devices using application level protocols. Each end device provides a unique interface and a protocol suite for receiving notifications and sending commands via a reverse path to an application server in the upstream network. For example, a notification summary screen can be delivered to an end device using protocols such as WML to DECT hand sets or mobile phones, an OCAP based transaction model to deliver to a STT and a client-server model to deliver to PC soft phones, etc. As yet another example, component based models (e.g., JAVA DCOM or MICROSOFT .NET) could also be used. Distributed components could expose interfaces as web services (e.g., SOAP/XML) and notifications could be delivered via such interfaces.

Simple Network Management Protocol (SNMP) provides options for delivering alerts and traps to a Network Management Server via a standard interface between the SNMP agent and the server. In some embodiments, notification server 1502 can be configured as an SNMP management server and application servers configured as SNMP agents. Notification server 1502 would receive notifications from each application server and deliver those notifications to application server 1401 for policy update before delivery to end devices. Application server 1401 applies policies and acts as a proxy to forward notifications to end devices. Application server 1401 could be configured as a management server and use SNMP PUT methods to deliver the notifications to each end device. Notifications could be implemented as SNMP OID trees for management by notification server 1502 and application server 1401.

Figure 16:
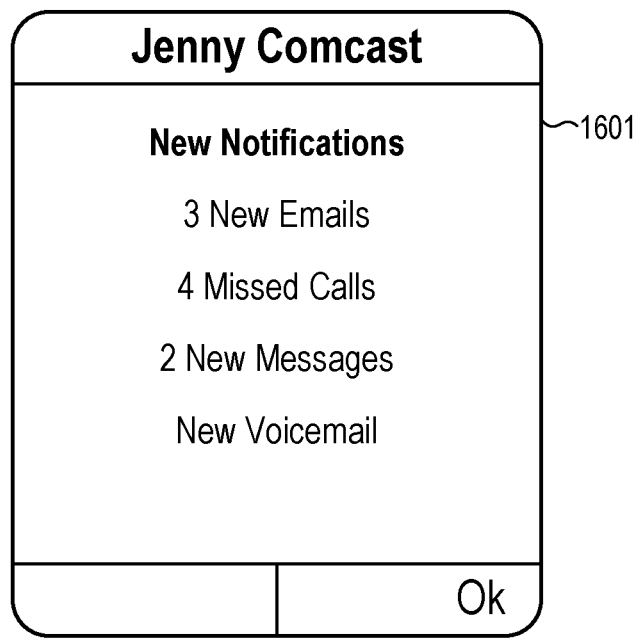
FIG. 16 shows a notification summary GUI according to some embodiments.

FIG. 16 shows a notification summary GUI 1601 that could be presented on, e.g., end device 101 according to some embodiments. In the example of FIG. 16, the user has three new emails, four missed calls, two new IM messages, and a new voicemail. By selecting a hyperlink on the line entry for new emails, the user is provided with a subsequent GUI for retrieving and viewing those emails. If there are more unread emails than can be displayed on a single screen, the subsequent GUI may be scrollable so that the user can choose which email(s) to open. In a similar manner, selecting a hyperlink on the line entry for missed calls may provide a list of calls (which list could also ne scrollable if necessary). Selecting a hyperlink on the line entry for new messages leads to a scrollable GUI with those new messages. Selecting a new voicemail hyperlink could cause any pending voicemails to be played in sequence and/or could provide a list of such voicemails (e.g., identified by calling number and time). If there were additional types notifications (e.g., notifications of available news updates, a notification that there is a new daily horoscope available, etc.), GUI 1601 could itself be scrollable.

Figure 17:
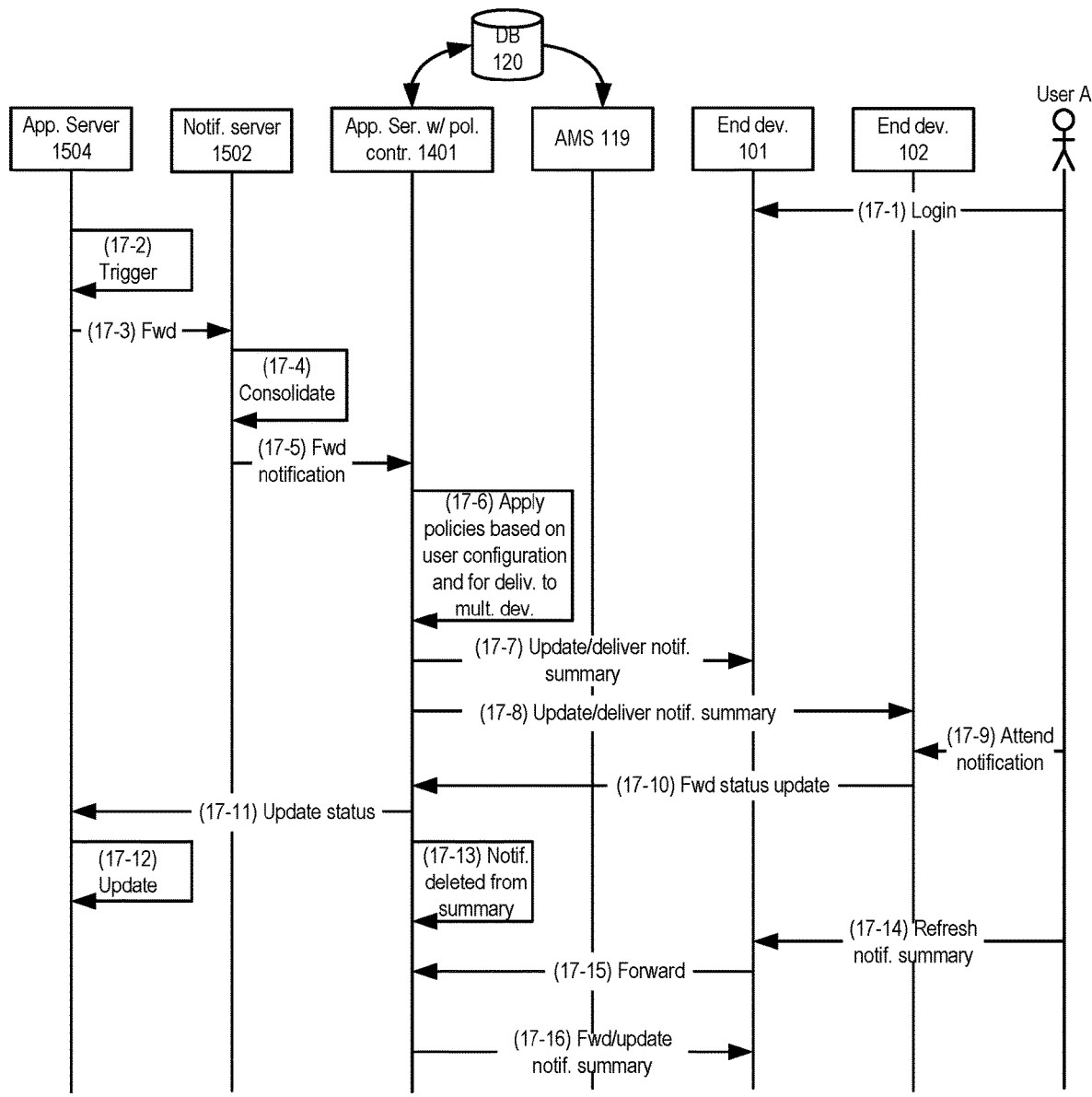
FIG. 17 is a communication diagram showing delivery and synchronization of notifications across devices according to some embodiments.

FIG. 17 is a communication diagram showing delivery and synchronization of notifications across devices. User A logs in using end device 101 at line 17-1. Application server 1504 triggers a new notification at line 17-2 and forwards the notification to alert notification server 1502 at line 17-3. Alert notification server 1502 consolidates the notification with other notifications (if any) at line 17-4 and then forwards the consolidated notifications to application server 1401 at line 17-5. Application server 1401 then applies user A policies to configure a notification summary for delivery to end devices 101 and 102. A notification summary (that includes the notification from line 17-3) is then delivered to end devices 101 and 102 via CPE gateway 111 (not shown) at lines 17-7 and 17-8. User A attends the notification in the notification summary at line 17-9, which results in device 102 transmitting a notification status update that is forwarded to application server 1401 (line 17-10). Application server 1401 then updates server 1504 as to the status of that notification (line 17-11). Server 1504 updates the notification status at line 17-12. At about the same time, application server 1401 deletes the just attended notification from the notification summary At line 17-14, user A refreshes the notification summary on end device 101, which then forwards a request for an updated summary to application server 1401 at line 17-15. Application server 1401 forwards the updated notification summary (which does not include the notification just deleted at line 17-13) at line 17-16.

Notifications can take many forms. In addition to the notification formats described above (e.g., audio and visual indicator, pop-up messages, etc.), notifications could be in the form of a hyperlink added to a web page, text added to a region of a television screen (e.g., if the television is connected to a STT), audio and/or visual indicators presented through a portable media player or during a game played on a game console or on a computer, etc.

In some embodiments, after a user attends a notification by taking appropriate action (e.g., listening to a voice mail, retrieving a new message, acknowledging a new call or message without responding, etc.), the notification is removed from the notification summary and the next highest priority notification is displayed.

As previously indicated above, an operator of network 100 may assign multiple TNs to a particular account. For example, the network 100 operator might assign 5 separate TNs to the account associated with premises 110. Each of those TNs can be linked to a particular user in that user's profile, and one of the TNs can be designated as a default TN. In some implementations of the embodiment of FIG. 1 and of other embodiments described herein, telephony service is VoIP and is provided to a premises over an HFC plant. In theory, the number of simultaneous calls that can be conducted by end devices at a particular premises using separate TNs is only limited by network bandwidth. In some cases, however, a particular premises may be limited to a number of simultaneous voice calls that is less than the total number of TNs assigned to the account for that premises.

In some embodiments, the default TN is assigned to the primary user, and the remaining TNs for an account are individually assigned to other users. As previously discussed, such TN assignment can be performed by making appropriate entries in each user's profile. In the absence of other profile restrictions (e.g., in the absence of a primary user preventing some users from making calls on some TNs), any user can make a call using any TN. If a user logs in to a device, calls by the user will by default employ that user's TN. If that user's TN is already in use, the user can select another TN not in use. If a person makes a call on a device without having logged in (and assuming no other users have logged in on that device), the default TN will be used if the default TN is available. The following are examples of potential use cases according to some such embodiments:

Use Case 1: A user has not logged into the system and the default TN is available for use. The user makes the call using the default TN.

Use Case 2: A user logs into an end device with his or her credentials. The user's TN is available for making a call and will be used for making calls.

Use Case 3: A user logs into an end device with his or her credentials. The user's TN is in use. There are fewer calls in progress than the maximum number of simultaneous calls allowed from CPE gateway 111. The user selects any one of the available TNs for making the call. Even though the available TN and line is used for making a call, the logged-in user's profile name and attributes are used for making the call for recording and notification.

Use Case 4: A user logs into an end device with his or her credentials. The user's TN is in use; if all lines are in use, the user will not be able to make any call from his profile name A user may also be permitted to join ("barge-in") an ongoing call. In particular, a logged in user can join other ongoing and active call sessions routed from a common CPE gateway by selecting a session. The session can be displayed for a group based on a user profile or a TN for a group of users. A user can select an ongoing call from a displayed list of active sessions and will be allowed to join if any necessary approvals are obtained and any applicable control rules (e.g., restrictions in a user profile regarding barge-in to certain TNs) are satisfied. The number of users participating in a single session is in some embodiments only limited by the number of physical channels connecting a CPE gateway with end devices, and is not dependent in the number of user profiles associated with that CPE gateway. A user can select an ongoing call from a variety of groups, such as a list of user profiles in a family or other community of users associated with an account, a list of user profiles in a buddy list, and a list of user profiles in a social network.

Figure 18:
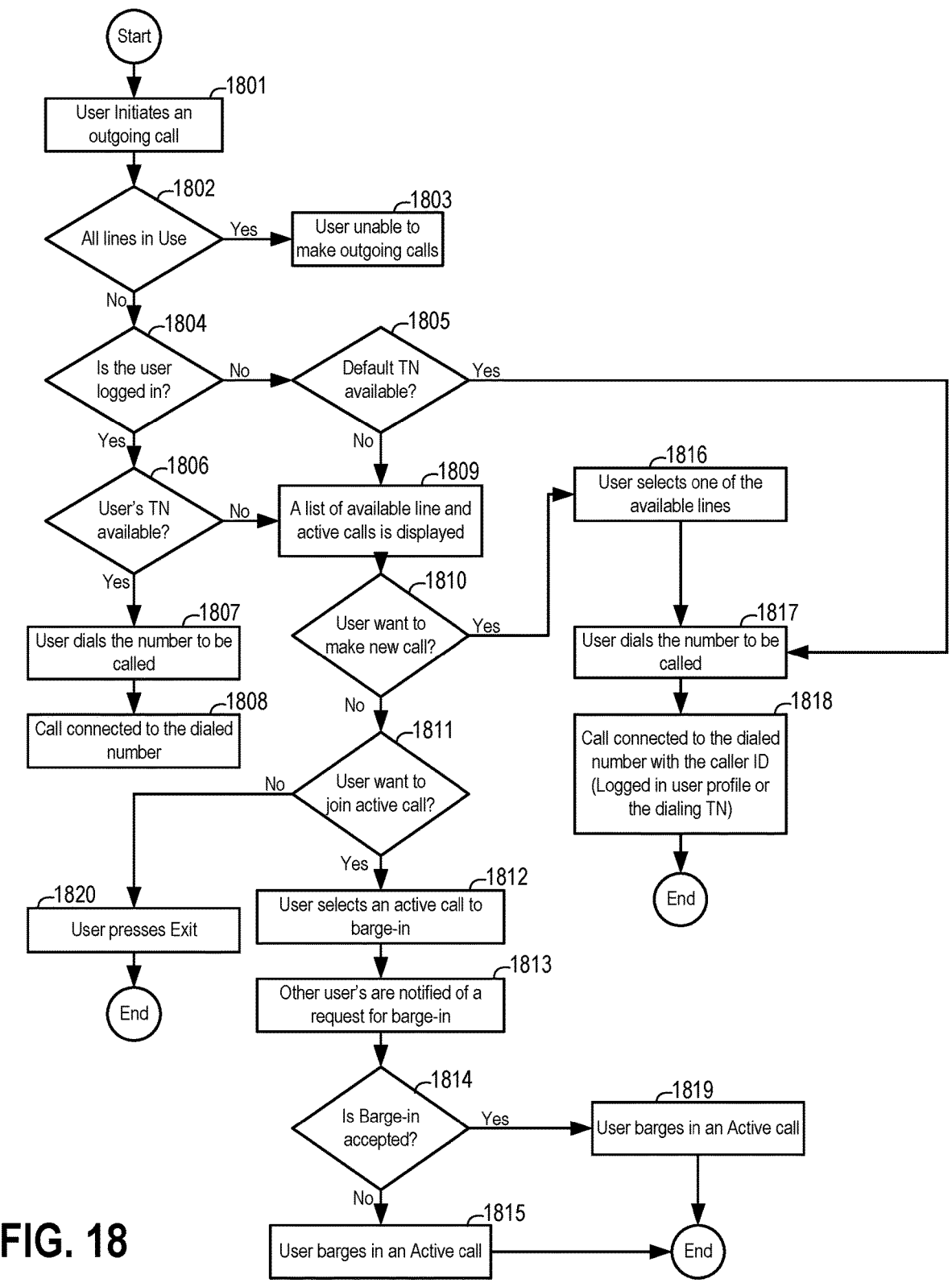
FIG. 18 is a flow chart showing events and operations performed as part of telephone number selection and/or barge-in according to some embodiments.

FIG. 18 is a flow chart showing events and operations performed as part of call selection and/or barge-in according to some embodiments. At block 1801, user A attempts to initiate an outgoing call with end device 101 by, e.g., touching the display screen 505 or pressing an appropriate button. At block 1802, a determination is made whether all TNs for the premises 110 account are in use. This determination can be made in CPE gateway 111. If all TNs are in use, user A is unable to make an outgoing call ("yes" branch to block 1803). If all TNs are not in use, flow proceeds on the "no" branch to block 1804, and it is determined whether a user is logged in to end device 101. The determination of block 1804 can similarly be made in CPE gateway 111. If a user is logged in, flow proceeds on the "yes" branch to block 1806. Note that the logged in user could be user A or could be another user. In block 1806, CPE gateway 111 determines if the TN of the logged in user is available. If not, flow proceeds to block 1809, which block is described below. Otherwise, flow proceeds to block 1807, where CPE gateway 111 causes end device 101 to indicate that the login user's TN is available, and user A dials the number to be called. The call is connected via CPE gateway 111 and upstream network elements at block 1808.

Figure 19:
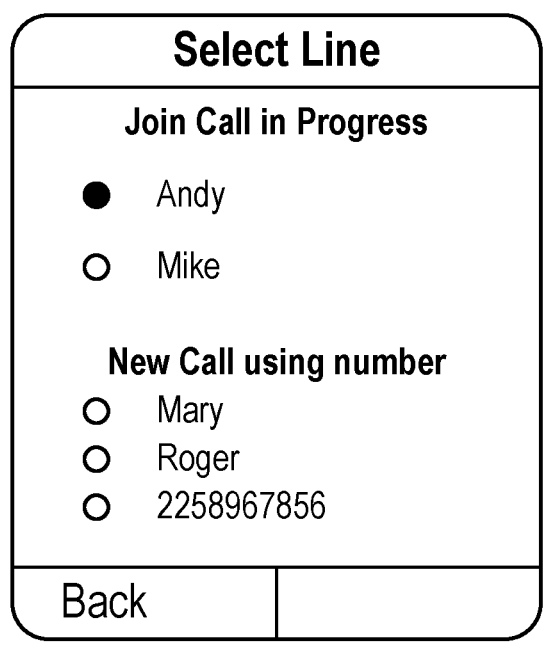
FIG. 19 is an example of a displayed list of available TNs and active calls according to some embodiments.

Returning to block 1804, if a user is not logged in, flow proceeds to block 1805 on the "no" branch. CPE gateway 111 then determines in block 1805 if the default TN is available. If so, CPE gateway 111 causes said availability to be indicated on end device 101, and user A dials the called TN at block 1817. The call is then connected in block 1818. If at block 1805 CPE gateway 111 determines that the default TN is not available, flow proceeds on the "no" branch to block 1809. At block 1809 CPE gateway 111 causes end device 101 to display a list of available TNs and active calls. An example of such a display is shown in FIG. 19. Flow then proceeds to block 1810. If user A wants to make a new call, flow proceeds on the "yes" branch to block 1816, where user A selects one of the available TNs by providing appropriate user input to end device 101. Flow then proceeds to block 1817, where the number is dialed. If at block 1810 user A does not want to make a new call, flow proceeds to block 1811. If user A does not want to join one of the active calls, flow proceeds to block 1820 and user A presses "exit." If user A does want to join an active call, an appropriate input to select an active call is provided at block 1812. In block 1813, CPE gateway 111 notifies other users on the call of user A's request to barge-in. If the barge-in is accepted (block 1814), flow proceeds to block 1819, where user A is added to the active call session. Otherwise, flow proceeds to block 1815, where CPE gateway 111 causes end device 101 to indicate that user A's barge-in request is denied.

In some embodiments, participants in an ongoing call are not provided with an opportunity to accept or reject a barge in request. In some such embodiments, a user is allowed to barge-in an ongoing call on a given TN unless there is data in that user's profile that restricts the user from barging into a call on that TN. When a user does barge-in, however, other participants in the call may be provided a with a beep or other indication that a user has joined.

In the operations described above in connection with FIG. 18, determinations and other operations performed by CPE gateway 111 in blocks 1802, 1804, 1805, 1806, 1810, 1811 and 1814 could alternately be made in another network element (e.g., application server 118 or some other network element).

When a call is made by a logged in user, the name and attributes from the logged in user's profile may be used for calling records. As indicated above, profiles can also be used to control which users may use which lines. For example, a primary user may wish to configure profiles of some secondary users to prevent those secondary user from initiating calls on certain TNs. Similarly, the profiles of some users could be configured to prevent those users from barge-in on calls on certain TNs.

In some embodiments, the TN selection and barge-in features described above are also available for other types of services. For example, a first user may allow other users to send messages or emails using the first user's email or IM identity, may allow other users to join a multi-user IM session, etc.

Figure 20:
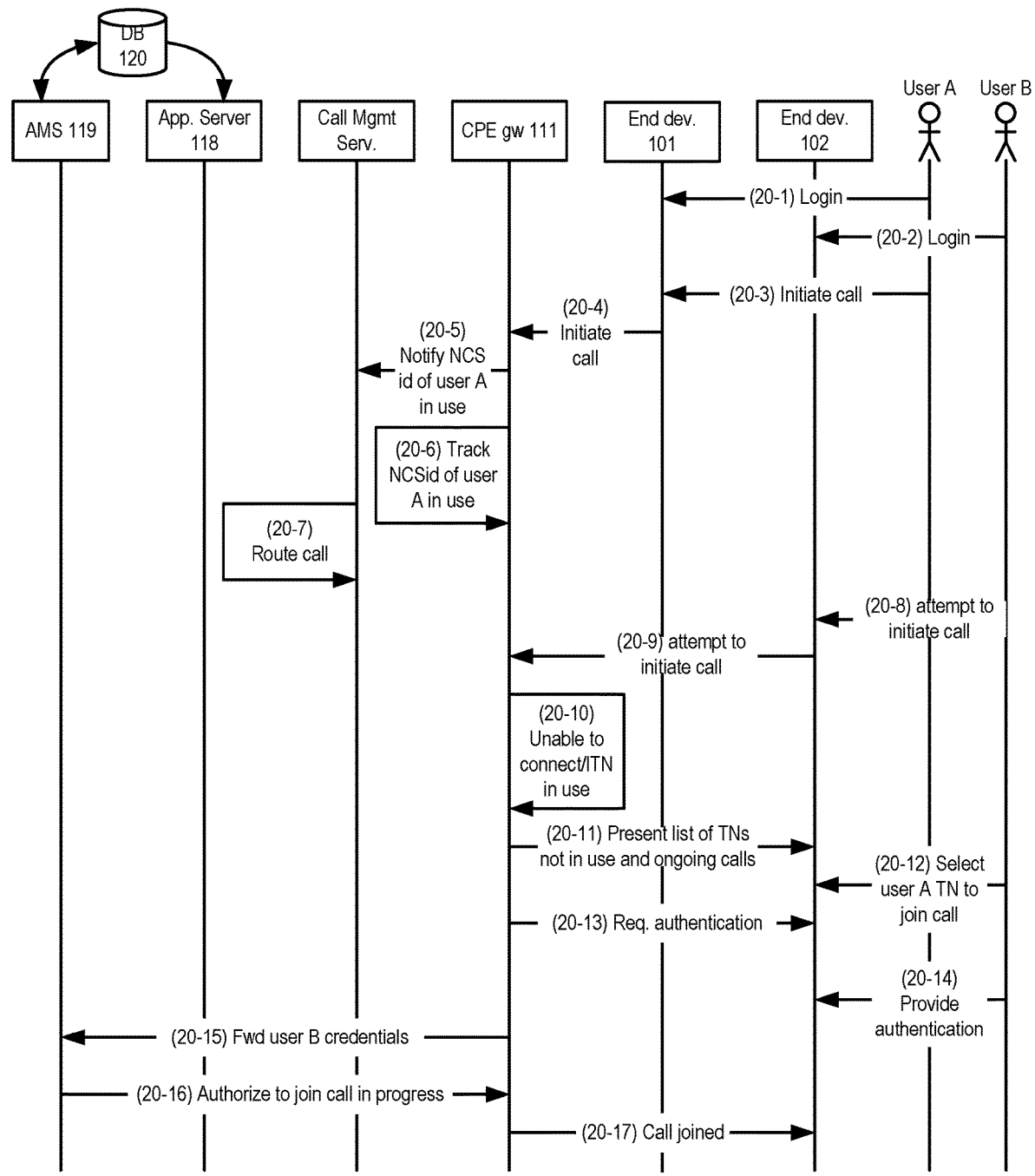
FIG. 20 is a communication diagram showing barge-in notifications across devices according to some embodiments.

FIG. 20 is a communication diagram showing barge-in notifications across devices. Users A and B login using devices 101 and 102, respectively, at lines 20-1 and 20-2. User A then initiates an outbound call using the TN of user A at line 20-3, which call initiation is forwarded via CPE gateway 111 at line 21-4 to a call management server (within network cloud 113 of FIG. 1) at line 20-5. CPE gateway 111 also tracks the session ID (e.g., a NCS ID) for the call (line 20-6). The call management server routes the call (line 20-7). The remaining steps of the call set up are not shown.

User B attempts at line 20-8 to initiate an outgoing call on device 102. Device 102 forwards a message to CPE gateway 111 indicating that user B wishes to make a call (line 20-9). At line 20-10, CPE gateway 111 determines that user B's TN (i.e., the TN mapped to user B in the user B profile) is already in use. CPE gateway 111 then causes device 102 to generate a display on device 102, similar to that of FIG. 19, indicating the TNs for which a call is in progress and the TNs which are available (line 20-11). At line 20-12 user B provides input to device 102 indicating a selection of the ongoing call on user B's TN (i.e., the call initiated by user A at line 20-3). After receiving an indication from device 102 of this selection by user B (not shown in FIG. 20), CPE gateway 111 forwards a request to device 102 requesting authentication to join the call (line 20-13). User A may, for example have restricted certain users from barge-in to calls on user A's TN. User B provides his or her username and password at line 20-14. This could be required, for example, as a precaution in case another user picks up device 102 after user B logged in. After user B's credentials are forwarded to CPE gateway 111 (not shown in FIG. 20), CPE gateway 111 forwards same to AMS 119 at line 20-15. After determining user B is authorized to barge in, AMS 119 returns an authorization to CPE gateway 111 at line 20-16, which then permits the barge-in at line 20-17. In some embodiments, the verification and authorization performed by AMS 119 in FIG. 20 could instead be performed by application server 118.

The call flow of FIG. 20 is extensible to other services, including but not limited to data services, messaging services, video services, etc.

FIG. 21 shows a table that maps various types of information regarding TNs and users associated with a subscriber account that corresponds to a particular CPE gateway. The table of FIG. 21 is generated by application server 118 (or another network element) from profile data in DB 120, and pushed to CPE gateway 111 when CPE gateway 111 is provisioned or reboots, in embodiments that employ NCS signaling. NCS signaling is known in the art and described, e.g., in various PACKETCABLE specifications available from Cable Television Laboratories, Inc. of Louisville, Colorado. Accordingly, details of NCS signaling are not included herein. A first column 2101 has fields that hold an identifier for a subscriber account. The second column 2102 has fields that each holds a NCS ID (a NCS identifier for a call session) to be mapped to a TN. The third column 2103 has fields holding TNs. Each field in column 2104 indicates whether a TN is a default TN. Each field in column 2105 holds a nickname or other alternate name that a user mapped to a TN may wish to see when information about that TN is shown on an end device. Each field in column 2106 holds the user name of a user mapped to a particular TN. The user name may be the same as or different than the nickname in column 2104. For example, a user may have a user name such as "Bob12345678" and a nickname of "Bob." Each field in column 2107 holds a globally unique identifier assigned by the operator of network 100 to a particular TN. The fields in column 2108 indicate whether a user is logged in.

CPE gateway 111 uses data in the table of FIG. 21 to determine which TNs are available. Once a TN is selected from an end device, any outgoing call from that end device will use the selected TN until the user terminates the session. Once the session is terminated, the TN again becomes free for reselection according to any profile-defined rules. CPE gateway 111 registers its MAC address and FQDN with application server 118 at provisioning or reboot. Application server 118 also receives the IP address of CPE gateway 111 through the registration process. Application server 111 uses that IP address to communicate with CPE gateway 111. Application server 118 sends the NCS table to CPE gateway 111 and updates the table as required based on profile changes. In some embodiments, for example, application server 118 may provide APIs for updating the NCS ID table with the attributes TN, profile display name and NCS ID. Application server 118 may also provide a web service interface with the provisioning system to determine the mapping of NCS ID to TN and map TN to profile name FIG. 22 is a table that is generated and pushed to CPE gateway 111 in embodiments that employ Session Initiation Protocol (SIP) signaling for call set up. The table of FIG. 22 may similarly be created by application server 118 or other element of network 100 from profile data in DB 120. In SIP-based communication, end devices may be addressed by a Uniform Resource Identifier (URI) to establish communication. The end device may have IP connectivity and be able to negotiate all capabilities to set up a session using SIP messages. In such embodiments, a user is allocated one or more Public User Identities by the network 100 operator. A Public User Identity may be either a SIP URI or a TEL URI. The Public User Identities can be used for routing the SIP signaling messages. Each user may also be assigned a Private User Identity, which is not a SIP URI and is not used for routing SIP requests, but is used for profile, login and authentication, and other purposes within network 100.

As can be FIG. 22, the table maps private user identities to public user identities, TNs and call preferences (e.g., call forwarding and other IMS preferences). Each user can be provisioned with a profile mapping the Private User Identity, the Public User Identity, a TN and personal preferences. In a specific case, the Public User Identity can be mapped to a TN itself and may be a sub use case of mapping between identities and TNs.

The profile mapping can be carried out during a service provisioning stage and can be pushed to CPE gateway 111. When end devices and TNs are shared across a group of users, the Private User Identities can be used for profile login and authentication. Public User Identities can be used to select an outgoing line/TN or URI for SIP signaling. In this way, any user can use any of the available Public User Identities to make an outgoing call.

If a particular user is permitted to use a particular Public User Identity, SIP headers can be appropriately modified to include this address as the "From" address to initiate a session.

Figure 23A:
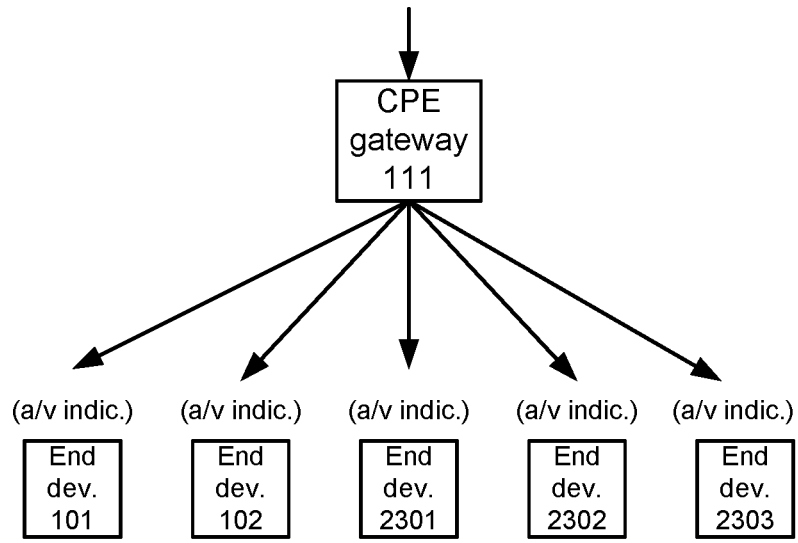
FIGS. 23A-23F show examples, according to some embodiments, of notifications in connection with multiple events and/or sessions.
Figure 23B:
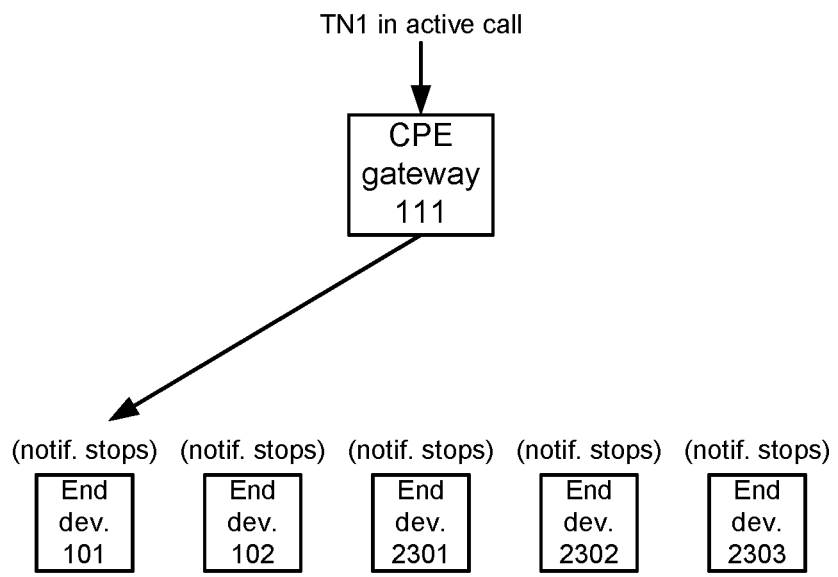

A profile-based system according to various embodiments allows simultaneous sessions when multiple calls are received for the same or for different users. For example, FIG. 23A shows an incoming call to TN1 received at CPE gateway 111. Devices 101 and 102 are idle, as are additional DECT handset devices 2301, 2302 and 2303. It is assumed for purposes of FIGS. 23A through 24F that devices 101, 102, 2301, 2302 and 2303 are mapped to users A, B and C in their respective profiles and that each user can thus receive notifications and calls (as well as other services) through any of devices 101, 102, 2301, 2302 and 2303. It is further assumed the TN1 is the number for user A (i.e., is mapped to user A in the user A profile). Because all of end devices 101, 102, 2301, 2302 and 2303 are idle in the example of FIG. 23A, CPE gateway 111 causes notifications (e.g., ring tone and visual indicator mapped to user A in the user A profile) of the incoming call to TN1 to be provided on each of those end devices. When user A attends the notification by answering the call on device 101, and as shown in FIG. 23B, all of the end devices stop ringing (i.e., CPE gateway 111 stops the notifications on all of the end devices).

Figure 23C:
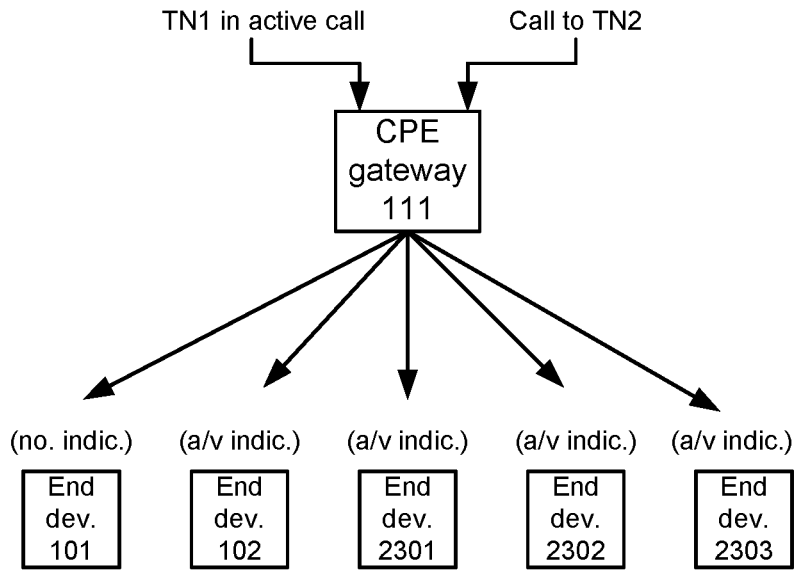

FIG. 23C shows an incoming call to TN2 while user A is still engaged in the call on device 101. The example of FIGS. 23A-23F further assume that TN2 is mapped to user B in the user B profile. Because user A is engaged in an active call, CPE gateway 111 does not cause device 101 to ring or otherwise provide a notification of the incoming call to TN2, but does cause a remaining devices 102, 2301, 2302 and 2303 to provide a notification using the audio and/or visual indicators from the user B profile.

Figure 23D:
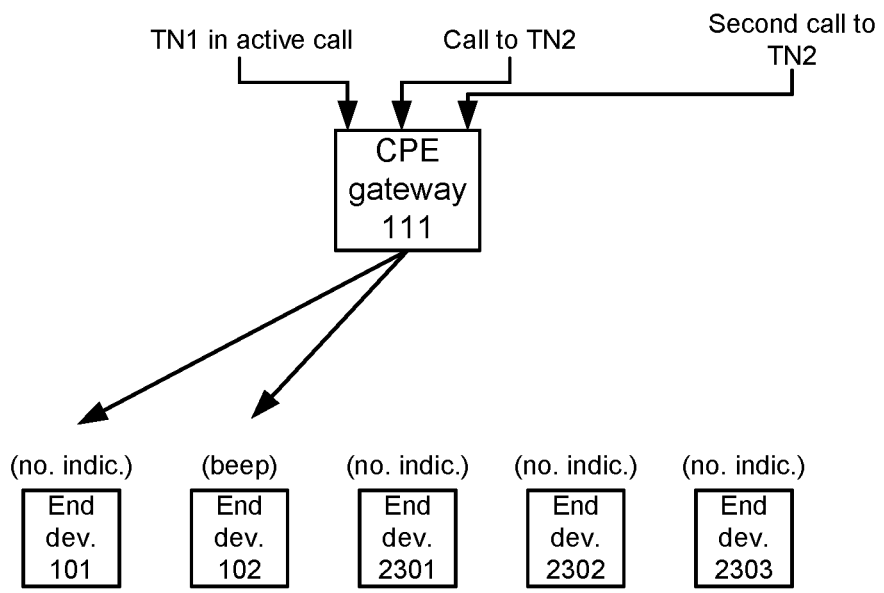
Figure 24A:
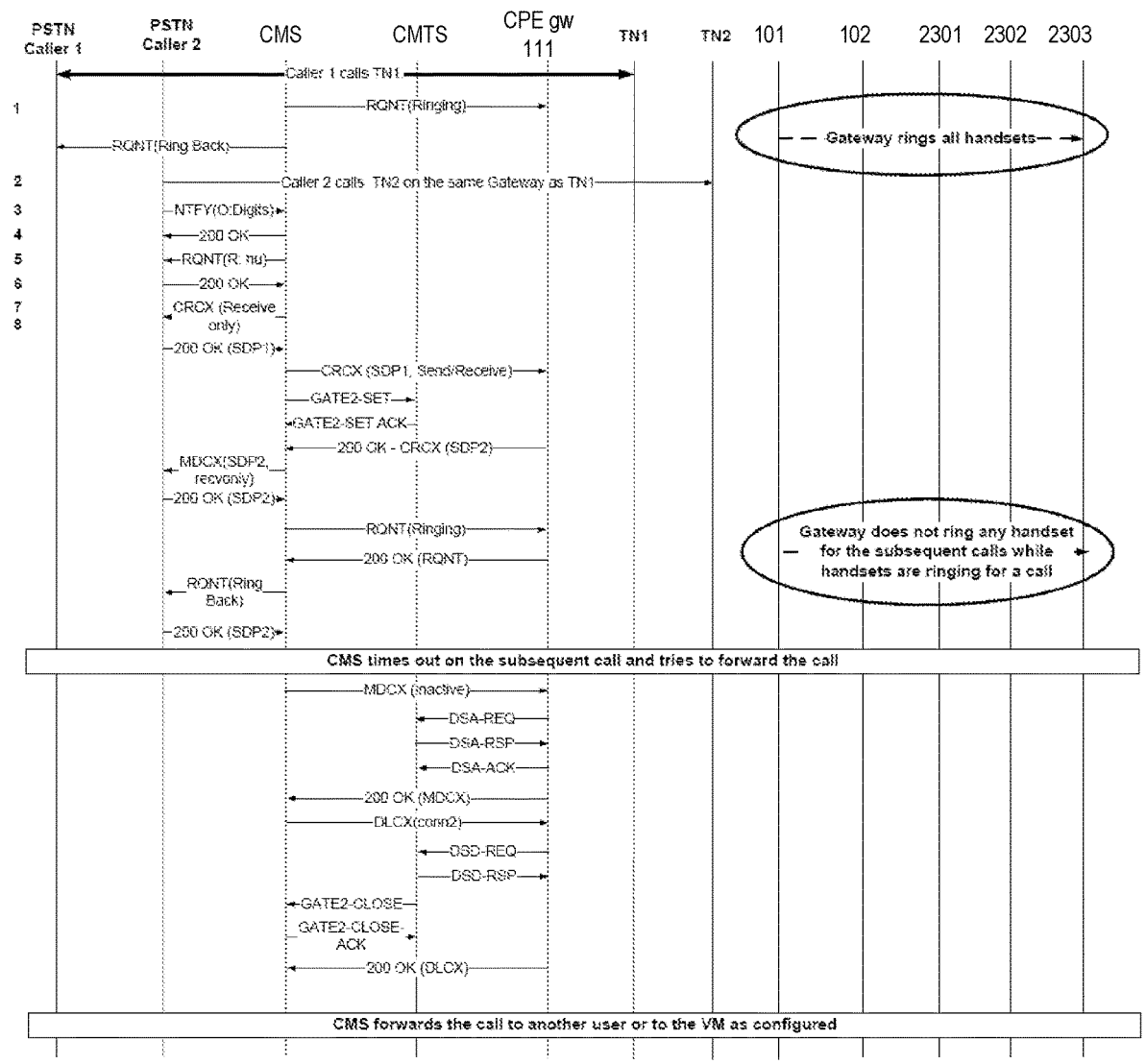
Figure 24C:
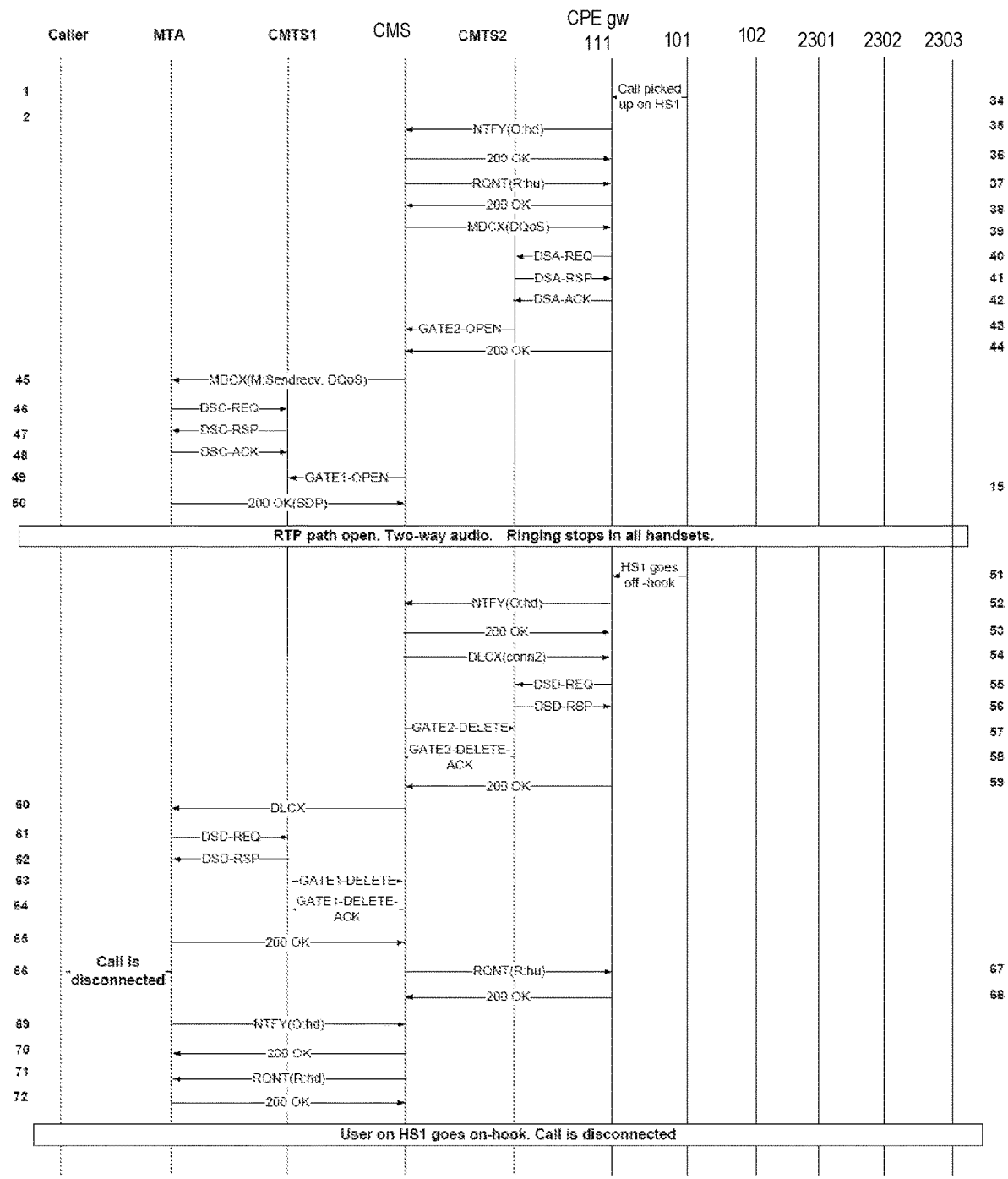

FIG. 23D shows CPE gateway 111 receiving another call for user B while the calls described in FIGS. 24A-24C are still ongoing. The second call for user B could be to another TN that is also mapped to user B in the user B profile, or could be another call to TN2. Because CPE gateway 111 knows that user B is already engaged in a call on device 102, it does not cause notifications of the second call to be provided on devices 102, 2301, 2302 or 2303. However, a call waiting tone is played for user B in device 102.

Figure 23E:
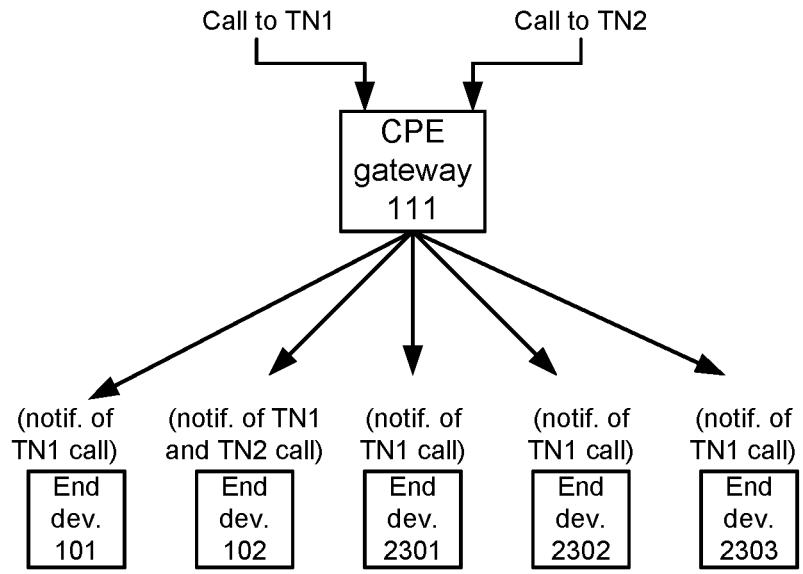

FIG. 23E shows simultaneous incoming calls to TN1 (mapped to user A in the user A profile) and to TN2 (mapped to user B in the user B profile). As indicated above, notifications for simultaneous events can be provided by sequencing indicator combinations for each of the events. For example, CPE gateway 111 could cause end devices to provide a notification of a first call using a first audio/visual indicator combination for a first period of time (e.g., 10 seconds), followed by a notification of a second call using a second audio/visual indicator combination for a succeeding time period (e.g., the following ten seconds), with the sequence then repeating until one of the notifications is attended or times out. In the example of FIG. 23E, however, user B has configured the user B profile so that device 102 is a prioritized device. Accordingly, CPE causes devices 101, 2301, 2302 and 2303 to only provide a notification of the call to TN1 with the user A audio and visual indicators. CPE gateway 111 further causes device 102 to provide alternating notifications of the call to TN1 (with the user A indicators) and of the call to TN2 (with the user B indicators). Note that a similar result would occur if the user B profile only identifies device 102.

Figure 23F:
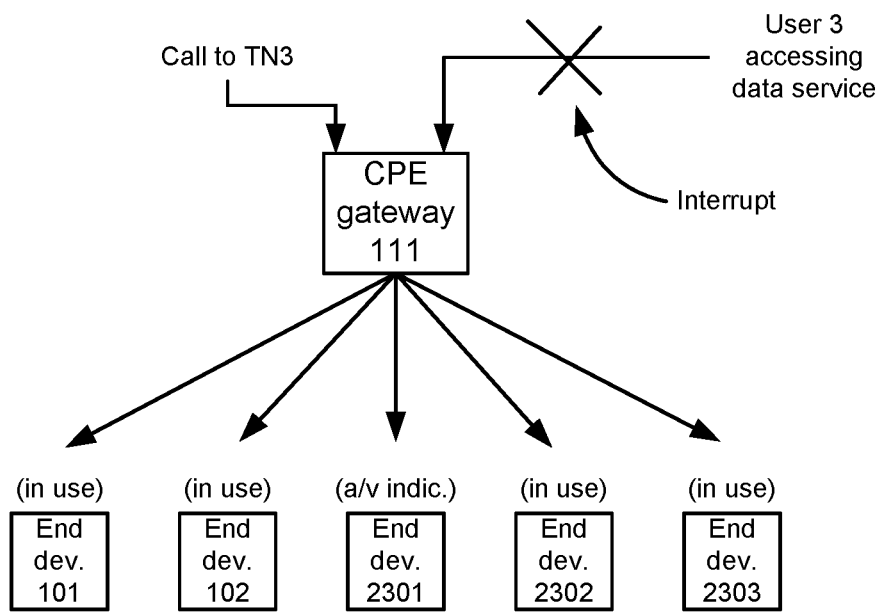

In some embodiments, a non-voice data service (e.g., email, voice mail, news service, weather services, horoscope, etc.) being provided to a device will be interrupted if a user receives an incoming voice call. This would permit, e.g., presumptively higher priority services to be preempt lower priority services. FIG. 23F illustrates one example of this feature. In FIG. 23F, user C is logged into and receiving a data service on device 2301. Devices 101, 102, 2302 and 2303 are also in use. When an incoming call for TN3 (mapped to user C in the user C profile) is received, CPE gateway 111 interrupts the data service and causes device 2301 to provide a notification of the incoming call to TN3.

As with other features, users may in some embodiments configure their individual profiles so as to define priorities for one or more services. For example, some users may decide that voice calls should not preempt certain data services.

CPE gateway 111 can allow multiple users to share a session (e.g., after successful barge-in) in various manners. If the session is being shared by end devices that communicate on the same physical layer (e.g., two DECT handsets), CPE gateway 111 may use the same physical channel for communication to both devices. Alternately, when end devices sharing a session communicate on different physical layers (e.g., a DECT handset and a computer communicating over a USB interface), CPE gateway 111 may stream media for the session to the end devices on separate channels.

Although the examples of FIGS. 23A-23F are in the context of incoming voice calls, the features shown in FIGS. 23A-23F could be extended to other services provided by network 100.

FIG. 24A shows call flow signaling, in at least embodiments using NCS signaling, to cause simultaneous ringing in response to calls originating from a Public Switched Telephone Network (PSTN). FIGS. 24B and 24C show another example of call flow, and in particular, show NCS signaling to cause ringing of multiple end devices in response to a call from within network 100. FIG. 24C is a continuation of FIG. 24B as indicated in the lower right portion of FIG. 24B.

In some embodiments, user profiles and other aspects of the systems described herein can be employed to implement a public address (PA) system to provide messages to users through one or more end devices. In some embodiments, for example, a user wishing to address other users with the PA system feature can login to an end device using his or her credentials. After providing input to the end device to select the PA system feature, the user can then select recipients of the PA message by selecting users from a contact list, from one or more predefined groups, or from a default group (e.g., all users associated with an account). Alternatively, a user could specify end devices to which the message is to be sent. The user then speaks the message into a microphone of the end device (e.g., microphone 504 in FIG. 5). The message is then sent to other recipients in accordance with their respective profiles. In some embodiments, a user can further configure additional options when sending a PA message. For example, the sending user may be able to set a priority for the message, etc.

Similarly, various aspects of the PA system can be controlled by profiles of individual users. For example, each user profile can indicate whether PA messages are accepted, the devices on which messages are accepted, priorities for various message type, and whether sessions for other services can be interrupted or superseded by a PA message. As with other types of profile data, a primary user such as a parent may have the power to set various PA system aspects of non-primary users' profiles. Thus, a parent could set children's profiles so that a PA message originating from the parent will be delivered to the child regardless of how the child might be using an end device. Profiles could also be used to store various predefined messages (or pointers to such messages) that a user might wish to send on multiple occasions. As but one example, a parent might record a message such as "come to dinner" that can be played nightly to inform children that dinner is ready.

In some embodiments, additional hardware and/or software can be added to end devices so that an audible message can be broadcast from the device if it is not currently held next to a user's ear. As but one example, DECT handset device 101 of FIG. 5 could configured so that a PA message received when device 101 is on hook (or otherwise not currently in use for a call) will cause a volume control for speaker 503 to be increased. The PA system could also operate so as to cause visual indicators to be provided by end devices in combination with an audio PA message (e.g., causing a display to flash a particular color).

Figure 25:
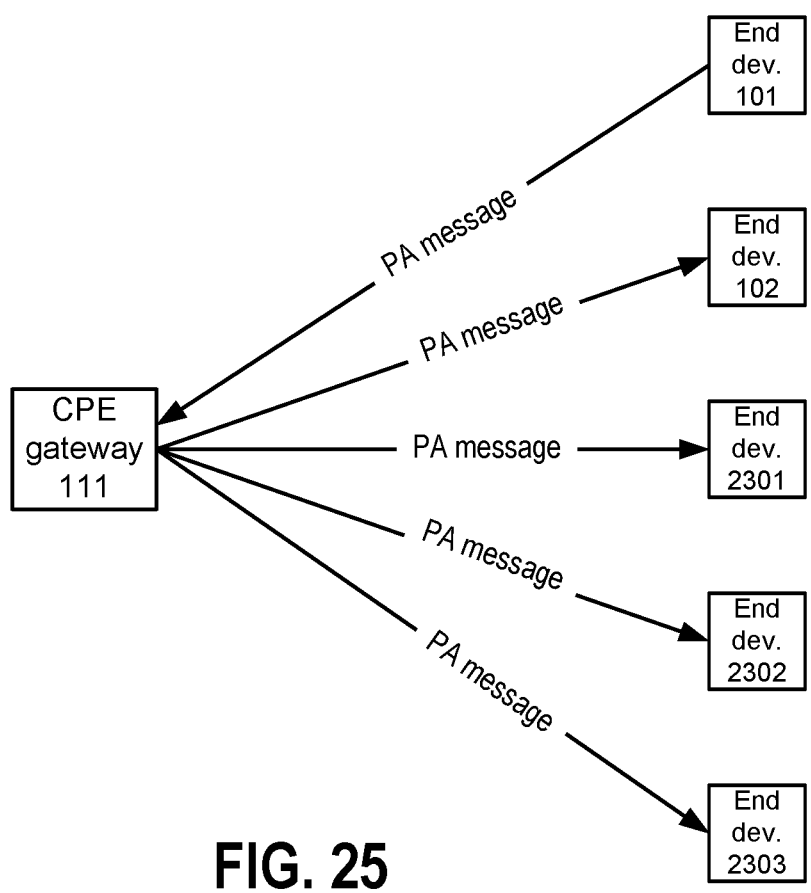
FIG. 25 is a block diagram illustrating PA message broadcast in at least some embodiments.

In one embodiment, a PA message is broadcast in a local network by a CPE gateway such as gateway 111 of FIG. 1. For example, FIG. 25 shows CPE gateway 111 and end devices 101, 102, 2301, 2302 and 2303. As in the example of FIGS. 23A-23F, each of devices 101, 102, 2301, 2302 and 2303 is a DECT handset. User A sends a PA message by selecting the PA feature in device 101, selecting the recipients, and recording a message (or choosing a pre-existing message). In this example, user A has selected users at devices 102, 2301, 2302 and 2303. User A then provides input to device 101 causing device 101 to signal CPE gateway 111 that the message should be sent. Upon receiving the signal from device 101, CPE gateway 111 causes devices 102, 2301, 2302 and 2303 to provide the PA message. In the present example, CPE gateway 111 knows the message recipients are at devices 102, 2301, 2302 and 2303 because each of the recipients is logged in to one of those devices or is involved in a voice or other session on one of those devices.

In some embodiments, CPE gateway 111 can be configured to push a PA message to all end devices for which there is an open and active physical channel with CPE gateway 111. As indicated above, handset end devices or other end devices with telephone functionality can be configured so that PA messages can played if the device is on hook. Alternatively, such a device could be configured so that a PA message will cause the device to go off hook.

If a particular CPE gateway can only broadcast PA messages over less than all open physical channels to end devices, a FIFO, round-robin or other scheduling algorithm can be used to push the PA message over each physical channel. Because a PA message is often used for one way communication and does not require a response, sequential PA message delivery may appear near real time. Message delivery could also be scheduled to incorporate intelligent routing so as to avoid message echo between end devices that are known to be near one another.

Figure 26:
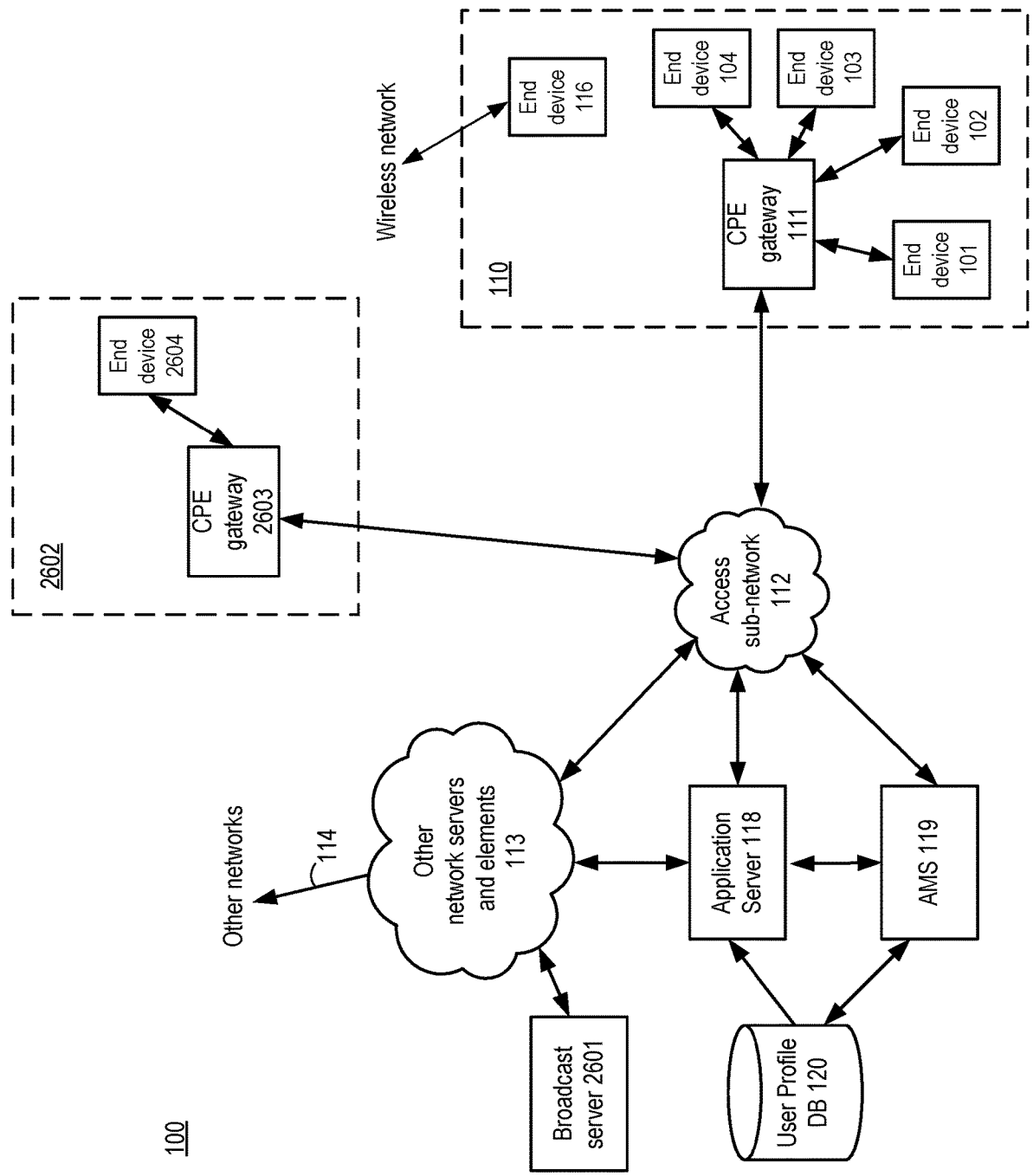
FIG. 26 shows a network with a broadcast server according to some embodiments.

In additional embodiments, a broadcast message server can be used interface with additional network elements and/or with additional networks so as to push PA messages to end devices associated with different CPE gateways and/or communicating through different networks. FIG. 26 shows a broadcast server 2601 in network 100 according to one such embodiment. Broadcast server 2601 may include hardware components such as are described in connection with FIG. 3 and store instructions causing server 2601 to carry out operations such as are described herein. An additional premises 2602 having a CPE gateway 2603 and end device 2604 are also shown in FIG. 26. The remaining elements in FIG. 26 are similar to those described previously. When user A at premises 110 wishes to send a PA message, user A logs into broadcast server 260 by providing his or her credentials. User A then selects the recipients of the message. In this example, user A selects users A, B and C currently using devices 102, 2301 and 2302, user F currently using device 116, and user G at premises 2602 currently using STT device 2604. After recording or selecting a message, user A causes device 101 to send a message to broadcast server 2601 indicating the PA message should be sent. Broadcast server then routes the PA message to the recipient devices in accordance with the recipient profiles. In the case of user A (device 102), user B (device 2301), user C (device 2302) and user G (device 2604), broadcast server 2601 sends the message to application server 118, which then sends the message to CPE gateways 111 and 2603, which in turn forward the PA message to the end devices. In the case of end device 116, broadcast server sends the PA message to the wireless network of which device 116 is a part, which network then forwards the message to device 116. In some embodiments, broadcast server 2601 could store the PA message and forward that message according to a FIFO, round-robin or other scheduling algorithm.

In some embodiments, broadcast server 2601 could be implemented as a separate process on application server 118, AMS 119, a CPE gateway, or some other network element.

Figure 27:
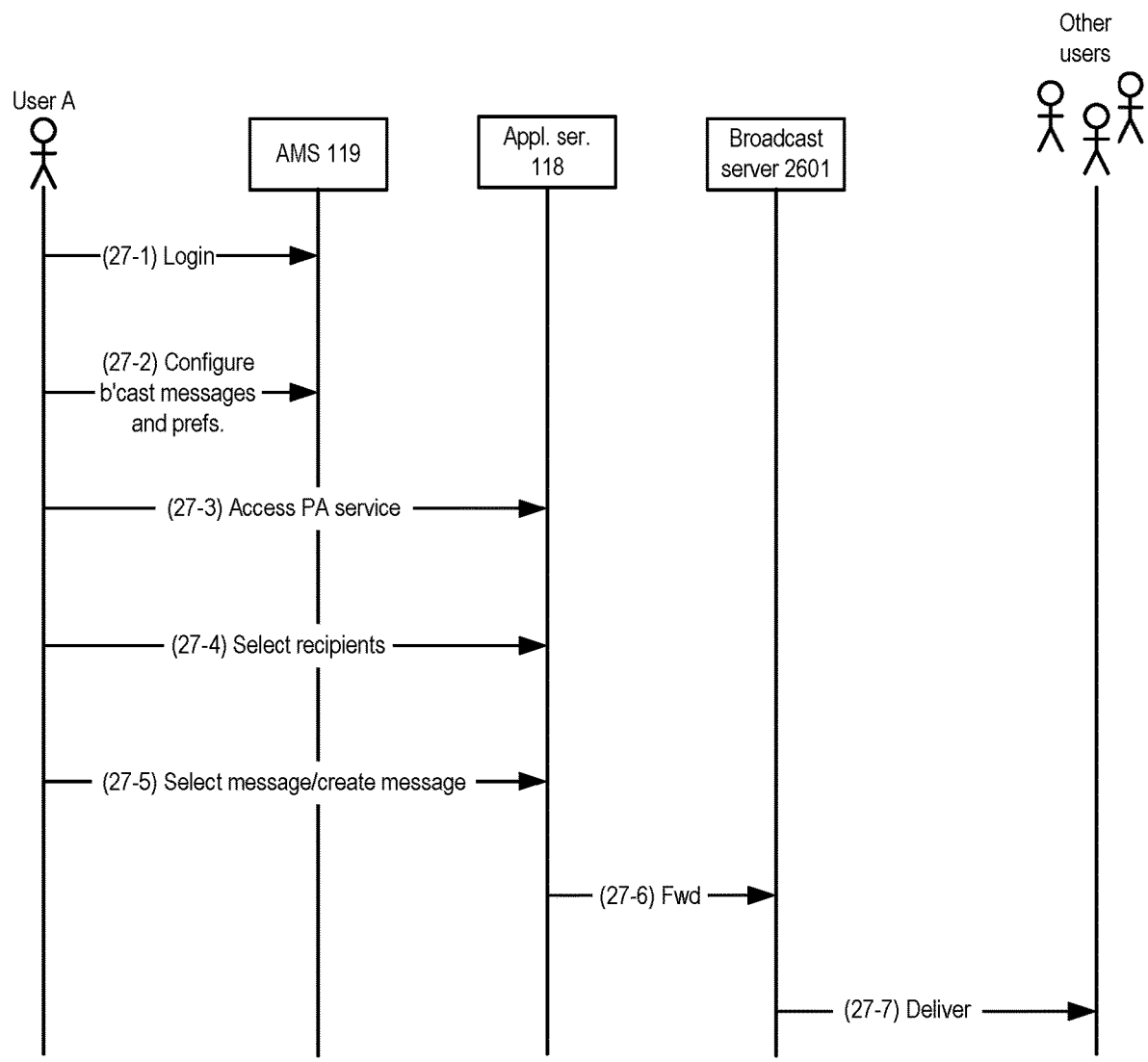
FIG. 27 is a communication diagram showing transmission of a PA message according to some embodiments.

FIG. 27 is a communication diagram showing transmission of a PA message according to the embodiment described above for FIG. 26. User A logs in to AMS 119 at line 27-1. User A then configures preferences related to the PA messaging feature. Subsequently, user A accesses the PA messaging service through application server 118, which provides a GUI and other presentation layer elements of the PA messaging service (line 27-3). User A selects a recipients of the PA message (line 27-4) and records or selects a message (line 27-5). After user A provides input indicating the PA message should be sent and a corresponding signal is sent to application server 118 (which input and signal are not shown in FIG. 27), application server 118 forwards the PA message to broadcast server 2601. Broadcast server 2601 then forwards the message (via application server 118 and/or other network elements) to the appropriate end devices.

A PA message broadcast service can include numerous additional features. In some embodiments, a set of default broadcast messages can be programmed into an end device, with each of those default messages accessible by the press of a single key to enable fast messaging. A primary user could have extra privileges, e.g., the ability to "force" other users/devices to receive a broadcast message. In some embodiments, a broadcast message may be configurable to prompt a recipient for a reply (e.g., by playing a tone after the message and/or forcing the recipient to respond). In yet some additional embodiments, a recipient of a broadcast message may be permitted to "snooze" the message by causing the message to be replayed at fixed intervals. A user could configure a profile so as to establish a PA message contacts list of user to receive broadcast messages. A user may also be able to configure a profile so as to control devices over which PA messages to the user may be broadcast and/or establish priorities for such devices (e.g., cause PA messages to first be sent to a first device, then to a second device, etc.). A parent or other primary user may have the ability to supersede other users' preferences and cause PA messages to be delivered a particular device and/or to interrupt a session of a non-primary user to cause the PA message to be delivered. For example, a primary user may have the ability to set a particular priority on a message that will case that message to be broadcast to other non-primary users regardless of those user's profile configurations or current session activity.

In some embodiments, a network-based address book service is provided. The addresses and other data for the address-book service may be stored in a centralized server, thereby enabling concurrent multi-party access and allowing a synchronized update of the same contact from multiple users. In some such embodiments, each user may have a private and a public address book, the latter being optionally shared with a group of users. A user may add contacts to the private or public address book from local search results (e.g., a "yellow pages" type of service) or from other types of services and from multiple end devices. Contact data can be stored in a centralized network server by exposing interfaces between multiple data services and the centralized network server. A synchronization engine can be used to maintain a reference to an item of contact data within the network and to permit multiple users to access the contact according to profile settings. Network-based storage permits synchronizing of any update to contact information across users and devices with minimal processing overhead. In addition to a public and private address book, a user may also create subsets of contacts within the public and/or private address books. In this manner, "favorites" lists and the like can be created.

Various data services (e.g., a yellow pages type of service, a telephony service, an email or messaging service) may interface to the contact database via an application server.

Figure 28:
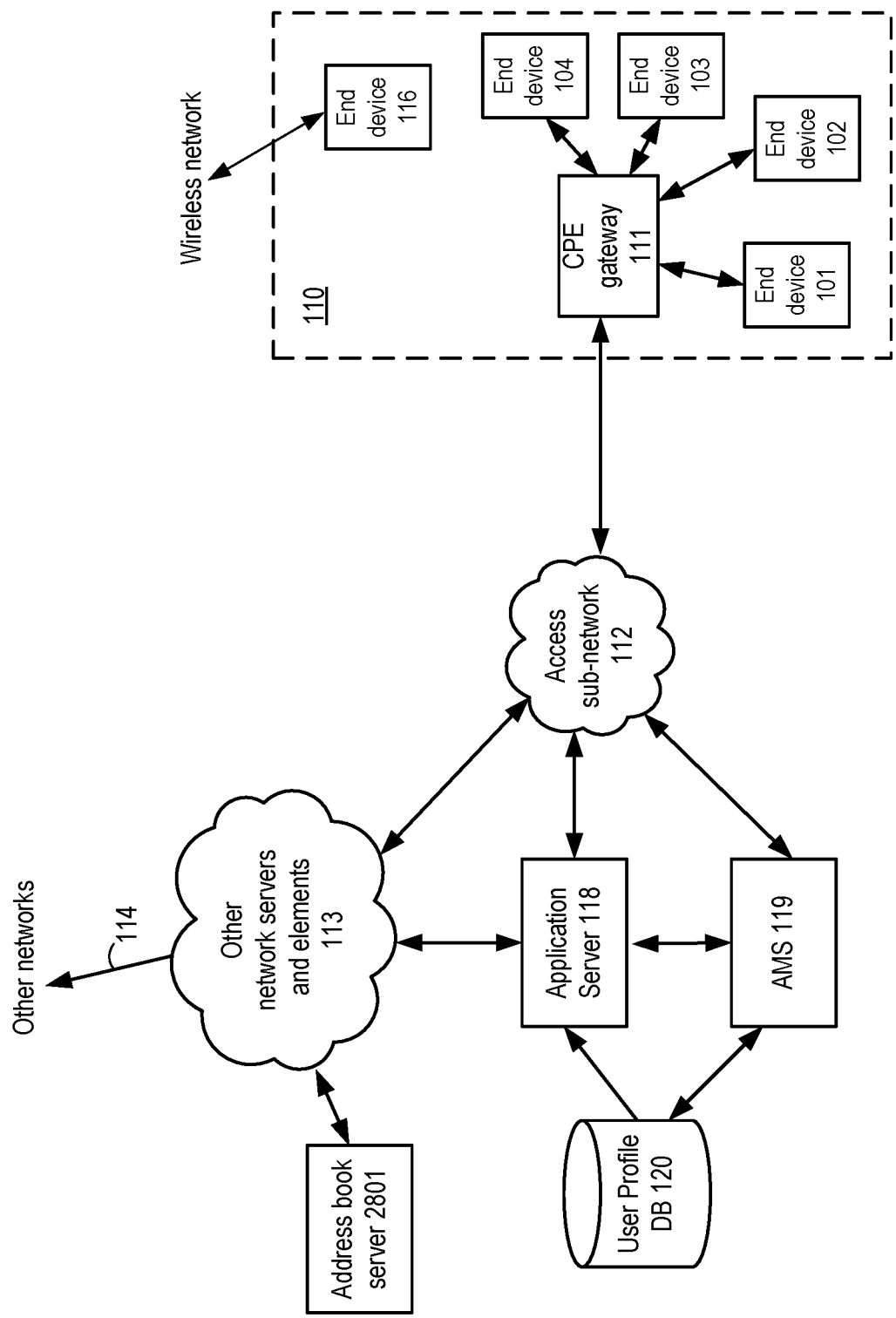
FIG. 28 shows a network with an address book server according to some embodiments.

In some embodiments, and as shown in FIG. 28, an address book server 2801 is included in network 100. Address book server 2801 includes hardware components such as are described in connection with FIG. 3. In addition to address book contact data, server 2801 stores instructions executable by one or more processors in server 2801 to carry out operations such as are described herein. Remaining elements of FIG. 28 are similar to those described in connection with FIG. 1. Different interfaces on various end devices are used to synchronize and retrieve contact data address book server 2801. Contact data in address book server 2801 can be maintained per user profiles and mapped to profiles of primary users. In some embodiments, data in address book server 2801 is accessed via application server 118.

Figure 29:
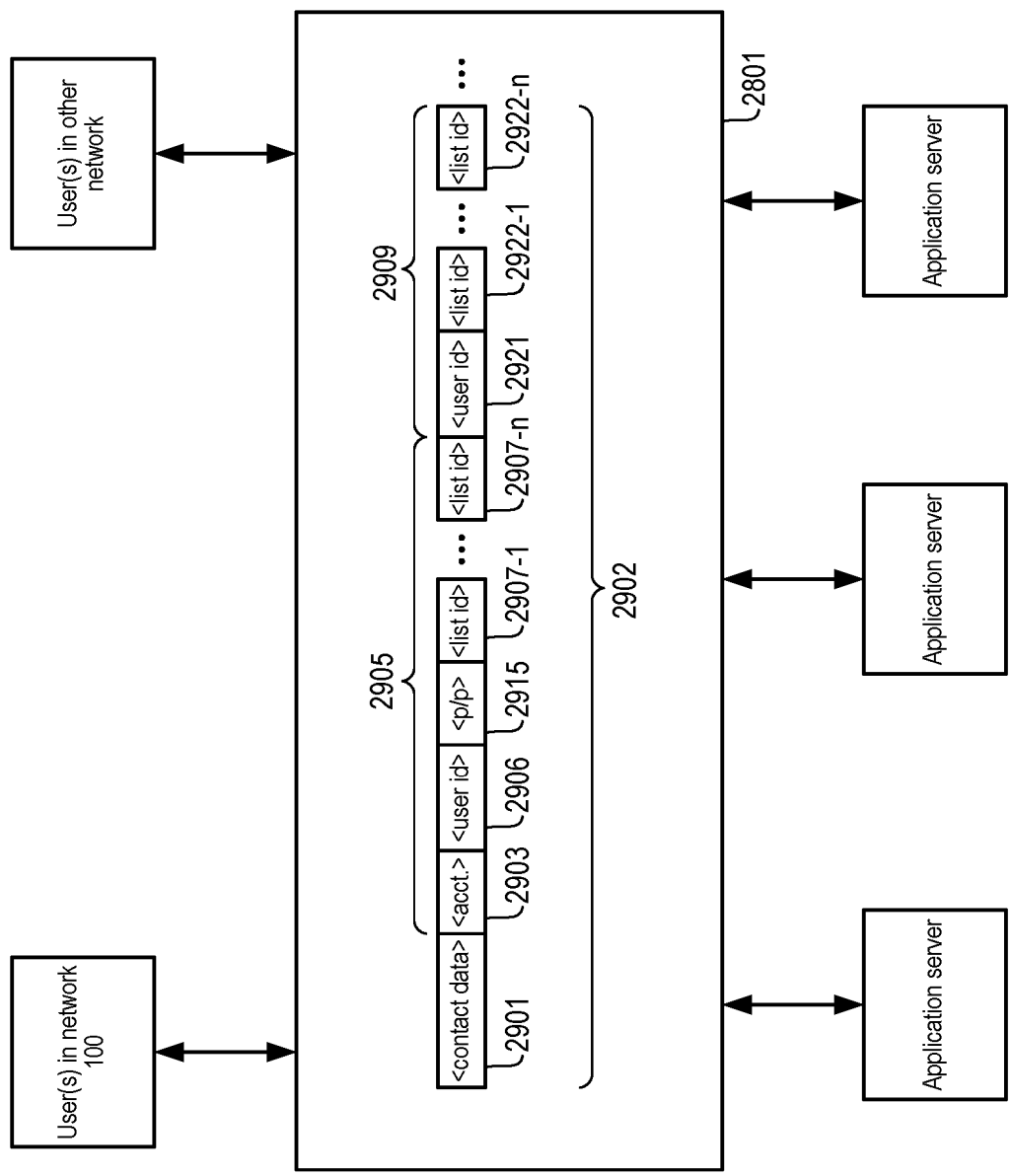
FIG. 29 shows one example of how contact data may be maintained in an address book server according to some embodiments.

FIG. 29 shows one example of how contact data may be maintained in address book server 2801 according to some embodiments. As used herein, a "contact" refers to a specific person, business or other entity with which a user in network 100 or some service in network 100 entity might wish to communicate. Contact data includes information identifying the contact such as a name (e.g., a person's or business's name), a street or other physical address, etc. Contact data also includes information needed to establish communication with the contact. Examples of this information include one or more TNs, an email address, an IM address, a gaming handle, etc. In at least some embodiments, a single instance of contact data is maintained in server 2801 for each contact. One example of such an instance is shown as contact record 2902. In addition to one or more fields 2901 used to hold the contact data, record 2902 includes a field 2903 used to hold an identifier of a subscriber account. Record 2902 further include a set of fields 2905 that include a field 2906 to hold an identifier of a user, associated with that account, that is the owner of record 2902. A field 2915 holds a flag indicating whether the user identified in field 2906 has classified the contact data as public or private, and one or more fields 2907-1 through 2907-*n* to hold pointers or other data indicating the contact data should be included in a particular "buddy list" or other sub-collection of contacts that might be established by the user identified in field 2906. In some embodiments, pointers in fields 2907-1 through 2907-*n* may refer to lists stored or referenced in the user's profile. Record 2902 may also include one or more additional sets of fields such as set 2909 that is similar to set 2905, but that contains data reflecting inclusion of the contact data in a different user's (identified in field 2921) contact lists (identified in one or more fields 2922-1 through 2922-*n*). For example, user A may establish an address book entry for a particular contact and make that contact a public contact (thus part of user A's public address book). User B might then wish to include that contact information into user B's own address book.

The record 2902 of FIG. 29 is merely one example of how contact data can be stored in accordance with some embodiments. The actual format of contact data and/or of the tables or other data structures used to organize and store that contact data will vary among different embodiments. In some embodiments, and as also shown in FIG. 29, data in address book server 2801 could also be accessible by other applications servers and/or users associated with other accounts (or even with other networks) over LDAP (lightweight directory access protocol) interfaces.

As can be appreciated from FIG. 29, an update to contact data by one user will thus update that contact data for other users. Should a particular user wish to protect a particular contact data entry from update by other users, an additional field could be added to record 2902 to mark the contact data as read-only. In some embodiments, only the owner of a record can mark a particular contact data instance as read-only. In some such embodiments, a non-owner wishing to protect a particular contact data instance from modification by other users could create a second record for the same contact data in address book server 2801 and mark that second record as private.

When a user accesses his or her contact data via an end device, the user may specify the set of contacts for which data are to be displayed. For example, user A may provide input to an end device indicating that user A wishes to see information for contacts in his or her public address book. In response, user A will be provided (e.g., on a display of the end device) with a scrollable list containing all of the contact data in server 2801 that is included in a record showing user A as the "owner" of the contact. If user A were to provide input indicating a desire to see information in user B's public address book, user A might first be provided with a GUI asking user A to select another user. Once user B is selected, user A is provided a scrollable list containing the contact data in server 2801 that are contained in records showing user B as the owner and having the public/private flag set to "public." If user A were to provide input indicating a desire to see information for contacts in a first sub-grouping of contacts, user A would provide input identifying that sub-grouping. In response, user A would be provided with a scrollable list containing each of the contacts for which server 2801 has a record showing user A in field 2906 or field 2921 and an entry (e.g., in one of fields 2907-1 through 2907-*n* or 2922-1 through 2922-*n*) showing the contact as in the requested sub-grouping.

In some embodiments, an end device may interface with server 2801, with application server 118 and/or with another application server so as to limit the type of contact data provided. For example, a user requesting contact data from an email application might only be provided with the name and email address for each contact.

Figure 30:
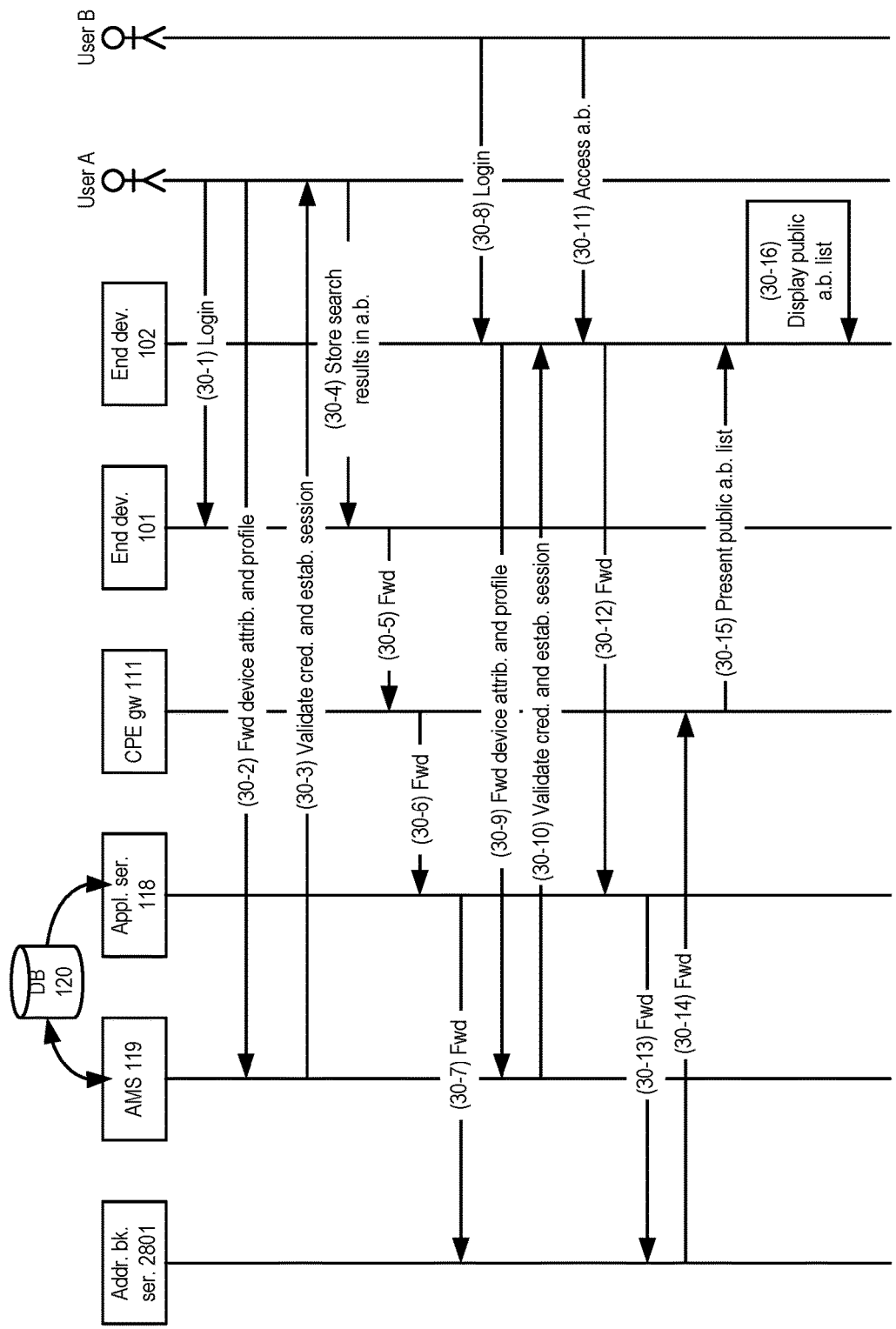
FIG. 30 is a communication diagram showing sharing of entries in a public address book according to some embodiments.

FIG. 30 is a communication diagram showing sharing of entries in a public address book. User A logs in using end device 101 at line 30-1. Device attributes and login data are forwarded to AMS 119 (line 30-2), which validates user A's credentials and establishes a session (line 30-3). Subsequently, user A provides input indicating a desire to store data for an additional contact in user A's public address book (line 30-4). This is forwarded to address book server 2801 (lines 30-5, 30-6 and 30-7), which stores the new contact. Subsequently, user B logs in using device 102 (line 30-8). After user B's credentials are forwarded (line 30-9) and validated, and a session established (line 30-10), user B provides input indicating a desire to view contacts in user A's public address book (line 30-11). This is forwarded to address book server 2801 (lines 30-12 and 30-13), which retrieves user A's public address book data and makes same available to user B (lines 30-14, 30-15 and 30-16).

Figure 31:
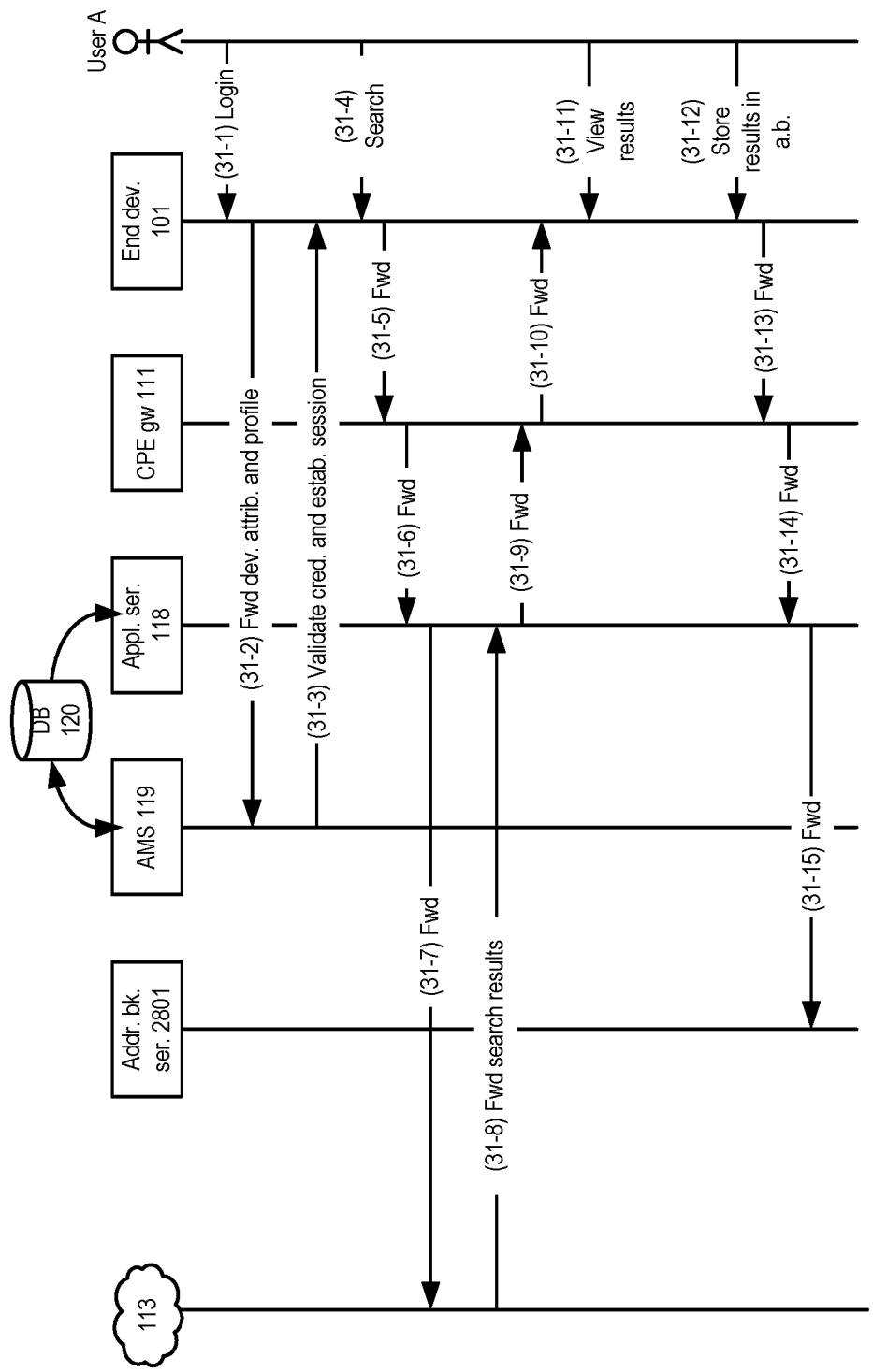
FIG. 31 is a communication diagram showing, according to some embodiments, adding contact data obtained from a search using another data service.

FIG. 31 is a communication diagram showing adding contact data obtained from a search using another data service (e.g., a yellow pages type service, a search of call logs from a voice telephony service). User A logs in using end device 101 at line 31-1. Device attributes and login data are forwarded to AMS 119 (line 31-2), which validates user A's credentials and establishes a session (line 31-3). Subsequently, user A provides input indicating a search request in the data service (line 31-4). The request is forwarded via CPE gateway 111 (line 31-5) and application server 118 (line 31-6) to an application server for the accessed data service located within network cloud 113 (line 31-7). A search result is then returned and displayed to user A (lines 31-8, 31-9, 31-10). User A views the results (line 31-11) and provides input to device 101 indicating a desire to store a contact from the search in user A's public address book (line 31-12). In response a signal is sent via CPE gateway 111 (line 31-13) and application server 118 (line 31-14) to address book server 2801 (line 31-15). The added contact can now be accessed by other users.

Figure 32:
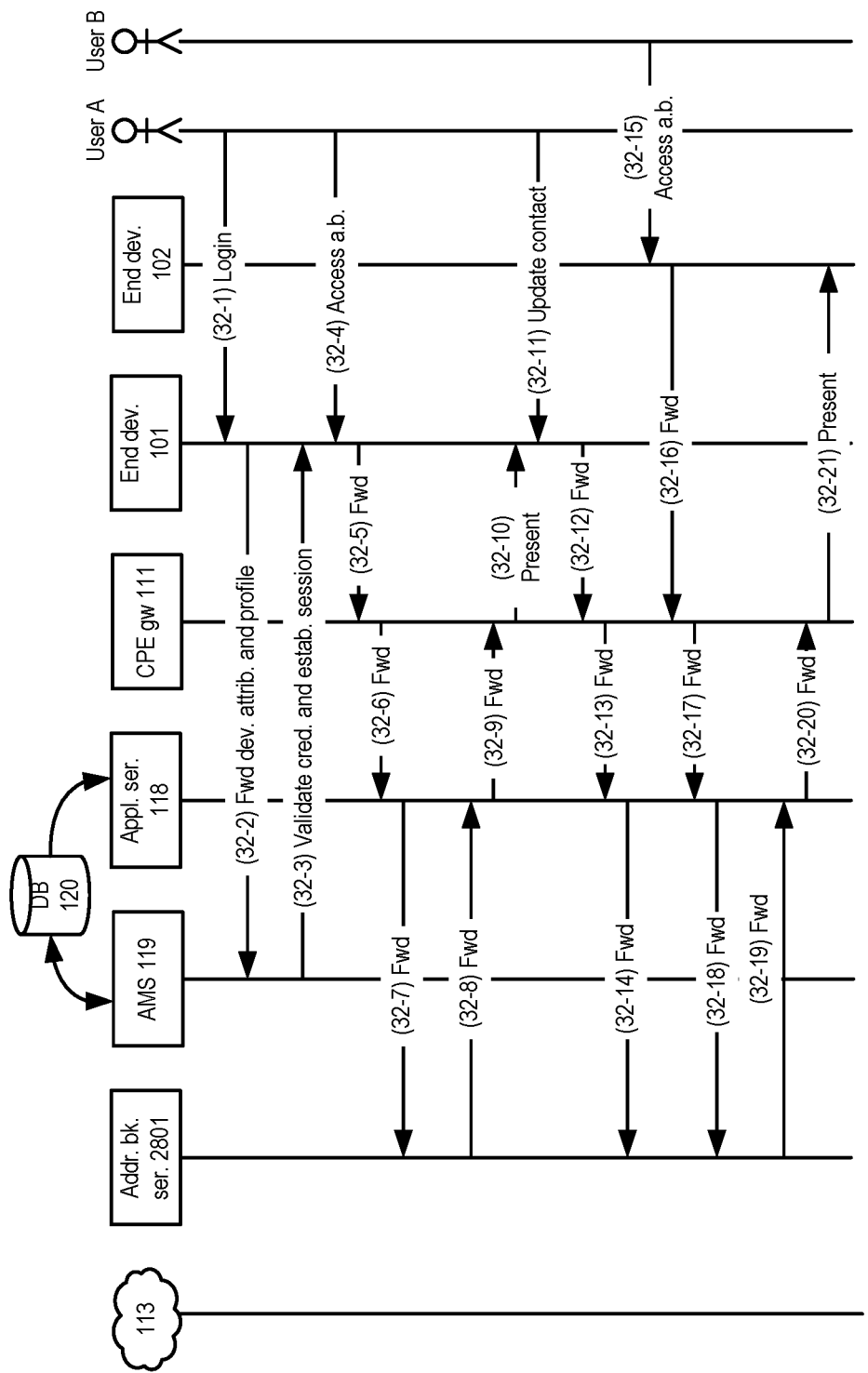
FIG. 32 is a communication diagram showing, according to some embodiments, updating of contact data in a public address book.

FIG. 32 is a communication diagram showing updating of contact data in a public address book. User A logs in using end device 101 at line 32-1. Device attributes and login data are forwarded to AMS 119 (line 32-2), which validates user A's credentials and establishes a session (line 32-3). Subsequently, user A provides input indicating a desire to access his or her address book (line 32-4). A request is then forwarded from device 101 via CPE gateway 111 (line 32-5) and application server 118 (line 32-6) to address server 2801 (line 32-7). In response, address book server 2801 forwards contact data from user A's public address book (line 32-8) via application server 118 (line 32-9) and CPE gateway 111 (line 32-10) to end device 101. User A then provides input to device 101 indicating a modification to data for one or more contacts (line 32-11). A signal representing this modification is forwarded via CPE gateway 111 (line 32-12) and application server 118 (line 32-13) to address book server 2801 (line 32-14), which updates the appropriate record(s) (not shown in FIG. 32). Subsequently, user B accesses user A's public address book from device 102 (line 32-15), which access request is forwarded from device 102 via CPE gateway 111 (line 32-16) and application server 118 (line 32-17) to address server 2801 (line 32-18). Server 2801 retrieves the requested contact data, which includes the modifications submitted by user A at line 32-11, and sends same (line 32-19) via application server 118 (line 32-20) and CPE gateway 111 (line 32-20) to device 102 (line 32-21).

Figure 33:
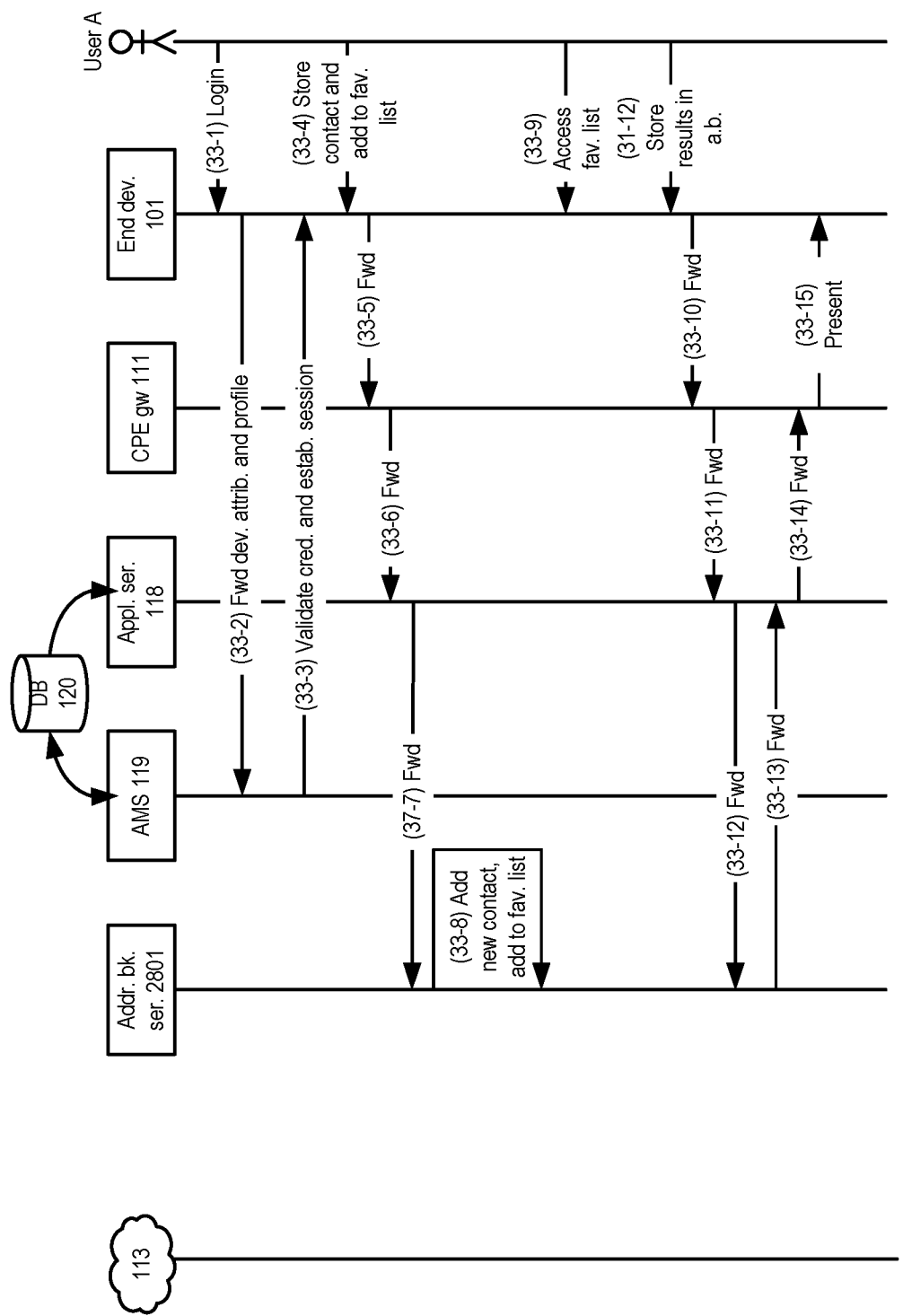
FIG. 33 is a communication diagram showing, according to some embodiments, addition of a new contact that is also added to a favorites list.

FIG. 33 is a communication diagram showing addition of a new contact that is also added to a favorites list. User A logs in using end device 101 at line 33-1. Device attributes and login data are forwarded to AMS 119 (line 33-2), which validates user A's credentials and establishes a session (line 33-3). Subsequently, user A provides input indicating a desire to add a new contact to the user A address book and to also include that new contact in a "favorites" list (line 33-4). A signal representing this input is forwarded via CPE gateway 111 (line 33-5) and application server 118 (line 33-6) to address book server 2801 (line 33-7). Address book server 2801 then creates a record having the contact data provided by user A, having a field indicating user A as the owner of the contact data and including an entry in an appropriate one of fields 2907-1 through 2907-*n* (FIG. 29) indicating that the new contact is also in user A's favorites list (line 34-8). User A subsequently accesses the favorites list (lines 33-9 through 33-12), causing address server 2801 to return the favorites list contacts (including the new contact submitted at line 33-4) (lines 33-13 through 33-15).

As indicated above, various types of notifications can be provided to end devices in a local service domain. In some embodiments, those notifications can include video service notifications. As used herein, a "video service" is a service through which video content (and any associated audio content) can be received at an end device within a local service domain. The video content can be multicast content provided at scheduled times, examples of which include television programming from over-the-air and CATV providers received through a network connection. The video content might also be unicast content (e.g., VOD movies). A "video service notification" is a notification providing a user with information about a video service (e.g., an event associated with a video service), and may include audio and/or visual indicators. A video service notification may or may not be interactive so as to facilitate a response from a user. For example, a DECT handset or some other end device may receive a textual notification that a particular movie or other type of VOD content is available. That notification may request input from the user and include a link (with an associated URI) that a user can select to cause that VOD content to be downloaded to an STT or other end device. As another example, a DECT handset or other end device may receive a notification of a previously specified television program that will soon be available via multicast. That notification may also provide the user with the ability to cause that program to be recorded on a DVR or other device. Other examples of video service notifications are provided below.

As with other types of notifications described above, one or more aspects of video service notifications can be defined by a user profile. For example, one user may configure his profile so that video service alerts are provided to all end devices in a local service domain, while another user might configure her profile so that video service notifications are only provided to certain end devices. As another example, a primary user (e.g., a parent) may configure profiles of secondary users (e.g., minor children) so that those secondary users are unable to receive certain types of video service notifications.

Figure 34:
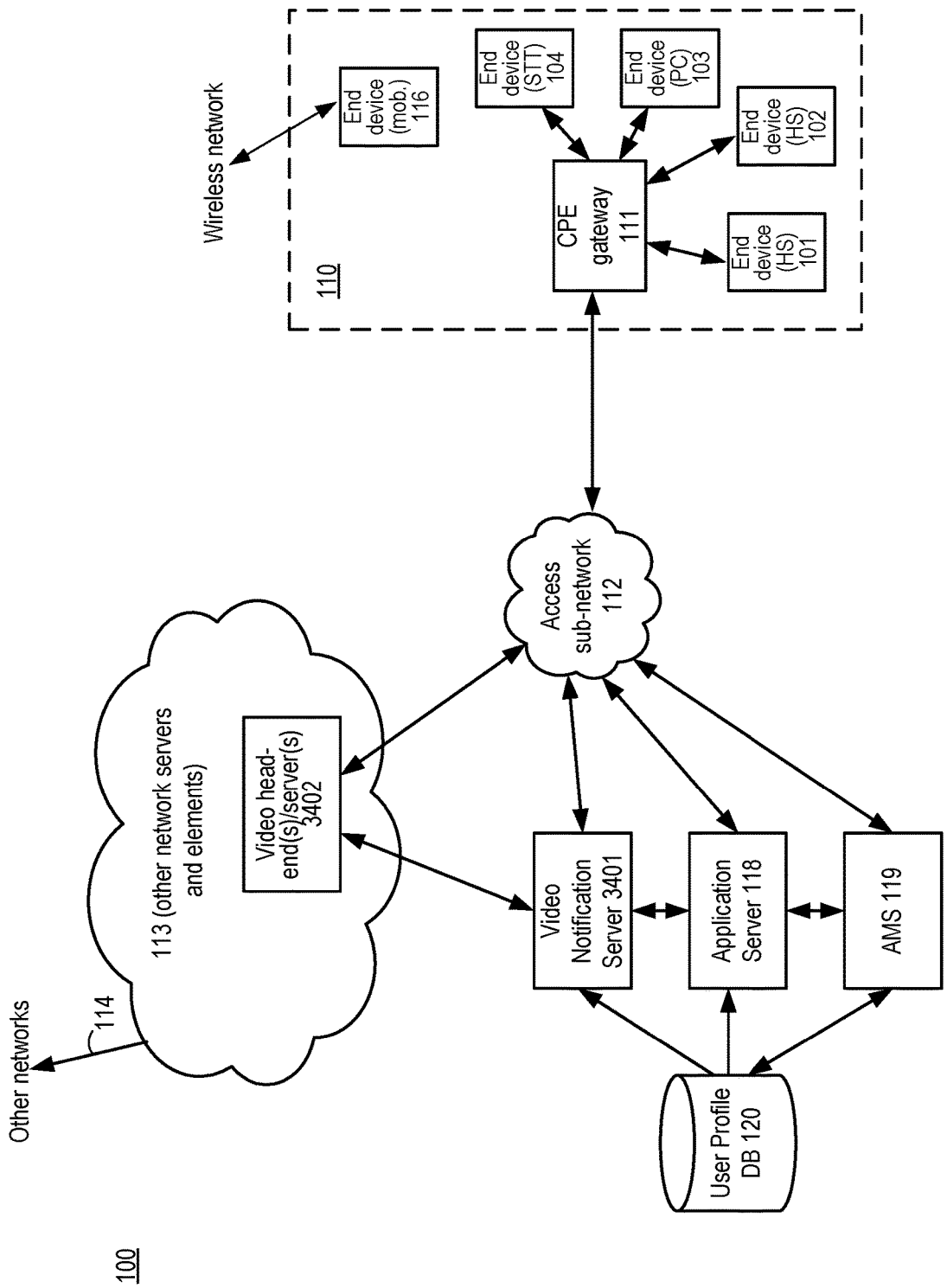
FIG. 34 is similar to FIG. 1, but shows additional elements in network 100 that facilitate video service notifications.

FIG. 34 is similar to FIG. 1, but shows additional elements in network 100 that facilitate video service notifications. A video notification server 3401 communicates with CPE gateway 111 via access network 112, with application server 118 and with user profile database 120. As with application server 118, AMS 119 and other servers previously described, video notification application server 3401 includes hardware such as was described in connection with FIG. 3, but which is programmed or otherwise configured to carry out operations such as are described herein. In some embodiments, video notification server 3401 may be combined with application server 118. Although FIG. 34 shows a direct connection between server 3401 and access subnetwork 112, this is only for convenience, and intermediate servers, routers and other elements are omitted. In some embodiments, server 3401 may alternatively be an IMS application server that communicates with CPE gateway 111 and with other application servers through IMS call state control function (CSCF) elements located within cloud 113. CPE gateway 111, end devices 101-104 and 116, application server 118, AMS 119, profile database 120 and other elements of network 100 also include programming or are otherwise configured (e.g., with one or more application specific integrated circuits (ASICs) or other hard-wired logic) so as to carry out video service notification operations described herein.

Also shown in FIG. 34, within cloud 113, is a video headend 3402. Although shown as a single block for simplicity, video head end 3402 may include numerous elements distributed across multiple devices within cloud 113. Headend 3402 includes network servers to which an STT or other end device may send commands (via access sub-network 112) to commence delivery of VOD content, remote DVR (rDVR web servers) that can send commands to an STT to cause that STT to start or stop recording, and other servers that communicate with STTs and other end devices so as to facilitate video content delivery. The servers of headend 3402 similarly include hardware such as was described in connection with FIG. 3, but also include programming or are otherwise configured so as to carry out operations such as are described herein.

As previously indicated in connection with FIG. 1, end device 104 of FIG. 34 is an STT. STT 104 communicates with video headend 3402 via access sub-network 112. In the embodiment of FIG. 34, STT 104 is physically connected to CPE gateway 111 by way of MoCA interface 412 (see FIG. 4) and/or Ethernet interface 415. However, STT 104 and CPE gateway 111 share the physical coaxial cable connection to access network 112 (e.g., via a splitter connecting STT 104 and gateway 111 to a coaxial drop cable connecting premises 110 and access sub-network 112). Although video service content data is carried to premises 110 over the same medium used to carry data for telephony and other services, video service data may be carried in separate physical channels. For example, a portion of the downstream RF frequency sub-bands (and/or certain time slots within downstream RF frequency sub-bands) may be allocated to video services content data, while other sub-bands and/or time slots are allocated for other services.

FIG. 35 is a block diagram of STT 104 according to some embodiments. STT 104 includes one or more RF interfaces 3501-1 through 3501-n that provide physical connections to coaxial cable(s). STT 104 further includes memory 3504 for storing instructions and data and a processor 3505 for executing instructions and controlling operation of STT 104. Although a single block is shown for memory 3504 and a single block shown for processor 3505, memory and computational operations of STT 104 could respectively be distributed across multiple memory devices and multiple processors located within STT 104. For example, STT 104 may include additional processors for executing video and audio CODEC routines, etc. Memory 3504 may include volatile and non-volatile memory and can include any of various types of storage technology, including one or more of the types of storage devices described in connection with FIG. 3. Processor 3505 may be implemented with any of numerous types of devices, including but not limited to one or more of the example devices described in connection with processor 305 of FIG. 3. In at least some embodiments, processor 3505 of STT 104 carries out operations described herein according to machine readable instructions stored in memory 3504 and/or stored as hardwired logic gates within processor 3505. Processor 3505 communicates with and controls memory 3504 and interfaces 3501-1 through 3501-n over one or more buses 3506. STT 104 also includes one or more audio and/or video interfaces 3502-1 through 3502-n (e.g., left and right audio channel outputs, a video output, an HDMI output) over which audio and video data is output for presentation on the display and/or speaker(s) of a television or other device. A infrared interface 3503 receives input from a remote control. Processor 3505 also communicates with interfaces 3502-1 through 3502-n and 3503 over bus 3506.

Memory 3504 of STT 104 is used to store instructions and data used by STT 104 to carry out conventional STT operations such as tuning to and decoding content data, communicating VOD commands and other information to video headend 3402, providing an electronic program guide (EPG), etc. Memory 3504 is also used to store content for later viewing. In addition to data used for conventional STT operations, memory 3504 in at least some embodiments also stores users' video notification preference information that STT 104 uses to generate and/or act on video service notifications. As discussed in more detail below, this information can include identification of specific content (e.g., specific movies or television shows) or content types (e.g., a genre of movies or TV shows, sporting events with a team from a particular city or university), users to be notified regarding predefined content or content type, etc.

Figure 36C:
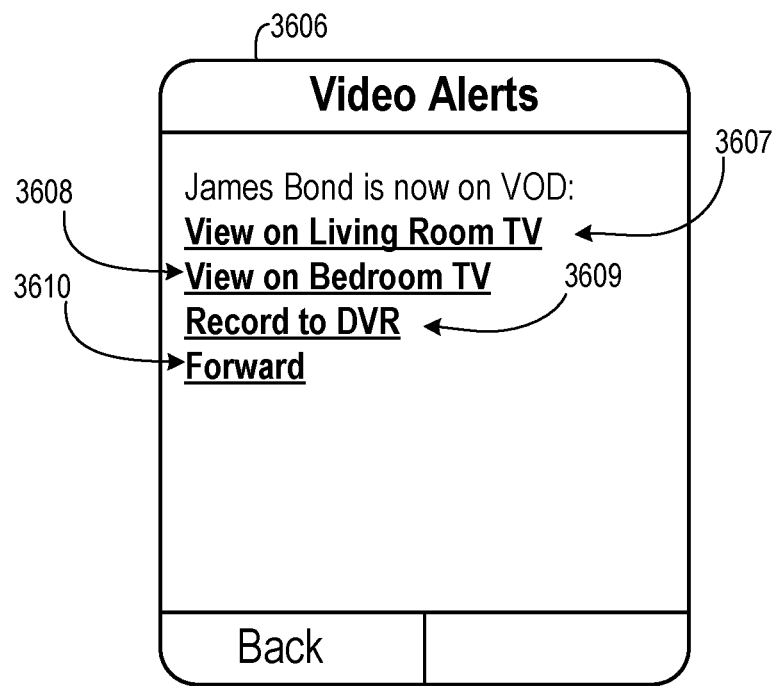

FIGS. 36A-36D are examples of video service notifications according to some embodiments. The following examples describe video service notifications viewed on, and attendable through, DECT handset 101. As with other types of notifications described previously, however, video notifications can be provided to other types of end devices in a local service domain and/or can be simultaneously provided to multiple end devices. FIG. 36A shows a notification summary GUI 3601 presented on the display of handset 101. GUI 3601 is similar to the notification summary GUI shown in FIG. 16, except that a new entry 3602 ("New Video Alerts") is added for video service notifications. A URI or other link is associated with entry 3602. Upon selecting entry 3602, the pending video service notifications for the user "Mike" are shown in a subsequent GUI 3603 (FIG. 36B). The first entry 3604 in GUI 3603 notifies the user that a specific content ("James Bond") is available through VOD and includes a URI link ("View on Living Room TV") corresponding to requested input. If the user selects that link, a response is communicated to STT 104 (in a manner described below) that causes STT to begin presenting "James Bond" on the living room television. A second entry 3605 notifies the user that another specific content ("Batman") is available through a specific service (HBO) at 8 pm and also includes a link corresponding to requested input. Selecting the URI link associated with entry 3605 will cause a command to be transmitted to STT 104 that results in STT 104 recording "Batman."

FIG. 36C shows another example of a video service notification GUI 3606 that might alternatively be provided in response to selecting entry 3602 of GUI 3601 (FIG. 36A). GUI 3606 has a single entry notifying the user that "James Bond" is on VOD, but which includes a request for input having multiple URI links that the user can select to achieve different actions. If the user selects link 3607, information is communicated to STT 104 that causes STT 104 to begin presenting "James Bond" on the living room television. If the user selects link 3608, information is communicated to STT 104 that causes "James Bond" to be presented on a different television. For example, STT 104 may be one of multiple STTs in premises 110 and may be in communication with other STTs (not shown in FIG. 34) over a MoCA network connected to one of RF interfaces 3501 (FIG. 35). Upon receiving a response corresponding to user selection of link 3608, STT 104 causes a different STT to begin presenting "James Bond" on the bedroom television. If the user selects link 3609, information is communicated to STT 104 that causes "James Bond" to be recorded. If the user selects link 3610, information is communicated to STT 104 that causes the current video service notification to be sent to a different user. Selecting link 3610 may result in presentation of a subsequent GUI (not shown) on handset 101 that requests identification of the forwardee user.

Figure 36D:
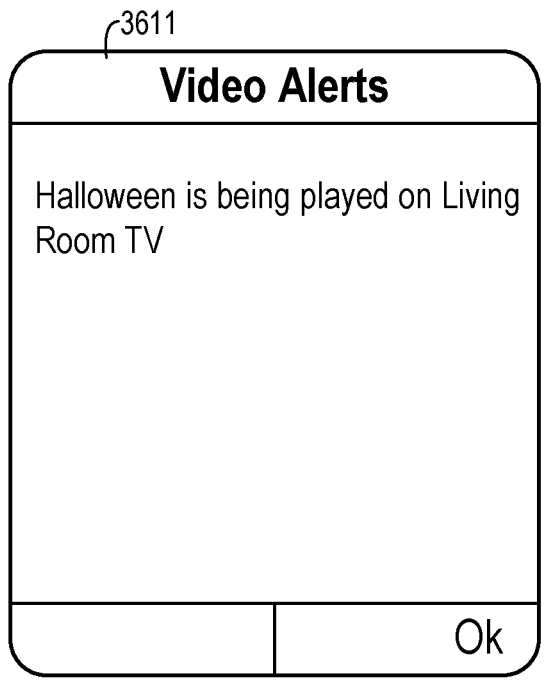

Some video service notifications may not require (or even permit) a response from the notified user. FIG. 36D shows an example of video service notification GUI 3611 that advises the user that STT 104 has begun presenting a specific content ("Halloween") on a television attached to STT 104. The user receiving the notification shown in FIG. 36D may have previously configured STT 104 (or another element in network 100, as discussed below) to generate a notification whenever movies or other content having certain ratings are accessed. A parent could use such notifications to learn if young children are watching content that the parent deems inappropriate.

The video notification alerts described in connection with FIGS. 36A-36D are but a few examples of video service notifications and possible response options according to at least some embodiments. Other examples of notifications include but are not limited to: availability of a specified content item based on a previously stored user preference relating to that specific content item, availability of a content item based on a previously stored user preference relating to a content type, availability of a content item based on a recommendation from a third party, availability of a content item based on previous content selections, selection of a particular content or content type by another user, an attempt by another user to override a content selection or preference, reminders regarding content start times, etc. Other examples of possible responses to video service notifications include instructions to queue content for presentation on a specified media player, instructions to download content for storage, instructions to stream content to specified end devices for immediate viewing, instructions to schedule recording of specified content or of content available from a specified service (e.g., record whatever is on HBO between 8 PM and 12 AM), a "snooze" instruction to repeat a notification, an instruction to provide video guide information (e.g., times and/or channels when the same or similar content will again be available), restarting content that has already begun, and trick mode operation commands (e.g., pause, rewind, fast forward, etc.).

In some cases, a user may set his or her video notification preferences so that an event associated with a particular video service notification automatically receives a certain disposition specified in the user's preferences. For example, a user could set a preference so that whenever a television show or movie meeting certain criteria is broadcast, STT 104 will automatically record that content. The user might also set a preference so that the user receives notifications advising that such recording has begun. If STT 104 cannot carry out the preference for some reason (e.g., insufficient memory to store the content), a notification of that reason can also be generated automatically. In other cases, events associated with a particular video service notification may require manual disposition. Examples of notifications or alerts requiring manual disposition are shown in FIGS. 36B and 36C. Other aspects of video service notifications that users can control through notification preferences include content or content type for which notifications should be generated and/or action (automatically recording) taken, the number of times a particular notification should be provided, whether a notification can be "snoozed," whether notifications should be scheduled to occur at certain times or as events transpire, etc. User preferences can be configured so that notifications are generated based on a single content item (e.g., to provide an alert and/or take a specified action if show X is about to be transmitted), based on multiple content items (e.g., to provide an alert and/or take a specified action if any of shows X, Y, etc. is about to be transmitted), based on content source (e.g., record all content on HBO), based on content source and time (e.g., record all content on HBO at 10 PM every night), based on combinations of these various criteria, and based on other criteria and combinations of criteria.

Video notifications can also take many forms. In addition to the textual examples shown in FIGS. 36A-36D, different colors and/or images could also be added. For example, based on data in each user's profile, different colors or images could be associated with different types of notifications. Audio indicators could also be used as part of video service notifications. In some embodiments, a video service notification may include a video stream (e.g., a small window previewing content to which a notification pertains). "Toaster" alerts, pop-up windows and other types of notifications could also be used.

As with other notifications and services described herein, video service notifications are in some embodiments constrained by each user's profile. Profile data may be used to control the form of video service notifications to a particular user, to control the devices on which video service notifications are provided, to control priority of video service notifications (e.g., whether a video service notification can interrupt other notifications or services), etc. Profile data may also be used to control the type of video service notifications that particular user may receive. As but one example, a parent primary user may configure the profiles of child users to prevent those children from receiving video notifications, from receiving certain types of video notifications or from otherwise using the video service notification features to bypass parental controls previously programmed into STT 104.

In addition to user profile data stored in database 120 and/or cached in CPE gateway 111, data relating to video service notifications may also be stored in other devices. In some embodiments, the user preferences relating to notifications content are stored in STT 104 and/or in video notification server 3401. For example, a particular user's preference to record or be informed of one or more identified content items (or content item types) may be stored as data in STT 104 (or server 3401), but the manner in which that user receives notifications about the preferred content is controlled by the user's profile data stored in user profile database 120 and/or gateway 111.

Figure 37A:
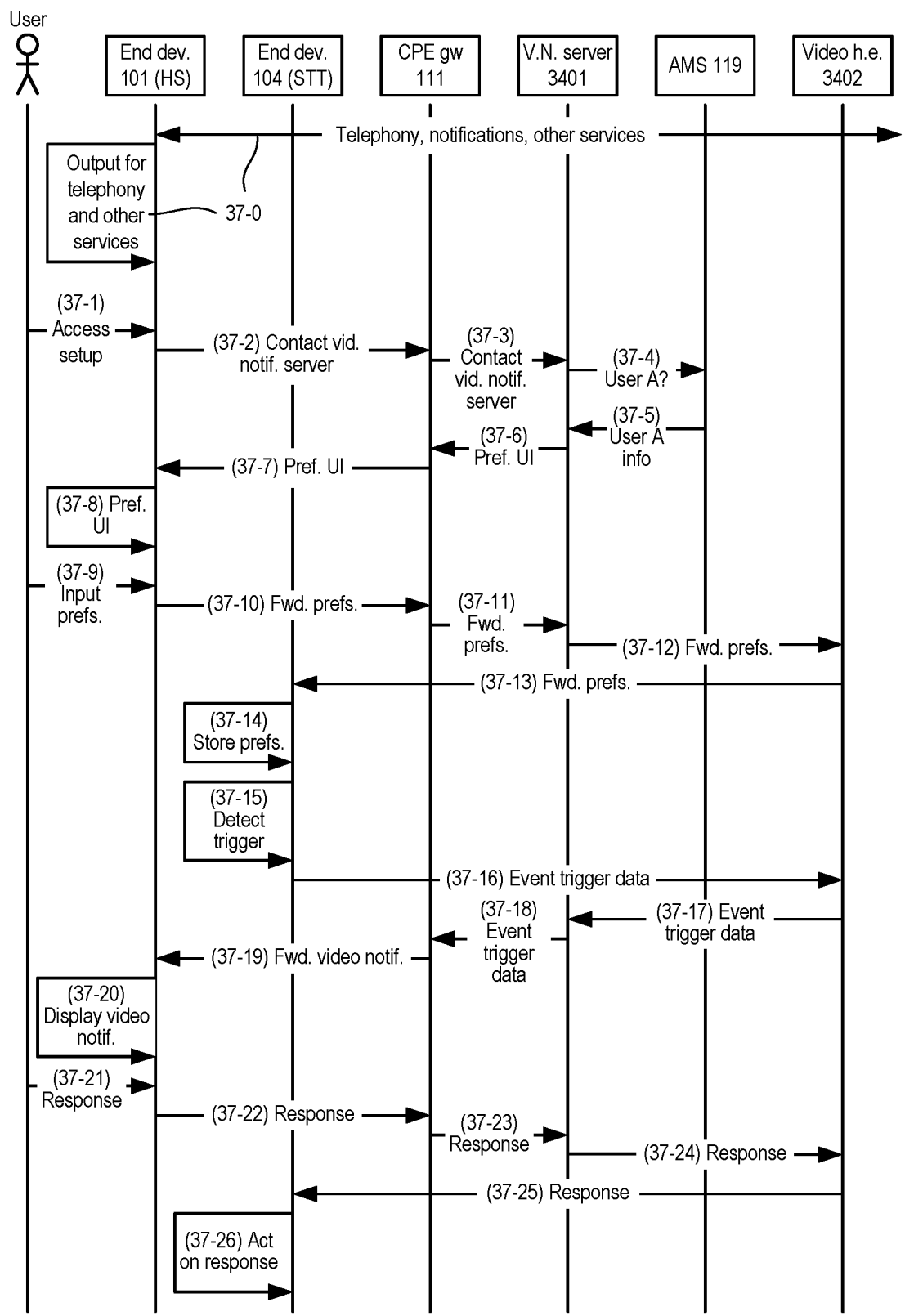
FIGS. 37A and 37B are communication diagrams showing information flows in connection with a user setting video notification preferences and receiving video service notifications according to some embodiments.

FIG. 37A is a communication diagram showing information flows in connection with a user setting video notification preferences and receiving video service notifications according to some embodiments. Although FIG. 37A and subsequent drawings describe a use of a DECT handset to receive and respond to video service notifications and to configure video service notification preferences, these operations could be performed using any of the other types of end devices described herein, as well as other types of end devices (e.g., a corded telephone, a WiFi end device, a soft client running on a device communicating over an Ethernet, USB, BLUETOOOTH or other interface, etc.). In the embodiment of FIG. 37A, the user's video service notification preferences are stored in STT 104.

In addition to video service notifications, as indicated in connection with previous drawing figures, and as shown generally by lines 37-0, handset 101 is used to send and receive data (and to output audio and video based on the received data) for numerous services within the local network and service domain of gateway 111. Those services could include, e.g., voice telephony, other types of notifications, etc. At line 37-1, the user provides input to handset 101 indicating that the user wishes to access his or her video service notification preferences. The present example assumes the user has no pre-existing video service notification preferences. If the user had previously created one or more video service notification preferences, the user might alternatively be accessing those preferences to cancel or modify a notification or to create a new notification. In response to the input from the user, handset 101 signals CPE gateway 111 that the user wishes to access his or her video preferences (line 37-2). In response to this signal, CPE gateway 111 sends a message to video notification server 3401 at line 37-3. In this message, gateway 111 identifies the user and indicates that the user wishes to access his or her video notification preferences. Server 3401 then contacts AMS 119 and requests authentication data for the user (line 37-4). AMS 119 then accesses user profile database 120 (not shown) and retrieves profile data for the user. At line 37-5, AMS 119 forwards to video notification server 3401 data authenticating the user and indicating the user is authorized to create or edit video notification preferences, as well as any user profile data that is relevant video notifications (e.g., profile data regarding form of notifications, profile data regarding types of notifications the user is entitled to receive, etc.).

Upon receiving the user authentication and profile data, server 3401 provides a video notification preferences presentation layer to handset 101 via CPE gateway 111 (lines 37-6 and 37-7). As used herein and as previously indicated, "presentation layer" refers to a collection of user interface components (e.g., applications or applets permitting a user to select icons or fill in data fields) and user interface process components (e.g., applications and applets controlling the user interface components and sending user-supplied data to server 3401). Upon receipt of the presentation layer, handset 101 generates a user interface for creation and/or editing video notification preferences (line 37-8). The user provides input to this UI (line 37-9), which input is forwarded to server 3401 via gateway 111 (lines 37-10 and 37-11). Server 3401 then forwards these preferences to one or more servers of video headend 3402 (line 37-12) with an identification of STT 104 (e.g., an IP and/or MAC address). In some embodiments, for example, server 3401 uses information from the user profile to determine the IP and/or MAC address of STT 104 or other network addressing information. In other embodiments, server 3401 may consult a separate subscriber database that cross-references subscriber premises location (or other subscriber account information) and network addressing information for STT 104.

After receiving the preferences from video notification server 3401, the server(s) within video headend 3402 forward the preferences directly to STT 104 (line 37-13), which preferences STT 104 then stores (line 37-14). Although FIG. 37A shows the creation of video notification preferences by the user (after authentication of the user) as a single series of operations represented by lines 37-6 through 37-14, creation and/or editing of video notification preferences could in some embodiments comprise multiple series of similar steps. For example, after one or more preferences are stored at line 37-14, the user might provide further input to create or modify other preferences.

Subsequently at line 37-15, STT 104 detects an event trigger corresponding to one or more of the preferences stored at line 37-14. This trigger detection could occur in various manners. As one example, the user may have set a preference requiring notification of an identified content item at least 1 hour before that content is scheduled to be transmitted. Based on content schedule information within EPG data (also stored in STT 104), STT 104 determines when the relevant notification time occurs. As another example, the user may have set a preference requiring a video service notification whenever content having a particular rating is output by STT 104. If another user (e.g., one of the user's children) attempts to watch a movie having an "R" or other rating indicating the content is unsuitable, STT 104 detects this attempt.

After detecting the event trigger, STT 104 sends an event trigger message to one or more servers at video headend 3402 (line 37-16). This message includes data regarding the event trigger (e.g., text data describing what has occurred) and may also include data indicating that a response is required. If a response is required, the message may further include one or more URIs corresponding to the response(s) or data from which video head end 3402, server 3401 or another element might generate a URI. The server within video headend 3402 then forwards the event trigger message to video notification server 3401 (line 34-17) with the identity (e.g., IP address and/or MAC address) of STT 104. Server 3401 uses the identifier of STT 104 to identify the CPE gateway associated with STT 104 (gateway 111 in the present example) and forwards the event trigger data to CPE gateway 111 (line 37-18). Using the text data, URI(s) and other information from the event trigger data, as well as user profile data previously cached by gateway 111, a video service notification is generated and sent to handset 101 (and perhaps other end devices) at line 37-19. As previously explained in connection with FIG. 8, user profile data can be cached by CPE gateway 111 when gateway 111 is booted.

Handset 101 displays the notification at line 37-20. If the notification requests a response, handset 101 waits for that response, for the notification to be canceled, or for other appropriate input. If the notification does not require a response, handset 101 may cease presentation of the notification after a predetermined amount of time (e.g., 1 minute) or in response to an appropriate user input clearing the notification (e.g., selecting "Ok" on a GUI). In the current example, the notification requests a response. The user provides that response at line 37-21 by selecting a link in the notification having a corresponding URI. That response is then forwarded to server 3401 via gateway 111 (lines 37-22 and 37-23). Server 3401 then extracts the response URI(s) and forwards them to the appropriate servers in video headend 3402 (line 37-24). The server(s) in headend 3402 then forward the response URI(s) to STT 104 (line 37-25), which takes appropriate action (e.g., commence recording, output content to a television, etc.) at line 37-26.

Figure 37B:
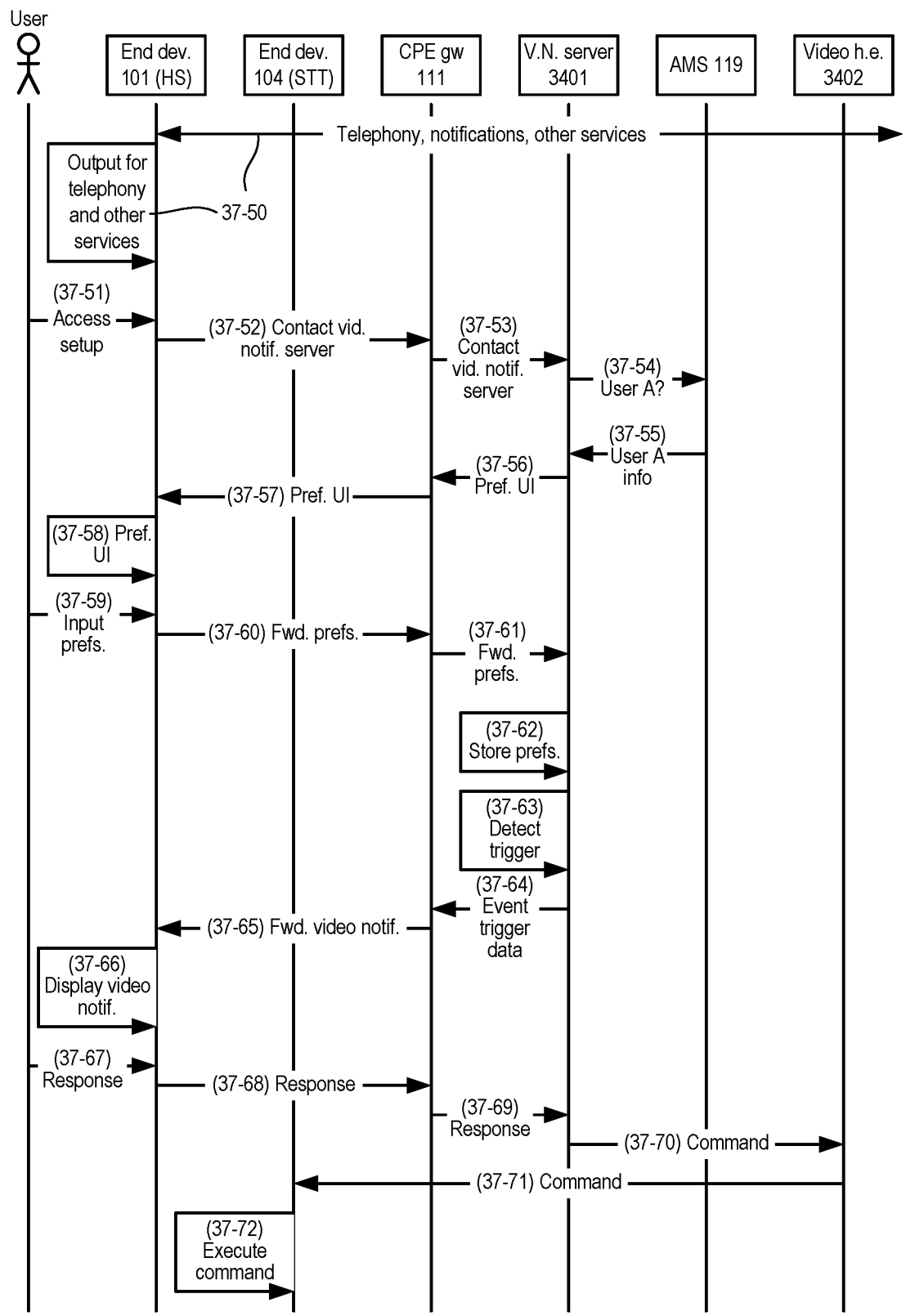

FIG. 37B is a communication diagram showing information flows in connection with a user setting video notification preferences and receiving video service notifications according to another embodiment. The embodiment of FIG. 37B is similar to that of FIG. 37A, except that the user's video service notification preferences are stored in video notification server 3401. Lines 37-50 through 37-61 represent actions similar to those described in connection with lines 37-0 through 37-11, respectively, of FIG. 37A. At line 37-62, server 3401 stores preferences received at line 37-61. As with operations represented by lines 37-6 through 37-14 of FIG. 37A, operations of lines 37-56 through 37-62 in FIG. 37B could be repeated multiple times as part of a single preference editing session.

At line 37-63, server 3401 detects an event trigger corresponding to one or more of the preferences stored at line 37-62. This event trigger detection could occur in various manners similar to those described in connection with FIG. 37A. Because the detection occurs in server 3401 instead of STT 104, however, server 3401 may also store some or all of the same EPG data stored by STTs. After detecting the event trigger, server 3401 sends an event trigger message to CPE gateway 111 (line 37-64). This message includes data regarding the event trigger (e.g., the text data describing what has occurred) and may also include data indicating that a response is requested. If a response is requested, the message may further include one or more URIs corresponding to the possible response(s). Using the text data, URI(s) and other information from the event trigger data, as well as the user profile data previously received and cached by gateway 111, a video service notification is generated and sent to handset 101 (and perhaps other end devices) at line 37-65. The operations represented by remaining lines 37-66 through 37-72 in FIG. 37B are similar to the operations represented by lines 37-20 through 37-26, respectively, of FIG. 37A.

In some embodiments according to FIG. 37A or FIG. 37B, STT 104 and video notification server 3401 may, depending on the type of notification or response at issue, communicate with different servers associated with video head end 3402. For example, STT notifications and notification responses related to VOD service may be routed through a dedicated VOD server. However, notifications and responses related to DVR programming may be routed through a separate rDVR web server. In some embodiments, a single event trigger might result in multiple different notifications and/or responses (and/or multiple notification and response messages) routed through different video head end servers.

As previously indicated in connection with FIG. 34, various network architectures can be employed to provide video service notifications to end devices within network 100. In some embodiments, for example, network 100 is IMS-based. In some such embodiments, video service notifications are sent to (and notification responses are sent from) end devices using SIP. Handsets and other end devices that send (or receive) video service notifications could include SIP listener client software to listen for video service notifications. A CPE gateway could then act as a SIP proxy through which the handsets would communicate with IMS applications servers. In some such embodiments, for example, video notification server 3401 could be an IMS application server (in the IMS service layer) that communicates with CSCF elements (in the IMS control layer) that control communications with CPE gateways and end devices. One or more of the servers associated with video headend 3402 could similarly be IMS application servers and communicate with server 3401 through the CSCF elements. The IMS servers of the video headend could send SIP-based instructions to STTs and/or other end devices, but could communicate content in separate non-IMS channels.

Figure 38:
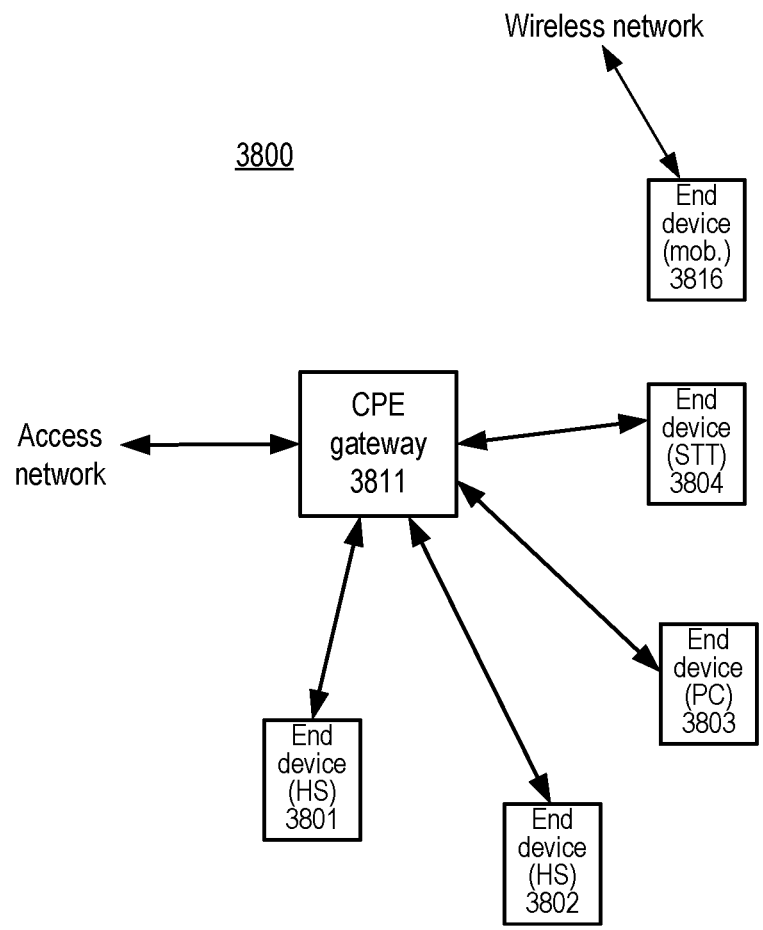
FIG. 38 is a block diagram of a local premises according to some embodiments.

In some embodiments, a separate video notification server is omitted. FIG. 38 is a block diagram of a local premises 3800 according to some such embodiments. In certain of such embodiments, a CPE gateway 3811 forwards communications between handsets 3801 and 3802 (and/or PC end device 3803 and/or smart phone end device 3816) and an STT 3804 using a MoCA, DLNA or similar local network interface between gateway 3811 and STT 3804. CPE gateway 3811, DECT handset end devices 3801 and 3802, PC end device 3803, STT end device 3804 and smart phone end device 3816 are similar to CPE gateway 111, DECT handset end devices 101 and 102, PC end device 103, STT end device 104 and smart phone end device 116, respectively, described in connection with FIG. 34 and earlier figures. Specifically, the devices in FIG. 38 have hardware similar to that described in connection with similar earlier-described devices, but are programmed or otherwise configured to carry out operations as described below. STT 3804 stores video notification preference data, detects event triggers, communicates event trigger data to CPE gateway 3811, and receives notification responses from gateway 3811. Gateway 3811 creates video service notifications based on event trigger data received from STT 3804 and sends those notifications to handsets 101 and 102 (and/or other end devices), receives notification responses from handsets 3801 and 3802, and forwards those responses to STT 3804.

Figure 39:
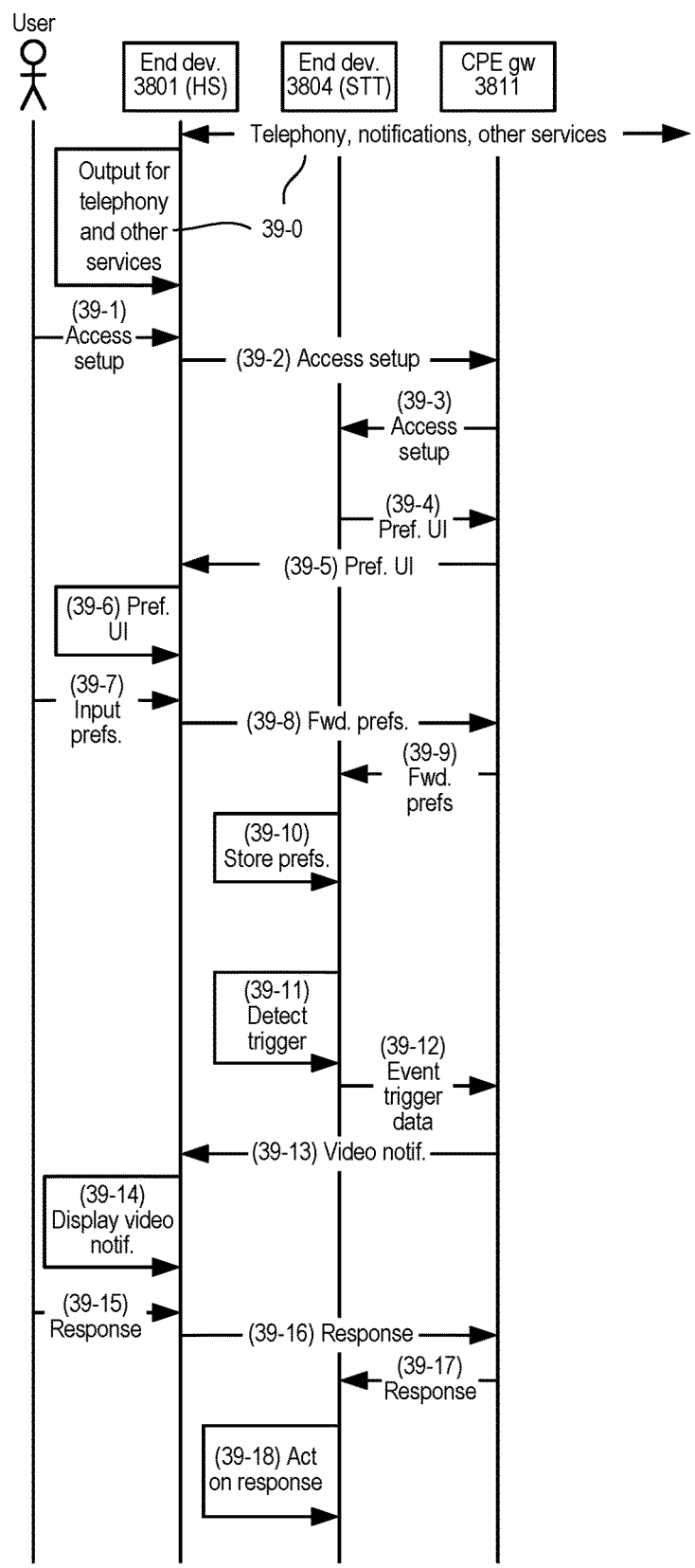
FIG. 39 is a communication diagram showing information flows in connection with a user setting video notification preferences and receiving video service notifications according to the embodiment of FIG. 38.

FIG. 39 is a communication diagram showing information flows in connection with a user setting video notification preferences and receiving video service notifications according to the embodiment of FIG. 38. As previously indicated in connection with other embodiments and as shown generally by line 39-0, handset 101 is used to receive telephony, other types of notifications and other services within the local network and service domain of gateway 111. On line 39-1, the user provides input to handset 3801 indicating that the user wishes to access his or her video service notification preferences. The present example assumes the user has no pre-existing video service notification preferences. If the user had previously created one or more video service notification preferences, the user might alternatively be accessing those preferences to cancel or modify a notification or to create a new notification. In response to the input from the user, handset 3801 communicates to CPE gateway 3811 that the user wishes to access his or her video preferences (line 39-2). In response to this communication, CPE gateway 3811 sends a message to STT 3804 at line 39-3. In this message, gateway 3811 identifies the user and indicates that the user wishes to access his or her video notification preferences.

In response to the message of line 39-3, STT 3804 provides a video notification preferences presentation layer (line 39-4), which CPE gateway 3811 forwards to handset 3801 (line 39-5). Upon receipt of the presentation layer, handset 3801 generates a user interface for creation and/or editing video notification preferences (line 39-6). The user provides input to this UI (line 39-7), which input is forwarded to gateway 3811 (lines 39-8). Gateway 3811 then forwards those preferences to STT 3804 (line 39-9), which STT 104 then stores at line 39-10. Similar to previous embodiments, operations represented by lines 39-4 through 39-10 could be repeated multiple times as part of a single preference editing session.

Subsequently at line 39-11, STT 4104 detects an event trigger corresponding to one or more of the preferences stored at line 39-10. After detecting the event trigger, STT 3804 sends an event trigger message to CPE gateway 3811 (line 39-12), which message includes event trigger data and may also include data indicating that a response is requested. Using the text data and other information from the event trigger data, gateway 3811 generates a video service notification and sends the same to handset 3801 (and perhaps other end devices) at line 39-13. Handset 3801 displays the notification at line 39-14. If the notification requests a response, handset 3801 waits for that response, for the notification to be canceled, or for other appropriate input. If the notification does not request a response, handset 3801 may cease presentation of the notification after a predetermined amount of time (e.g., 1 minute) or in response to an appropriate user input clearing the notification. In the current example, the notification requests a response. The user provides that response at line 39-15 by selecting a link in the notification having a corresponding URI. That response is then forwarded to gateway 111 (line 39-16). Gateway 3811 then extracts the response forwards it to STT 3803 (line 39-17) for action (line 39-18).

Figure 40:
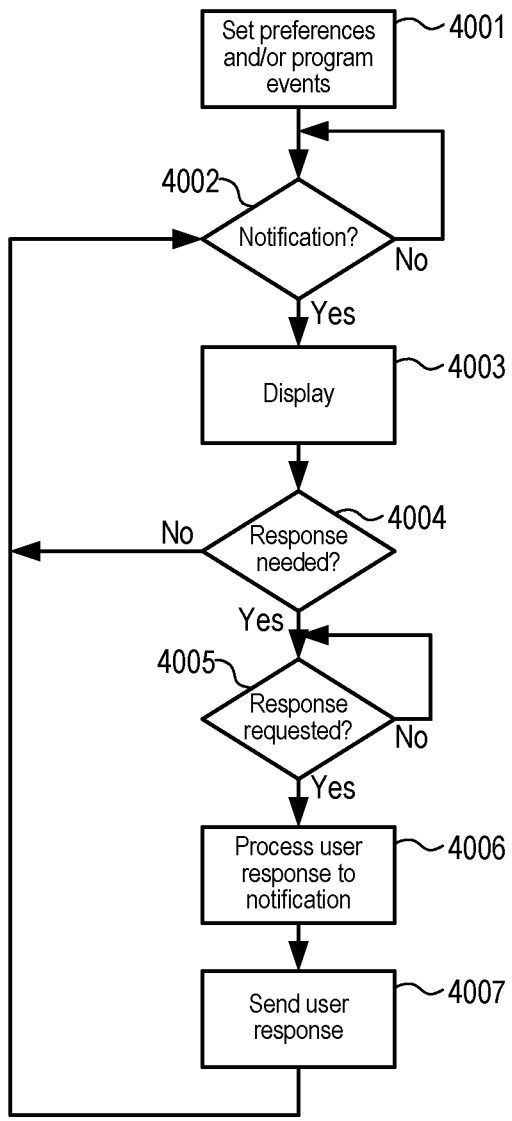
FIG. 40 is a flow chart showing operations performed by a DECT handset, or other end device in a local service domain, in connection with video service notifications.

FIG. 40 is a flow chart showing operations performed by a DECT handset, or other end device in a local service domain, in connection with video service notifications. In block 4001, the handset communicates with other devices so as to set or modify a user's video notification preferences. Block 4001 corresponds to actions performed by handset 101 in connection with lines 37-1, 37-2 and 37-7 through 37-10 of FIG. 37A, to actions performed by handset 101 in connection with lines 37-51, 37-52 and 37-57 through 37-60 of FIG. 37B, and to actions performed by handset 3801 in connection with lines 39-1, 39-2 and 39-5 through 39-8 of FIG. 39. The handset then waits for a video service notification at block 4002. If no notification is received, flow loops back to block 4002 on the "no" branch. If a notification is received, flow proceeds on the "yes" branch to block 4003. In block 4003, the handset presents the notification to the user (line 37-20 of FIG. 37A, line 37-66 of FIG. 37B, line 39-14 of FIG. 39). If the handset processor determines in block 4004 that no response to the notification is requested, flow loops back to block 4002 on the "no" branch. Although not shown in FIG. 40, the handset could cease displaying the notification after a predetermined period or in response to an input from the user (e.g., pressing an "Ok" button). If a response is requested, flow proceeds to block 4005. If no response is received, flow loops back to block 4005 on the "no" branch. If a response is received (line 37-21 of FIG. 37A, line 37-67 of FIG. 37B, line 39-15 of FIG. 39), flow proceeds to block 4006, where the handset processes the user input providing the response and generates a response message. The handset then sends the response message (line 37-22 of FIG. 37A, line 37-68 of FIG. 37B, line 39-16 of FIG. 39) in block 4007. Flow then returns from block 4007 to block 4002.

Although the examples of FIGS. 37A, 37B, 39 and 40 show setting of video notification preferences using the same device (handset 101) over which notifications are later received, this need not be the case. In at least some embodiments, preferences can be set using other end devices. For example, preferences could be set using a GUI presented on a television connected to STT 104, using a different handset, using a PC or other computer, etc.

Figure 41A:
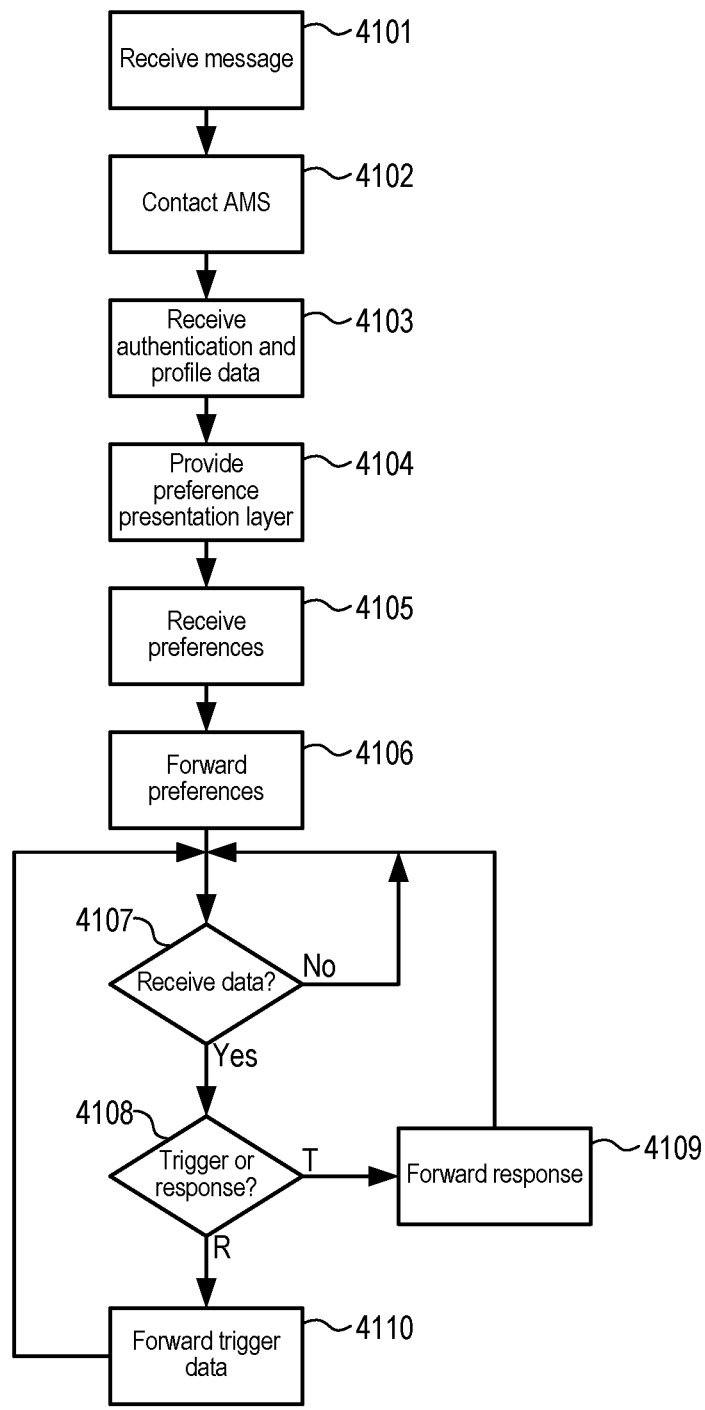
FIGS. 41A and 41B are a flow charts showing operations performed by a video notification server in some embodiments.

FIG. 41A is a flow chart showing operations performed by video notification server 3401 in at least some embodiments according to FIG. 37A. In block 4101, server 4101 receives a message from CPE gateway 111 indicating that the user wishes to access his or her video preferences. In block 4102, server 3401 contacts AMS 119 to obtain authentication and profile data for the user. Server 3401 then receives that data at block 4103, in response to which server 3401 provides a video notification preferences presentation layer in block 4104. Server 3401 receives preferences data forwarded from CPE gateway 111 in block 4105 and forwards that preference data to video head end 3402 in block 4106. Although shown as a single sequence of three blocks for convenience, the steps of blocks 4104 through 4106 could be repeated multiple times as part of a single video notification preferences editing session.

Server 3401 then proceeds to block 4107 and waits for event trigger data or for notification response data. If no data is received, flow loops back to block 4107 on the "no" branch. If data is received, flow proceeds to block 4108 on the "yes" branch, where server 3401 determines if the received data is trigger data forwarded by video head end 3402 or notification response data forwarded by CPE gateway 111. If the received data is event trigger data, flow proceeds on the "T" branch to block 4109, where server 3401 forwards that data to CPE gateway 111. If the received data in block 4108 is notification response data, flow proceeds on the "R" branch from block 4108 to block 4110, where server 3401 forwards the response data to video head end 3402. From block 4109 or block 4110, flow returns to block 4107 to await further data.

Figure 41B:
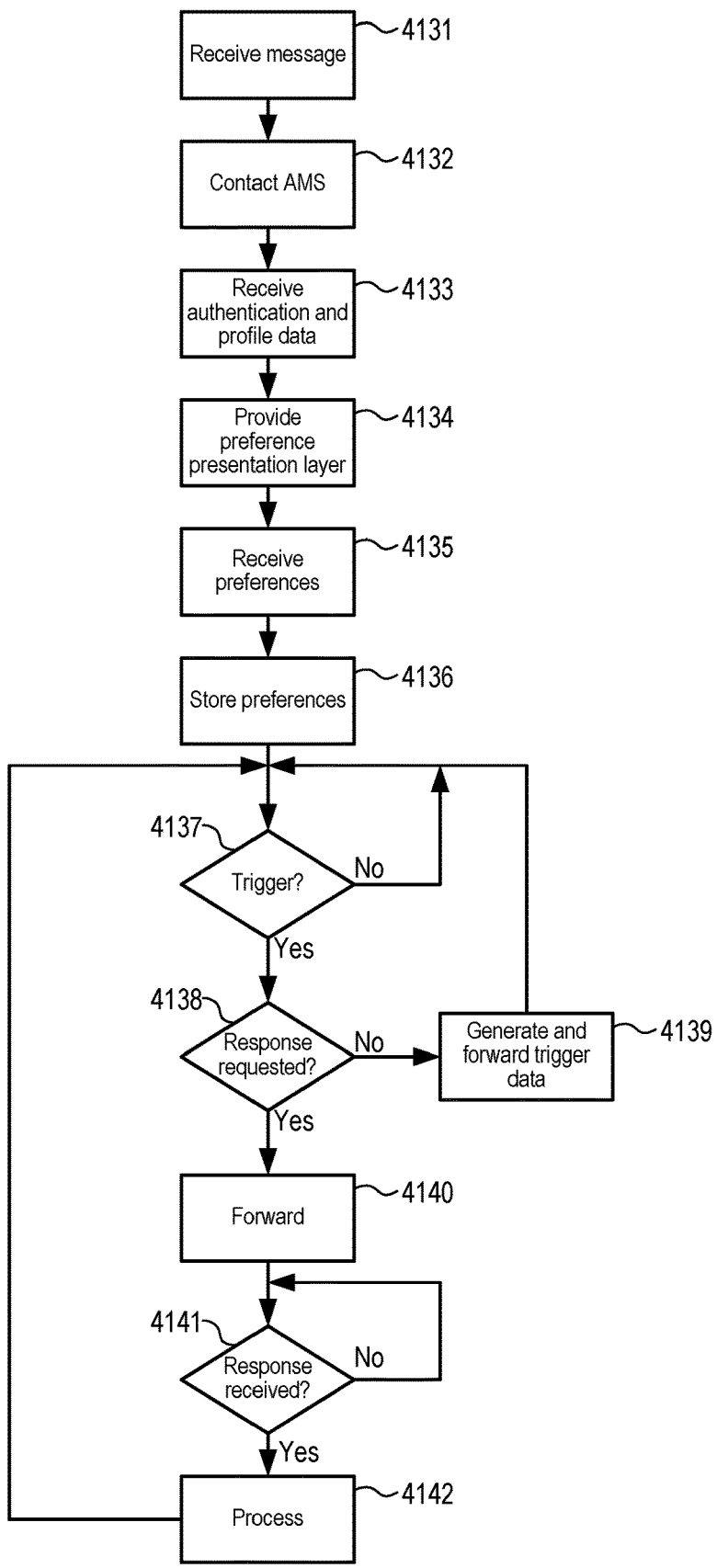

FIG. 41B is a flow chart showing operations performed by video notification server 3401 in at least some embodiments according to FIG. 37B. Blocks 4131 through 4135 are similar to blocks 4101 through 4105, respectively, of FIG. 41A. In block 4136 of FIG. 41B, however, server 3401 stores received preference data instead of forwarding that data (as is the case in block 4106 of FIG. 41A). Server 3401 then proceeds to block 4137 and waits for an event trigger. If no event trigger occurs, flow loops back to block 4137 on the "no" branch. If an event trigger occurs, flow proceeds to block 4138, where server 3401 determines if a response will be requested. If not, flow proceeds on the "no" branch to block 4139, where event trigger data is forwarded to CPE gateway 111. If server 3401 determines in block 4138 that a response will be requested, flow proceeds on the "yes" branch to block 4140, where the event trigger data is forwarded to CPE gateway 111. From block 4140, server 3401 proceeds to block 4141 to await the response data. Until a response is received, flow loops back to block 4141 on the "no" branch. Once a response is received, server 3401 proceeds on the "yes" branch to block 4142, where the response is processed. As part of processing the response, server 3401 generates a command for STT 104 and forwards that command to video head end 3402. From block 4109 or block 4110, flow returns to block 4137 to await the next trigger.

Figure 42A:
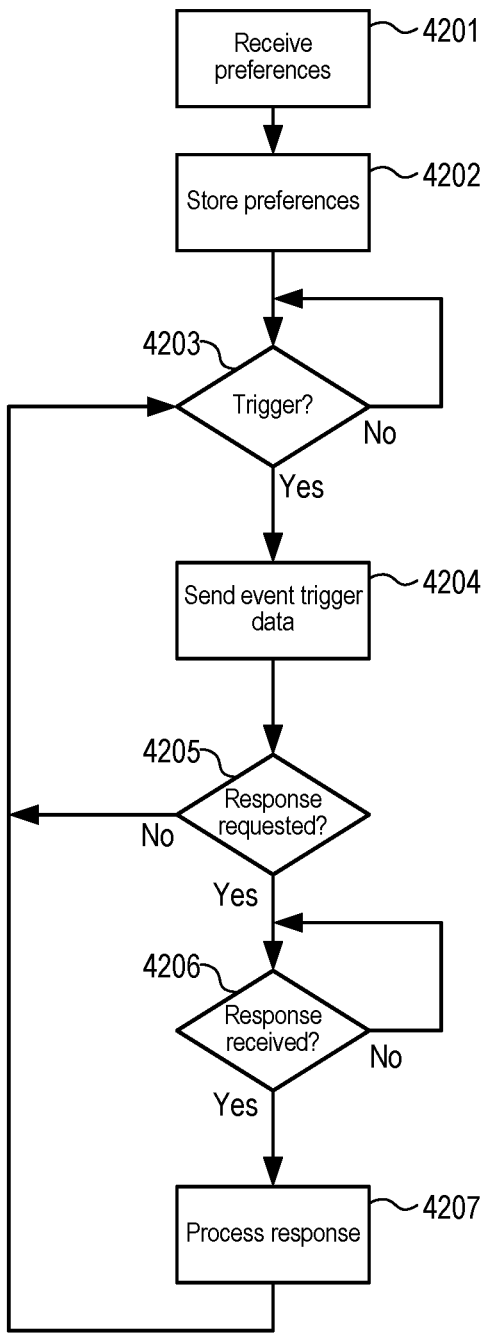
FIGS. 42A and 42B are a flow charts showing operations performed by a set top terminal in some embodiments.

FIG. 42A is a flow chart showing operations performed by STT 104 in at least some embodiments according to FIG. 37A. In block 4201, STT 104 receives user video notification preferences forwarded by video head end 3402 (line 37-13 of FIG. 37A). STT 104 then stores the received preferences in block 4202, after which flow proceeds to block 4203. In block 4203, STT 104 waits for an event trigger. Until a trigger occurs, flow loops back to block 4203 on the "no" branch. Once a trigger occurs, flow proceeds on the "yes" branch to block 4204, where STT 104 sends event trigger data to video head 3402. Flow then proceeds to block 4205, where STT 104 determines if a response to the event trigger will be requested. If not, flow returns to block 4203 on the "no" branch to await the next trigger. If a response will be requested, flow proceeds on the "yes" branch from block 4205 to block 4206, where STT 104 awaits the response. Until a response is received, flow loops back to block 4206 on the "no" branch. Once a response is received, flow proceeds on the "yes" branch to block 4207, where the response is processed. From block 4207, flow returns to block 4203.

Figure 42B:
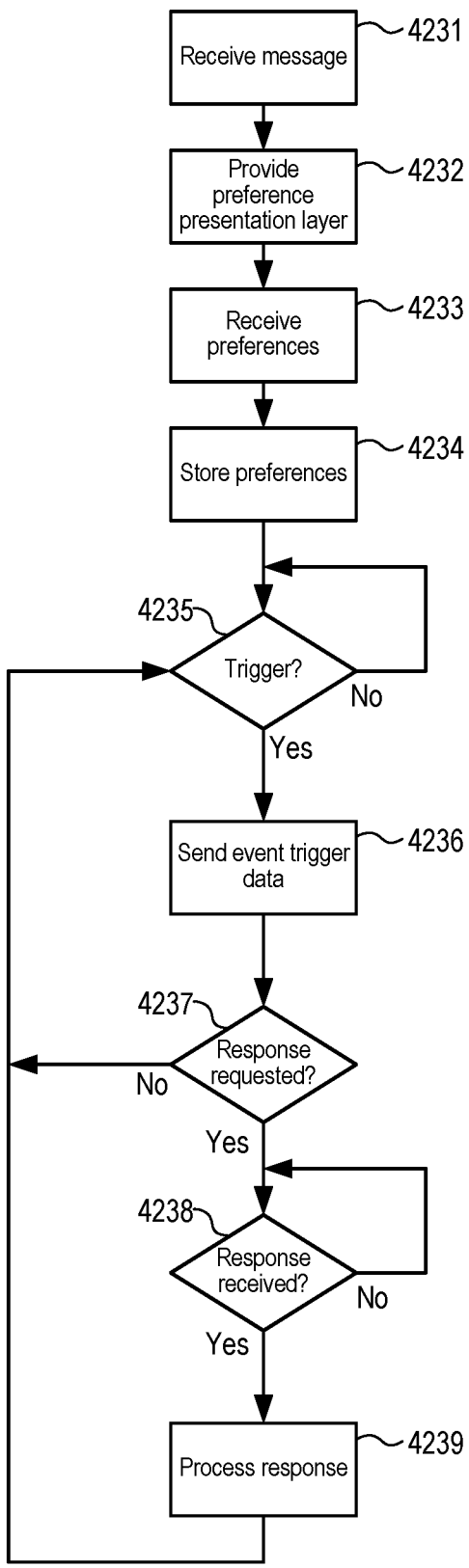

FIG. 42B is a flow chart showing operations performed by STT 3804 in at least some embodiments according to FIG.

39. In block 4231, STT 3804 receives a message from CPE gateway 3811 indicating that the user wishes to access his or her video preferences. In block 4232, STT 3804 provides a video notification preferences presentation layer to handset 3801 via gateway 3811. STT 3804 receives preferences data forwarded from gateway 3811 in block 4233 and stores that data at block 4234. Although shown as a single sequence of four blocks for simplicity, the steps corresponding to blocks 4231 through 4234 could be repeated multiple times as part of a single video notification preferences editing session. STT 3804 then proceeds to block 4235 and waits for an event trigger. Until a trigger occurs, flow loops back to block 4235 on the "no" branch. Once a trigger occurs, flow proceeds on the "yes" branch to block 4236, where STT 3804 sends event trigger data to handset 3801 via gateway 3811. Flow then proceeds to block 4237, where STT 3804 determines if a response to the event trigger will be requested. If not, flow returns to block 4235 on the "no" branch to await the next trigger. If a response will be requested, flow proceeds on the "yes" branch to block 4238, where STT 3804 awaits the response. Until a response is received, flow loops back to block 4238 on the "no" branch. Once a response is received, flow proceeds on the "yes" branch to block 4239, where the response is processed. From block 4239, flow returns to block 4235.

Figure 43:
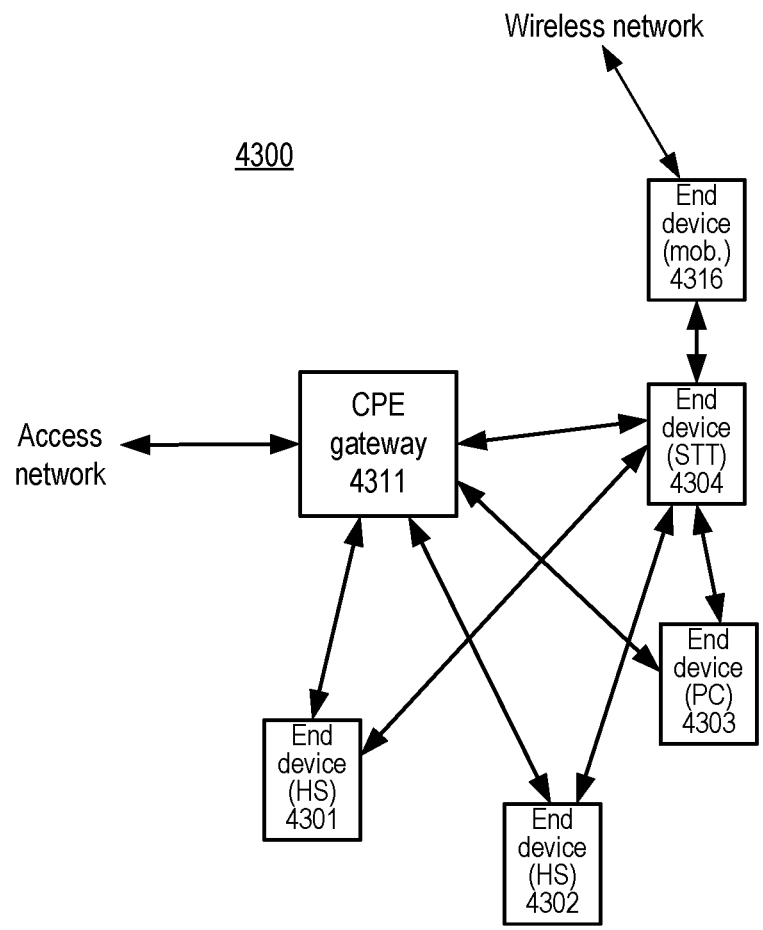
FIG. 43 is a block diagram of a local premises in an embodiment in which a separate video notification server can be omitted.

FIG. 43 is a block diagram of a local premises 4300 in another embodiment in which a separate video notification server can omitted. The embodiment of FIG. 43 shows a converged service delivery infrastructure in which device to device communication is possible, and each device can send commands and/or notifications to other devices. CPE gateway 4311, DECT handset end devices 4301 and 4302, PC end device 4303, STT end device 4304 and smart phone end device 4316 are similar to CPE gateway 111, DECT handset end devices 101 and 102, PC end device 103, STT end device 104 and smart phone end device 116, respectively, described in connection with FIG. 34 and earlier figures. Specifically, the devices in FIG. 38 have hardware similar to that described in connection with similar earlier-described devices, but are programmed or otherwise configured to carry out operations as described below. Each of CPE gateway 4311, DECT handset end devices 4301 and 4302, PC end device 4303, STT end device 4304 and smart phone end device 4316 may additionally include a local wireless communication interface (e.g., a BLUETOOTH interface) and associated software so as to permit device-to-device communication within premises 4300. In some embodiments according to FIG. 43, a handset end device (e.g., device 4301 or 4302) and an STT end device (e.g., device 4304) could each be a SIP end point and know the capabilities, addresses and routing mechanisms applicable other devices. In some such embodiments, a command from a handset could be routed to the STT without terminating the command in CPE gateway 4311 or in an external network element. Communications in the embodiment of FIG. 43 would be similar to those shown in FIG. 39, but with most (or all) preference editing, notification and response communications passing directly between a handset and an STT without being relayed by CPE gateway 4311.

In some variations on the embodiments of FIG. 43, a handset end device could derive the capabilities, addresses and commands for the STT via CPE gateway 4311 from an external network element (e.g., application server 118). In further variations on the embodiments of FIG. 43, notifications flow directly from the STT to a handset, but notification responses and other commands to the STT flow to an external network element (e.g., a server similar to video notification server 3401). That external network element would then interpret the command received from the handset, convert it into a suitable form, and forward it to the STT. Personalization, device lookup, capabilities, etc. could be managed in the external network cloud.

Referring again to FIG. 1, one of the end devices shown in the local service domain of CPE gateway 111 is smart phone 116. In at least some embodiments, a mobile device such as smart phone 116 is able to operate in a wide area wireless network and can become an end device in a local service domain. Once the mobile device joins the local service domain, that device can receive any of the notifications or other above-described services provided to DECT handsets 101 and 102, PC 103 or other end devices. As used herein, a "wide area wireless network" is a wireless network that provides telephony and/or data services in a region that can include multiple premises. Examples of such wide area wireless networks include but are not limited to cellular telephone networks, 3G mobile networking and telecommunication networks, EDGE (Enhanced Data rate for GSM Evolution) networks, and EVDO (EVolution Data Optimized) networks. A "mobile device" is a smart phone, PDA or other device that is able to directly communicate in a wide area wireless network using an appropriate transceiver.

In at least some embodiments, a local service domain of a CPE gateway is dynamic and can be joined by an incoming mobile device. Upon coming within the range of one of the local wireless interfaces used by a CPE gateway for communication with end devices (e.g., within range of a WiFi interface, a femtocell interface, or a BLUETOOTH interface), the mobile device announces its presence to the CPE gateway. The CPE gateway then learns the capabilities of the mobile device and establishes a communication link with the mobile device over one of the gateway's local wireless interfaces. As part of establishing the communication link, the CPE gateway may authenticate the mobile device by consulting AMS 119 and user data profile database 120 (or some other database) and/or by requiring a local service domain password from the mobile device. The CPE gateway and the mobile device may also exchange encryption keys or other data to maintain privacy of communications within the local service domain. Once the communication link has been established, the CPE gateway adds the mobile device to its list of end devices in its local service domain and begins providing notifications and other services to the mobile device in accordance with profile data of a user associated with the mobile device. The user associated with the mobile device may be a member of a household or other group of users and who previously created a user profile. Alternatively, the user of the mobile device may be a "guest" user who receives notifications and services according to a default profile or according to some other profile specifically created for temporary users. When providing notifications and services to the mobile device, the CPE gateway may use the stored information about the mobile device capabilities to adjust or otherwise modify notifications and services so as to accommodate display size, display resolution, software versions, and/or other aspects that might be unique to the mobile device.

As explained in further detail below, a mobile device may include multiple transceivers. One transceiver may be used for direct communications with the wide area wireless network and another transceiver may be used for communications with a WiFi, BLUETOOTH or other local area wireless network. A TN or other identifier may be associated with the mobile device by the operator of a wide area wireless network with which the mobile device is associated. For example, the mobile device may be associated with a particular subscriber having an account with the operator of the wide area wireless network associated with the mobile device (the "home wireless network" of the mobile device), which operator may be the same or different than the operator of network 100 (FIG. 1). For convenience, the TN or other identifier used by the home wireless network of a mobile device will be referred to as the TN for that mobile device (e.g., "the device 116 TN"). In some embodiments, services received by a mobile device through its home wireless network can be linked to services received by that mobile device after joining the local service domain of a CPE gateway. In some such embodiments, the mobile device TN may also become available for use by other end devices through the joined local service domain. In other embodiments, services received by a mobile device through its home wireless network are not linked to services received through a joined local service domain, and the mobile device TN is not available for use by other end devices within the joined local service domain.

Figure 44:
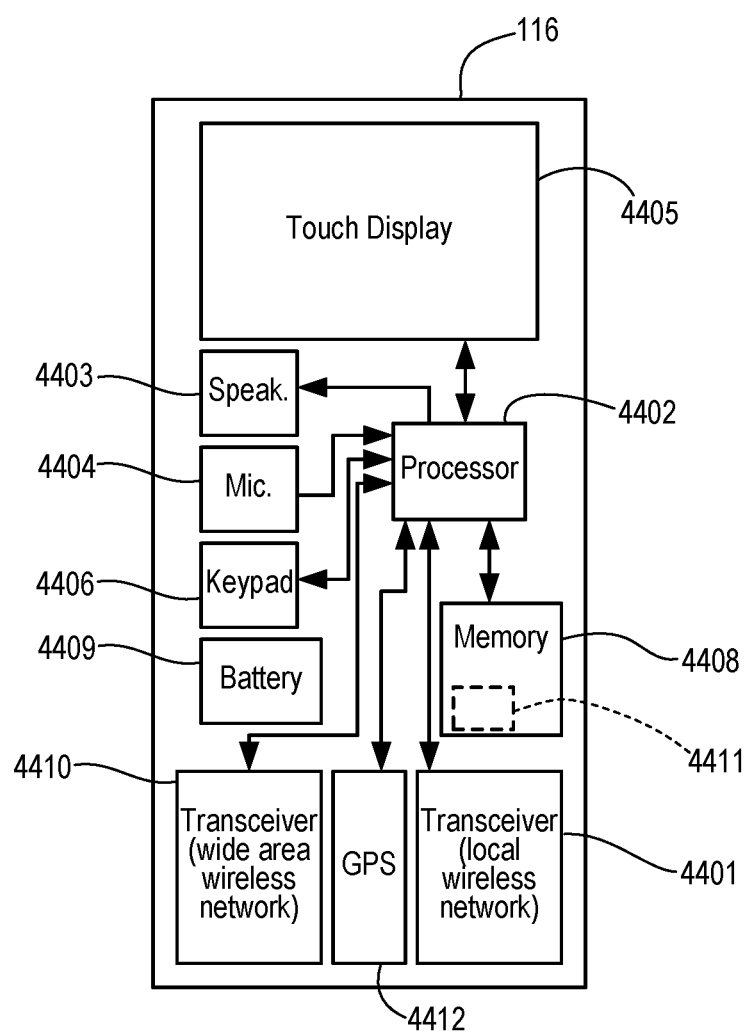
FIG. 44 is a block diagram of a smart phone mobile device according to some embodiments.

FIG. 44 is a block diagram of smart phone 116 according to some embodiments. Smart phone 116 includes a transceiver 4410 used for direct communication over a wide area wireless network. The wide area wireless network in which device 116 communicates may be the home wireless network or may be a wide area wireless network into which device 116 has roamed. Transceiver 4410 demodulates signals received over a wide area wireless network and that modulates data and transmits modulated data signals in the wide area wireless network. A second transceiver 4401 demodulates signals received in a local wireless network (e.g., a WiFi or BLUETOOTH network), modulates data and transmits modulated data signals in that local wireless network. A GPS (Global Positioning System) receiver 4312 receives GPS satellite signals, computes position data based on those signals, and outputs that position data to a processor 4402. Transceiver 4410 and 4401 also exchange data with processor 4402, which is configured to execute instructions so as to perform various operations as described herein and to control operation of other components of mobile device 116. Those instructions may be stored in memory 4408 as executable instructions and/or as hard wired logic within processor 4402. For example, stored in memory 4408 is a local service domain client 4311. Client 4311 includes data and instructions that configure processor 4402 to communicate with CPE gateway 111 using transceiver 4301, to output audio and video associated with notifications and other services to a user of device 116, and to receive input from a user of device 116 as part of interaction with services in the local service domain of gateway 111. Processor 4402 is also configured to perform one or more types of CODEC operations to convert data to audio for output through speaker 4403 and to convert sound received through microphone 4404 into data. Processor 4402 outputs video data to a display 4405 and receives user input through a keypad 4406 and/or through touch sensitive portions of display 4405. Processor 4402 is configured to provide a browser or other graphical user interface (GUI) on display 4405 by which a user of device 116 can receive visual indicators for notifications, access various services, view displayed video, configure a user profile, etc. A battery 4409 provides electrical power to device 116.

In some embodiments, and as indicated above, the services received by device 116 through its home wireless network are not linked to the services received by device 116 after joining the local service domain of CPE gateway 111. In effect, device 116 simply becomes another handset end device in the local service domain similar to handsets 101 and 102. In some such embodiments, device 116 communicates with gateway 111 over a local wireless interface to receive telephone calls (using one of the TNs or other call session identifiers associated with the network 100 account corresponding to gateway 111), to receive and attend notifications (including video service notifications), and to receive other of the above-described services available to handsets 101 and 102. However, incoming telephone calls to the device 116 TN and other communications through the wide area wireless network will not pass through gateway 111, and end devices in the gateway 111 local service domain will not be able to initiate calls through gateway 111 using the device 116 TN. In some such embodiments, wide area wireless network transceiver 4410 of device 116 may remain active, thereby permitting device 116 to simultaneously communicate over the wide area wireless network directly (using the device 116 TN) and communicate with (and receive services from) gateway 111. In other such embodiments, transceiver 4410 may be disabled while device 116 is joined to a local service domain.

Figure 45:
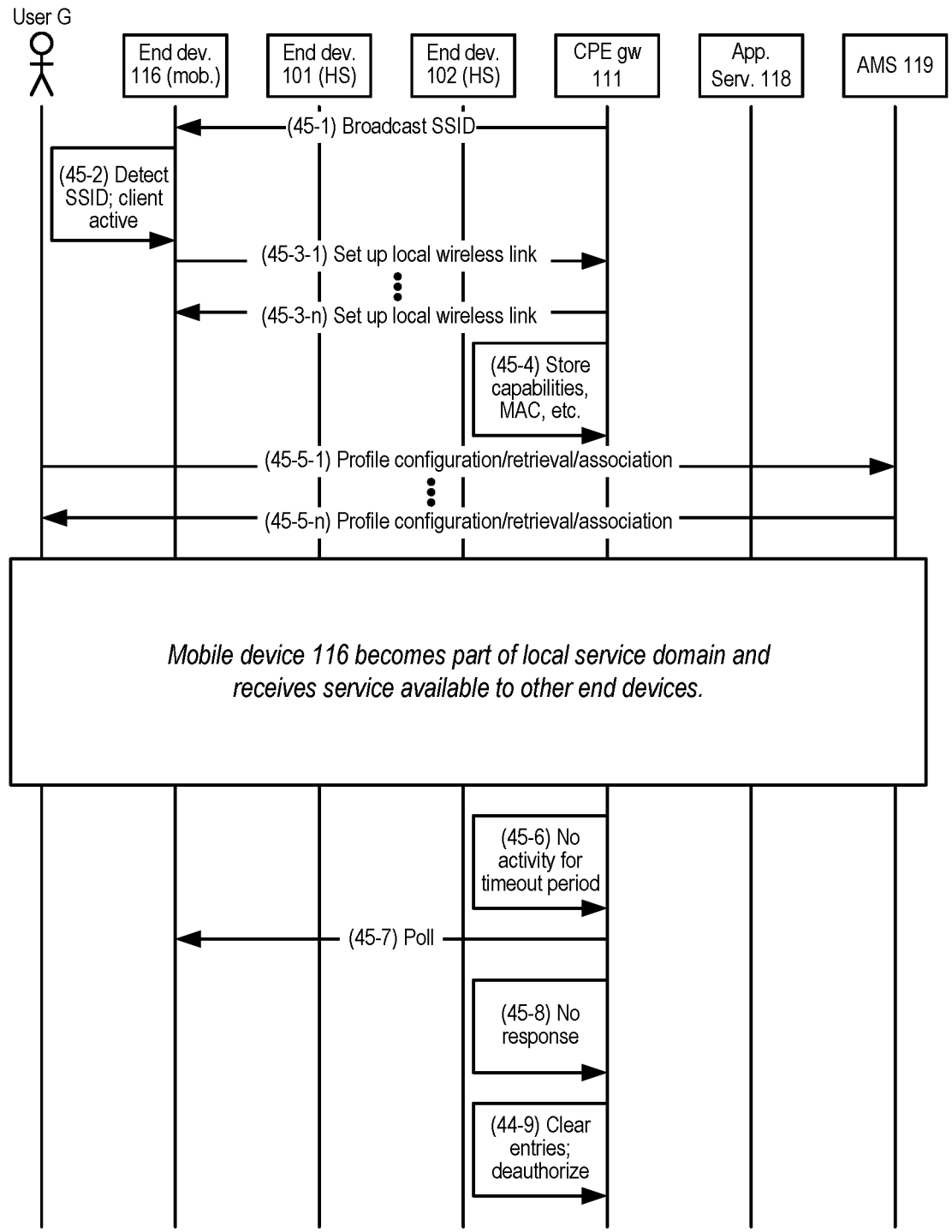
FIG. 45 is a communication diagram showing information flows in connection with a mobile device joining a local service domain according to some embodiments.

FIG. 45 is a communication diagram showing information flows in connection with device 116 joining the local service domain of CPE gateway 111, and where services received through the home wireless network (or through some other wide area wireless network into which device 116 might roam) are not linked to services received through CPE gateway 111. The examples of FIG. 45 and of subsequent drawings assume that device 116 establishes communications with CPE gateway 111 over a WiFi interface such as an interface according to IEEE 802.11. However, the techniques and operations described below are also applicable to other types of local wireless networks. Adaptation of such techniques to a different type of local wireless network and protocols associated with such other local network type are routine matters within the abilities of a person of ordinary skill once such a person is provided with the information contained herein.

After entering premises 110 or otherwise coming within the range of a WiFi transceiver of interface 414 or interface 413 of gateway 111 (see FIG. 4), device 116 possessed by a user G receives the SSID (Service Set IDentifier) of the local wireless network gateway 111 (line 45-1). User G may be a guest or may be a user who has a pre-existing profile for the gateway 111 local service domain. At line 45-2, client 4311 determines that the received SSID corresponds to a joinable local service domain and initiates communications to join that local service domain. At lines 45-3-1 and through 45-3-$n$, device 116 and gateway 111 exchange authentication data and negotiate communication parameters, device 116 provides its capabilities, gateway 111 assigns an IP address to device 116, and other aspects of the local wireless link setup are performed. After the link is set up (or as part of that setup), gateway 111 stores device capabilities of device 116, the MAC and IP addresses of transceiver 4301, and other data associated with device 116 (line 45-4).

Next, and as shown generally by lines 45-5-1 through 45-5-$n$, CPE gateway 111 associates profile data with device 116. In some embodiments, CPE gateway 116 initially sends a message that causes device 116 to present a profile selection/configuration UI on display 4305. This UI prompts user G to indicate whether he or she wishes to retrieve an existing profile, to create a new profile, or to use a default or guest profile. If user G selects retrieval of an existing profile corresponding to user G, a series of operations similar to those of lines 7-1 through 7-5 of FIG. 7 are performed, except that user G communicates using device 116 instead of device 101. If user G selects creation of a new profile, operations similar to those of lines 6-1 through 6-17 of FIG. 6 are performed (with the user communicating using device 116 instead of device 101). If user G selects use of a default profile, operations similar to those of lines 7-1 through 7-5 of FIG. 7 are performed, except that a default profile is retrieved from AMS 119.

After the operations of lines 45-5-1 through 45-5-*n*, device 116 is part of the CPE gateway 111 local service domain. At this point, device 116 can receive notifications, telephone calls and other services through gateway 111, according to the user profile associated with device 116, like other end devices in the local service domain. For example, and depending on the profile settings applicable to device 116, user G may receive services and notifications listed in Table 1 as though device 116 were another DECT handset, may select one of the TNs associated with gateway 111 to make an outgoing call, may barge into an ongoing call, may receive PA messages, may access address book data, may receive video services, may receive data services (e.g., email, instant messaging, news feeds, Internet access) and/or may receive and respond to video service notifications.

In some embodiments according to FIG. 45, device 116 is dropped from the gateway 116 local service domain if gateway 111 does not detect activity from device 116. As shown at line 45-6, gateway 111 determines that it has received no communication from device 116 for a predetermined time period. In response, gateway 111 sends a polling message to device 116 (line 45-7). After not receiving a poll response from device 116 (line 45-8), gateway 111 clears data entries for device 116 stored by gateway 111 and deauthorizes device 116 as an end device (line 45-9).

In other embodiments, the services received by device 116 through a wide area wireless network are linked to services receivable through the local service domain of CPE gateway 111. After device 116 joins the local service domain (or as part of the joining process) in such embodiments, CPE gateway 111 sends one or more notifications to external IMS network elements. In particular, gateway 111 notifies those elements that device 116 is now communicating through gateway 111, and that communications directed to device 116 should be routed to gateway 111. In addition to receiving notifications and services from gateway 111 as was described in connection with FIG. 45, device 116 will thus also receive calls directed to the device 116 TN (or other identifier associated with device 116 in a wide area wireless network) through gateway 111 and the access sub-network 112 serving gateway 111. Moreover, the device 116 TN will become available for association with outgoing calls initiated by other end devices in the gateway 111 local service domain.

Figure 46:
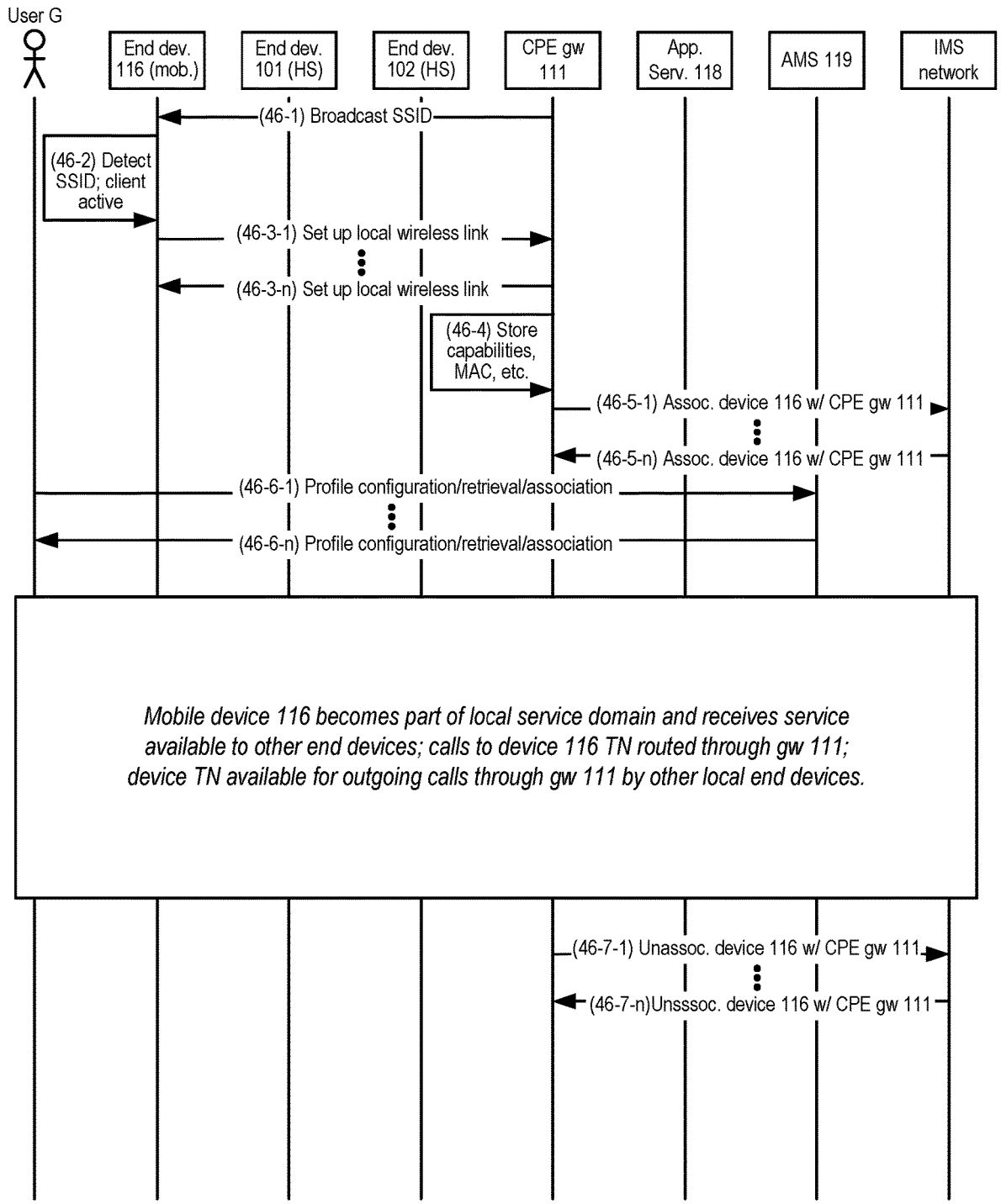
FIG. 46 is a communication diagram showing information flows in connection with a mobile device joining a local service domain according to some additional embodiments.

FIG. 46 is a communication diagram showing information flows in connection with device 116 joining the local service domain of CPE gateway 111, and where services received through a home wireless network of device 116 are linked to services received through gateway 111. Mobile device 116, gateway 111, server 118 and AMS 119 in embodiments according to FIGS. 46-50 may have hardware that is similar to the hardware of those elements in previously-described embodiments. In embodiments according to FIGS. 46-50, however, these elements are configured (e.g., with modified software and/or firmware) to operate as described below. In alternate embodiments, a mobile device, CPE gateway, application server and/or AMS may have different hardware and be configured (e.g., with one or more ASICs) to operate as described below.

Lines 46-1 through 46-4 represent operations similar to those described in connection with lines 45-1 through 45-4 of FIG. 45, except that information provided by device 116 in lines 46-3-1 through 46-3-*n* includes the device 116 TN (the TN associated with device 116 in its home wireless network) or some other identifier associated with device 116. Device 116 may also provide a URI or other data that can be used to contact one or more servers or other elements in an IMS network that serves the home wireless network of device 116. At lines 46-5-1 through 46-5-*n*, CPE gateway contacts elements in the IMS network serving the home wireless network of device 116. CPE gateway 111 provides the device 116 TN (or other identifier) and informs the network elements that device 116 is now associated with gateway 111. The IMS network elements acknowledge that device 116 is now associated with gateway 111, and begin forwarding communications directed to the device 116 TN via gateway 111. The IMS network elements also begin accepting calls associated with the device 116 TN through gateway 111.

Next, and as shown generally by lines 46-6-1 through 46-6-*n*, CPE gateway 111 associates profile data with device 116. Lines 46-6-1 through 46-6-*n* represent operations similar to those described in connection with lines 45-5-1 through 45-5-*n* of FIG. 45. After the operations of lines 46-6-1 through 46-6-*n*, device 116 is part of the CPE gateway 111 local service domain and can receive notifications and other services through gateway 111, according to the user profile associated with device 116, like other end devices in the local service domain. However, the device 116 TN can now be added to the TNs available for calls from other end devices in the gateway 111 local service domain. Similarly, incoming calls directed to the device 116 TN may be receivable at other end devices. Use of the device 116 TN by other end devices is discussed in more detail below. As with other aspects of the services and notifications provided through gateway 111, use of the device 116 TN by other devices in the gateway 111 local service domain is subject to the profile of the user associated with device 116 and/or to the profiles of other users. In some embodiments, for example, user G may create a profile that does not allow the device 116 TN to be used by other end devices.

In some embodiments according to FIG. 46, and using operations similar to those described in connection with lines 45-6 through 45-9 of FIG. 45, gateway 111 drops device 116 from the local service domain if gateway 111 does not detect activity from device 116 after a predetermined amount of time. As shown by lines 46-7-1 through 46-7-*n* of FIG. 46, however, gateway 111 may also (or alternatively) drop device 116 from the local service domain in response to a message from one or more external IMS network elements. In certain embodiments, client 4411 in device 116 may be configured to detect when device 116 is no longer within range of the local wireless network transceiver of gateway 111 (e.g., based on non-receipt of the local wireless network SSID or other signal for a predetermined time period, based on an RSSI (received signal strength indicator) of the local wireless network below a predetermined value, etc.). In response to this detection, processor 4402 of device 116 (FIG. 44) re-registers with a wide area wireless network using transceiver 4410. In response to this re-registration, one or more elements of the IMS network serving the wide area wireless network send messages to gateway 111 indicating that device 116 is no longer in range and should be unassociated with the local service domain.

In at least some embodiments according to FIG. 46, integration of services provided by a home wireless network with services available through a joined local service domain allow various service enhancements. For example, such integration can allow notifications of calls to a mobile device TN to be displayed through other end devices in the joined local service domain. Once the mobile device is part of the local service domain, a notification of a call to the mobile device TN could be provided to one or more end devices in the local service domain authorized to received such notifications by the applicable user profile(s). The notification could also include the caller identification (CID) of the calling party.

Figure 47:
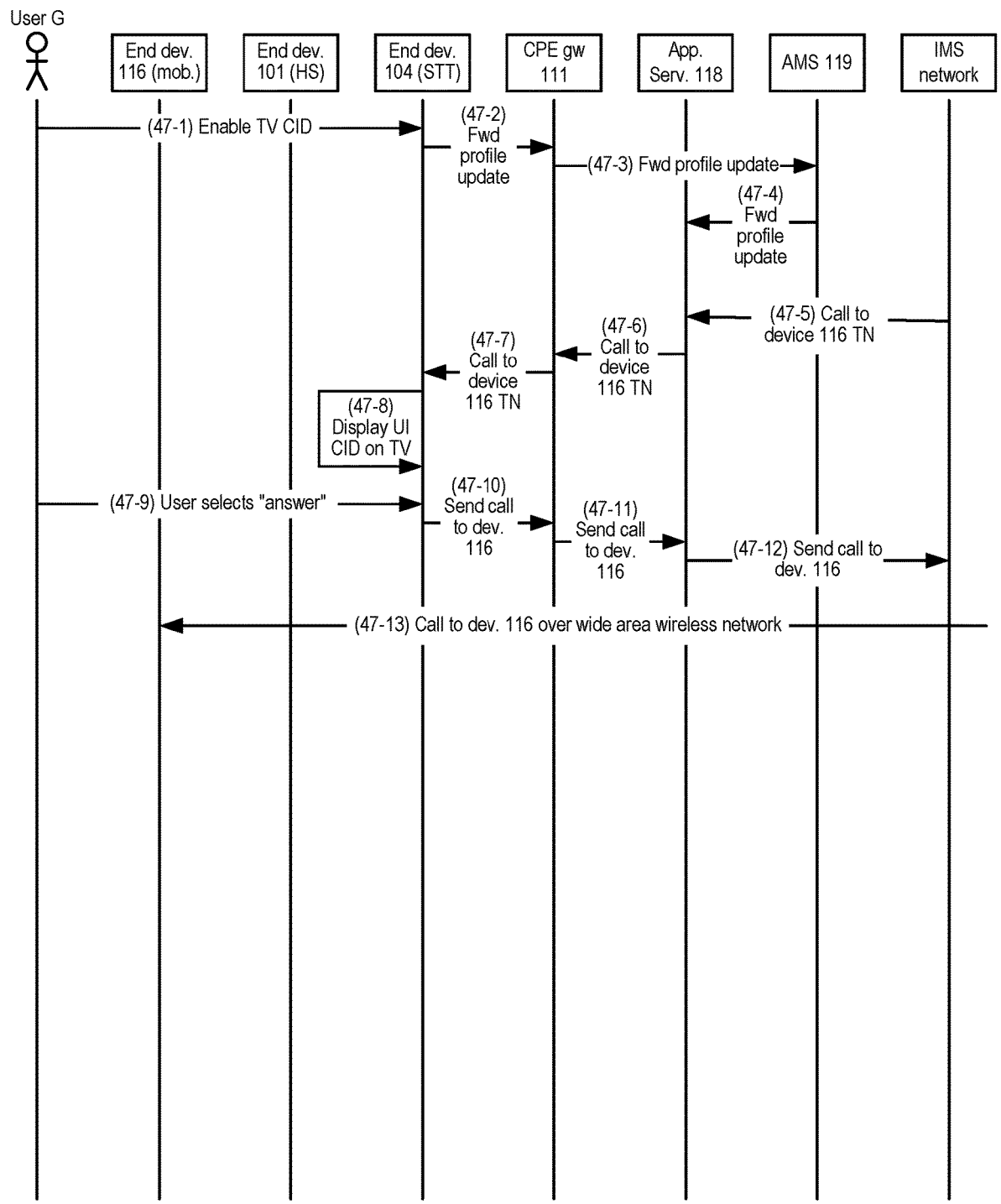
FIG. 47 is a communication diagram showing information flows in an embodiment where a notification of an incoming call is displayed on a television connected to an STT end device.

FIG. 47 is a communication diagram showing information flows in an embodiment where a notification of an incoming call to the device 116 TN is displayed on a television connected to STT end device 104. In the embodiment of FIG. 47, application server 118 and AMS 119 are IMS application servers communicating with local CPE gateway 111 through one or more CSCF elements in the external network. At line 47-1, user G enables receipt of incoming call notifications on a television (not shown) connected to STT 104. User G can enable this feature, using a remote control device that communicates with STT 104, through a GUI presented by STT 104 on the attached television. In response, STT 104 sends the profile update information to CPE gateway 111 (line 47-2), which then forwards the profile update to AMS 119 at line 47-3. AMS 119 then forwards the profile update to application server 118 at line 47-4. The operations corresponding to lines 47-1 through 47-4 could occur before or after device 116 joins the local service domain of gateway 111.

Subsequent to the operations of lines 47-1 and 47-4, and after device 116 has joined the local service domain of gateway 111, an external user outside of premises 110 makes a call to the device 116 TN. The network in which an external user has made the call (which may be network 100 or another network) signals the initiation of that call (e.g., a SIP INVITE request message) to network 100, which signal ultimately causes IMS elements within network 100 to signal application server 118 of the incoming call (line 47-5). After determining that the user profile is configured so that incoming call notifications for the device 116 TN are to be sent to STT 104, server 118 forwards a notification about the incoming call to gateway 111 (line 47-6). Gateway 111 then forwards the notification to STT 104 (line 47-7), which presents the notification on the video screen of the television connected to STT 104 (line 47-8). If the notification has audio components (e.g., a beep or other sound the user has associated with notifications), those audio components can be presented through the audio system of the television.

In the example of FIG. 47, the notification may include a GUI in a portion of the screen (e.g., an overlay on a movie or other program being watched) offering the user various options. A first option may be to answer the call through device 116 over the wide area wireless network in which device 116 is currently located. For example, premises 110 may be located outside the geographic region served by the home wireless network of device 116, and device 116 may be roaming in a wide area wireless network serving the geographic region in which premises 110 is located. A second option may be to answer the call through the local service domain using device 116 or another end device in the local service domain. A third option may be to forward the call to another user identity (e.g., another identity of the user or the identity of a different user), and a fourth option may be to ignore the call. After seeing and/or hearing the notification, user G responds (e.g., using the STT 104 remote control to select a desired option from the GUI) at line 47-9.

In the present example, user G selects the first option (answer the call through a wide area wireless network). STT 104 then forwards the user G response to gateway 111 (line 47-10), which forwards the response to server 118 (line 47-11). Server 118 then signals the appropriate IMS network elements that the incoming call is to be connected to device 116 over the wide are wireless network in currently serving device 116 (line 47-12). This results in the call being connected to device 116 over that wide area wireless network (not shown) at line 47-13.

If user G had selected the second option at line 47-9 (answer the call through the local service domain), this selection would instead have been passed to the appropriate IMS network elements, which would then have routed the call to device 116 and/or other end devices through gateway 111. If user G had selected the third option (forward the call to another user identity), the GUI presented by STT 104 could then list available user identities to which the call could be transferred. After user G selects one of those identities, the selection would have been passed to the appropriate IMS network elements. The call would then have been routed to device 116 and/or other end devices through gateway 111, but with the notification(s) on the end device(s) being in accordance with the profile of the user identity selected as the forwardee. If the fourth option had been selected, the appropriate IMS network elements could route the call to the voice mail of user G.

Figure 48:
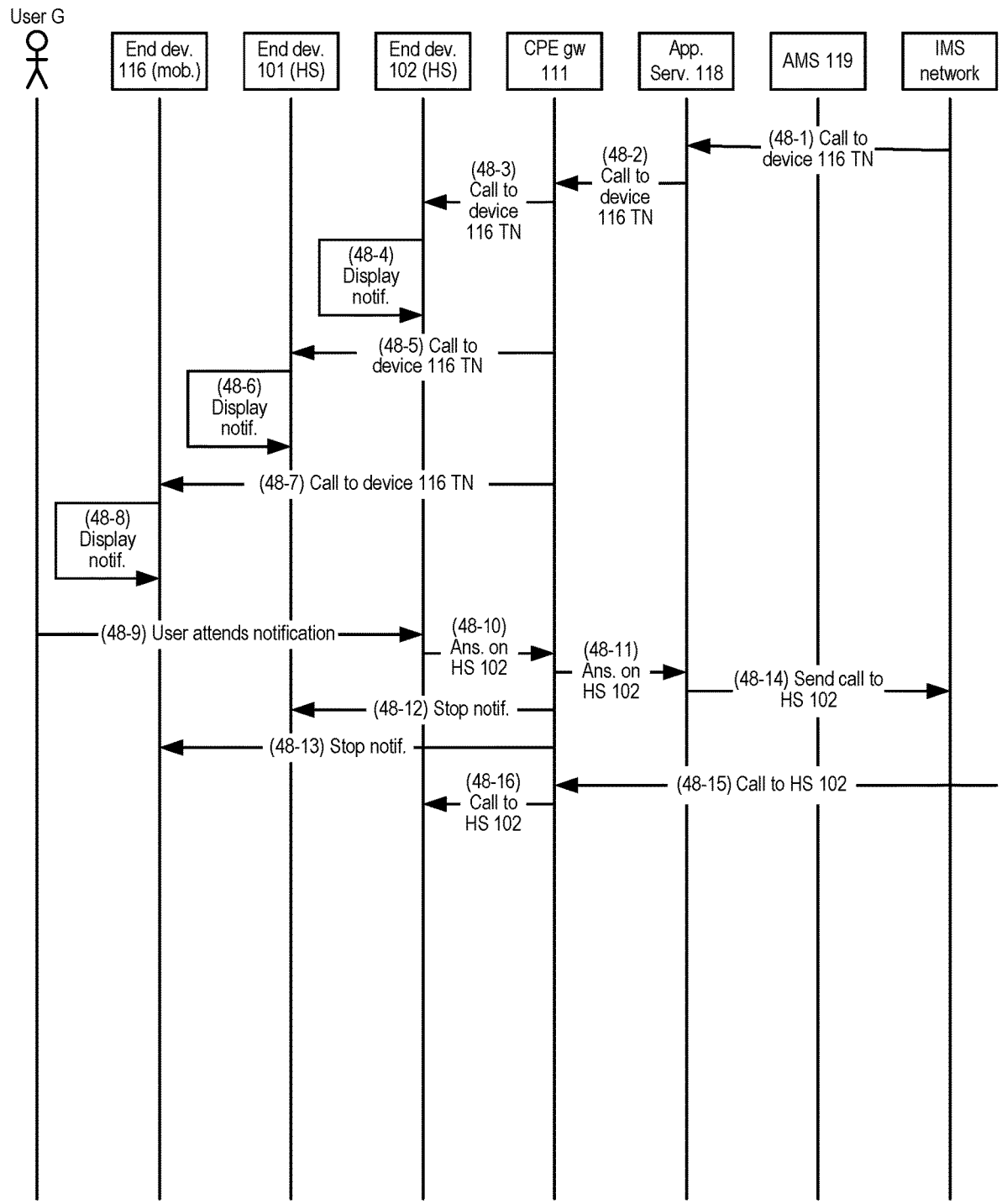
FIG. 48 is a communication diagram showing information flows where notification of an incoming call to a mobile device TN is displayed on multiple end devices in a local service domain.

FIG. 48 is a communication diagram showing information flows where notification of an incoming call to the device 116 TN is displayed on multiple end devices in the local service domain. As in FIG. 47, application server 118 and AMS 119 in the example of FIG. 48 are IMS application servers communicating with local CPE gateway 111 through one or more CSCF elements in the external network. Unlike the example of FIG. 47, however, user G has not configured a profile to cause notification of incoming calls to the device 116 TN to be treated differently from incoming calls to other TNs associated with gateway 111. After device 116 has joined the gateway 111 local service domain, an external user outside of premises 110 makes a call to the device 116 TN. The network in which external user has made the call (which may be network 100 or another network) signals the initiation of that call (e.g., a SIP INVITE request message) to network 100, which signal ultimately causes IMS elements within network 100 to signal application server 118 of the incoming call (line 48-1). After checking the profile for user G, server 118 forwards a notification about the incoming call to gateway 111 (line 48-2). Gateway 111 then forwards the notification to handset 102 at line 48-3, which presents the incoming call notification at line 48-4. Gateway 111 similarly forwards the notification to handset 101 (line 48-5) and to device 116 (line 48-7), each of which also presents the notification (lines 48-6 and 48-8). Depending on the applicable profile for user G, other end devices might also receive and present the notification. If device 116 is not active (e.g., if device 116 has been turned off), the notification to device 116 could be omitted.

User G attends the notification on device 102 at line 48-9 and by selecting an option (e.g., an "answer" icon on the screen of handset 102) indicating the call will be taken on handset 102. This selection is forwarded to gateway 111 at line 48-10, which then forwards the indication to server 118 at line 48-11. After forwarding the user G selection at line 48-11, gateway 111 also causes handset 101 and device 116 to cease the notification of the incoming call (lines 48-12 and 48-13). Server 118 signals the appropriate IMS elements that the call will be answered using handset 102 (line 48-14), and the call is then routed to handset 102 through gateway 111 (lines 48-15 and 48-16).

Figure 49:
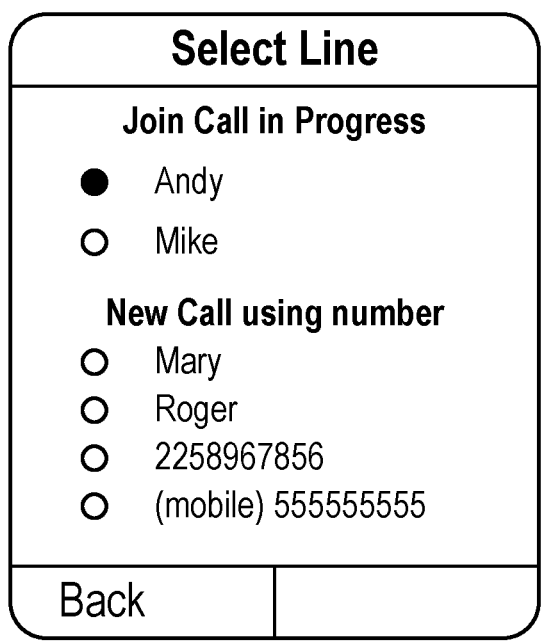
FIG. 49 shows a display of active calls and available TNs similar to that of FIG. 19, but with a mobile device TN added to numbers that can be selected to make a new call.

Integrating wide area wireless network services of device 116 with services available through the local service domain of gateway 111 can also allow use of the device 116 TN for outgoing calls initiated from end devices in the local service domain. As previously explained in connection with FIGS. 18-20, users in premises 110 may be permitted to select one of multiple TNs for an outgoing call and/or to barge in on a pre-existing call using one of those TNs. Once device 116 joins the local service domain of gateway 111, the device 116 TN is added to the available TNs. FIG. 49 shows a display of active calls and available TNs similar to that of FIG. 19, but with the device 116 TN ("(mobile) 5555555555") added to the numbers that can be selected to make a new call. If the device 116 TN were selected for an outgoing call, that TN would appear as the calling number in the recipient's CID.

Figure 50:
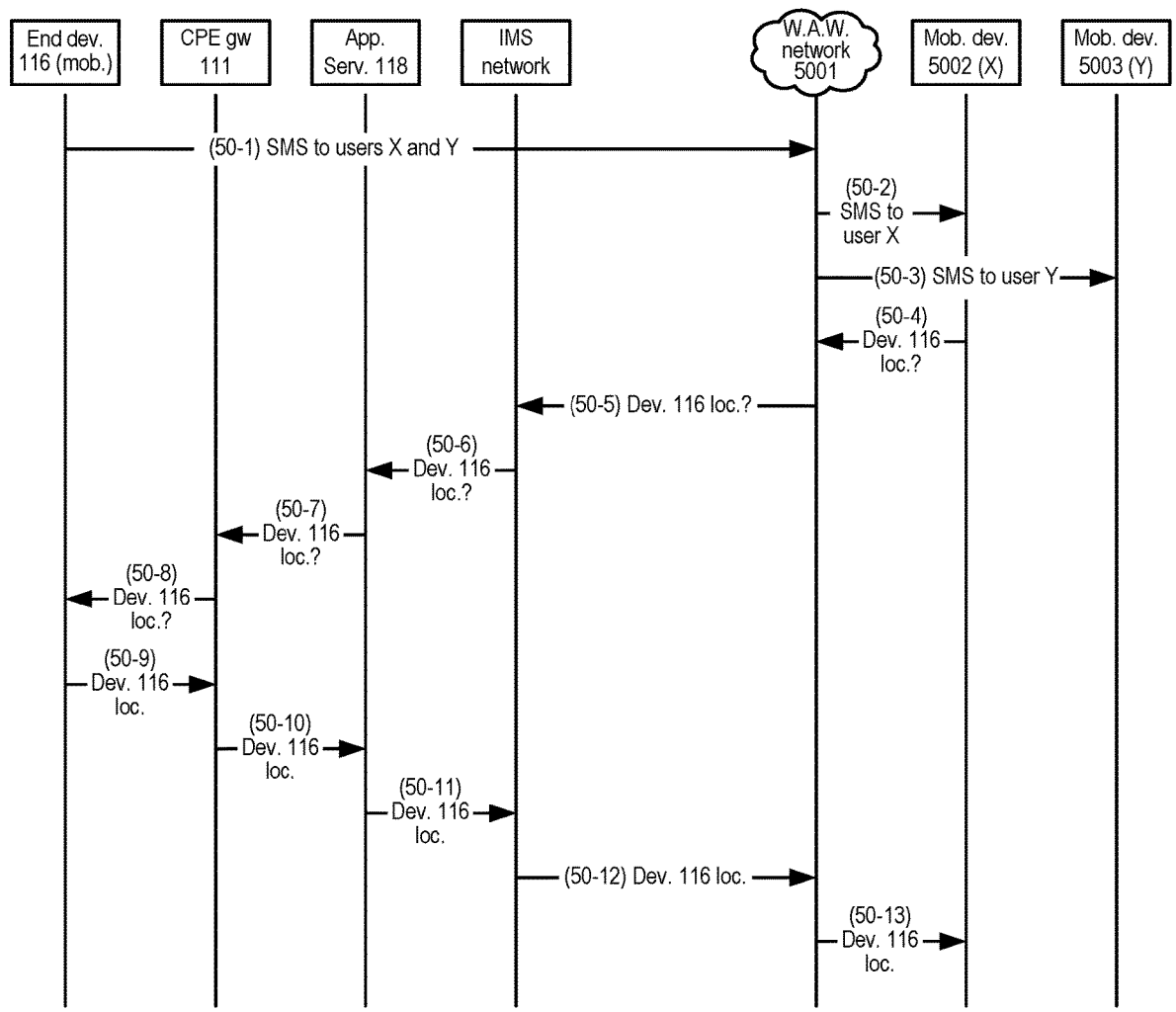
FIG. 50 is a communication diagram showing information flows in connection with a location identification feature according to some embodiments.

FIG. 50 is a communication diagram showing information flows in connection with a location identification feature according to some embodiments. As in FIGS. 47 and 48, application server 118 is an IMS application server communicating with local CPE gateway 111 through one or more CSCF elements in the external network. After device 116 has joined the local service domain of gateway 111, user G (not shown) uses device 116 to send an SMS message to mobile devices 5002 and 5003 of users X and Y, respectively. Devices 5002 and 5003 are currently communicating in a wide area wireless network 5001. For simplicity, FIG. 50 shows communication of the SMS message to network 5001 as a single line. However, the SMS message could be delivered in any of various manners. For example, transceiver 4410 of device 116 (see FIG. 44) could still be active, thereby allowing device 116 to communicate directly with network 5001 or with another wide area wireless network that then forwards the SMS message to network 5001. As another example, the SMS message could be communicated through gateway 111 and elements of the IMS network serving gateway 111.

At lines 50-2 and 50-3, the SMS message is delivered to devices 5002 and 5003. Upon receiving the SMS, user X activates a locator application stored in device 5002 that causes the device to send a location query message regarding the sender of the just received SMS (line 50-4). Network 5001 forwards this query to the IMS network serving gateway 111 (line 50-5), which forwards the query to server 118 (line 50-6). If the location of device 116 is not already stored by server 118, a location query is then sent to device 116 via gateway 111 (lines 50-7 and 50-8). Using its GPS receiver 4412 (FIG. 44), device 116 determines its location and then sends that location to server 118 via gateway 111 (lines 50-9 and 50-10). That location is then forwarded by server 118 via the IMS network to network 5001 (lines 50-11 and 50-12), which then forwards the location to device 5002 (line 50-13). If user Y were to also activate a locator application in device 5003, a similar series of communications would follow so as to provide the device 116 location to device 5003.

Notably, a local service domain joined by device 116 in some embodiments need not be a residence. For example, a restaurant or other business may have its own CPE gateway and local service domain that can be joined by patrons' mobile devices. This could permit a restaurant customer to send an SMS invite to his friends asking them to join him at the restaurant, with the friend then able to learn the restaurant's location using the locator applications in their mobile devices. In some embodiments, a location request may include the telephone number associated with a received SMS message, and a location request response could include a map and/or driving directions. In still other embodiments, an application server or a gateway receiving a location request provides the gateway location instead of a GPS location of the device sending an SMS.

Figure 51:
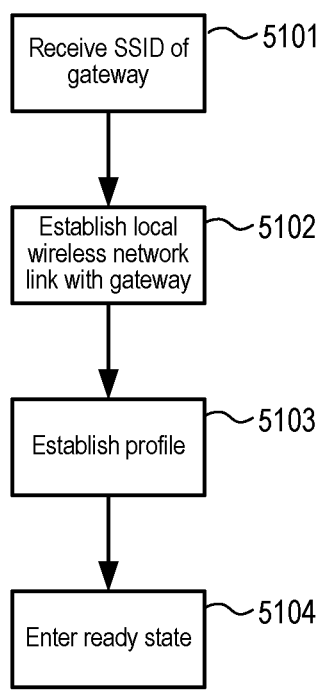
FIG. 51 is a flow chart showing operations performed by a mobile device according to various embodiments.

FIG. 51 is a flow chart showing operations performed by mobile device 116 according to various embodiments described above. After coming within range of a WiFi transceiver in CPE gateway 111, device 116 receives an SSID of the local wireless network for gateway 111 (block 5101). Block 5101 corresponds to operations performed by device 116 in connection with line 45-2 of FIG. 45 or line 46-2 of FIG. 46. Device 116 next sets up a wireless link with gateway 111 at block 5102 (which corresponds to operations performed by device 116 in connection with lines 45-3-1 through 45-3-*n* of FIG. 45 or lines 46-3-1 through 46-3-*n* of FIG. 46). Next, and as represented by block 5103, device 116 creates, selects or otherwise becomes associated with a user profile (lines 45-5-1 through 45-5-*n* of FIG. 45 or lines 46-6-1 through 46-6-*n* of FIG. 46). Device 116 then enters a ready state at block 5104. In the ready state of block 5104, device 116 is able to receive services through the local service domain of gateway 111 as described above.

Figure 52:
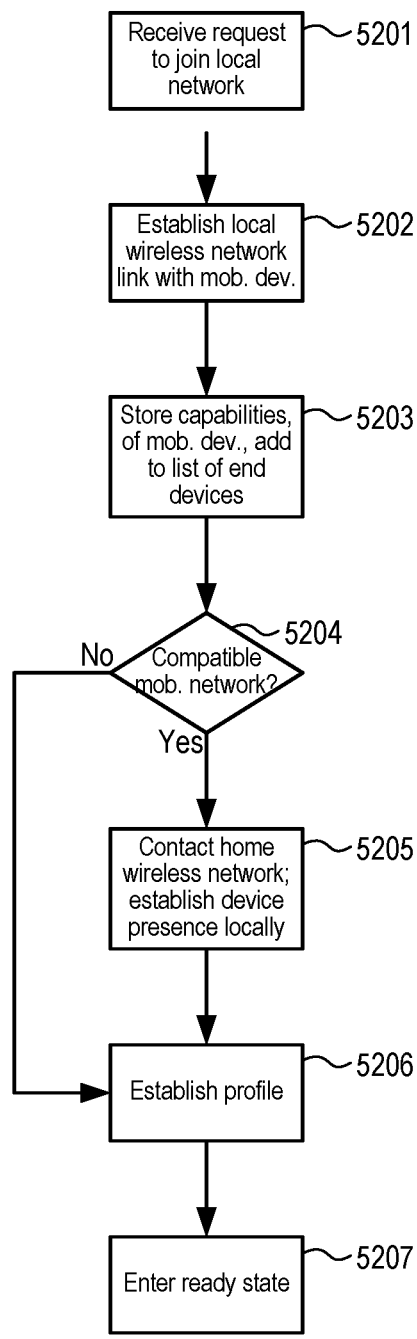
FIG. 52 is a flow chart showing operations performed by a CPE gateway according to various embodiments.

FIG. 52 is a flow chart showing operations performed by CPE gateway 111 according to various embodiments described above. At block 5201, gateway 111 receives a message from device 116 seeking to join the local service domain. Block 5201 generally corresponds to initial operations performed by gateway 111 in connection with lines 45-3-1 through 45-3-*n* of FIG. 45 or to initial operations performed by gateway 111 in connection with lines 46-3-1 through 46-3-*n* of FIG. 46. At block 5202, gateway 111 then sets up the wireless link with device 116. Block 5202 generally corresponds to subsequent operations performed by gateway 111 in connection with lines 45-3-1 through 45-3-*n* of FIG. 45 or to subsequent operations performed by gateway 111 in connection with lines 46-3-1 through 46-3-*n* of FIG. 46. At block 5203, gateway 111 stores data regarding device 116 and adds device 116 to a list of end devices in the local service domain (line 45-4 of FIG. 45 or line 46-4 of FIG. 46).

Next, gateway 111 determines at block 5204 whether device 116 is a device for which wide area wireless network services can be integrated with services in the local service domain. In particular, gateway 111 determines whether the home wireless network of device 116 will support routing of calls to the device 116 TN through gateway 111 and initiation of calls using the device 116 TN from within the gateway 111 local service domain. In some embodiments, gateway 111 makes this determination based on information communicated by device 116. For example, client 4411 (FIG. 44) can be configured to communicate a specific command to gateway 111 that indicates whether the device 116 home wireless network will support integration with a local service domain (and if so, to also provide necessary information for communications with that home wireless network).

If the device 116 home network will support integration, as is the case in at least some embodiments according to FIGS. 46-50, gateway 111 proceeds on the "yes" branch to block 5205. In block 5205, gateway 111 contacts that home wireless network of device 116 and communicates that device 116 has joined the gateway 111 local service domain. In such a case, block 5205 generally corresponds to operations performed by gateway 111 in connection with lines 46-5-1 through 46-5-*n* of FIG. 46. From block 5205, gateway 111 continues to block 5206 to establish profile information for device 116. In circumstances where block 5206 is reached from block 5205, block 5206 generally corresponds to operations performed by gateway 111 in connection with lines 46-6-1 through 46-6-*n* of FIG. 46. If gateway 111 determines in block 5204 that the home wireless network will not support integration, as is the case in at least some embodiments according to FIG. 45, flow instead proceeds to block 5206 directly. In such a case, block 5206 generally corresponds to operations performed by gateway 111 in connection with lines 45-5-1 through 45-5-*n* of FIG. 45. From block 5206, gateway 111 proceeds to block 5207 and enters a ready state. In the ready state, gateway 111 is able to provide services to device 116. The services available to device 116 through gateway 111 in block 5207 will depend on whether the home wireless network supports integration and on the applicable profile(s) associated with device 116.

In some embodiments, a mobile device joining a local service domain may establish a wireless link with a CPE gateway using the same transceiver used for communication with a wide area wireless network (e.g., transceiver 4410 of FIG. 44). For example, a CPE gateway may also include a femtocell interface and an associated short range transceiver for communications using one or more of the frequencies used by the wide area wireless network. In such an embodiment, the mobile device simply registers with the CPE gateway in a manner similar to that in which a mobile device would register with any other base station of the wide area wireless network. After registration all communications from or to the mobile device would use the CPE gateway and it associated network for backhaul communications instead of directly communicating with the wide area wireless network.

Embodiments include a machine readable storage medium (e.g., a CD-ROM, CD-RW, DVD, floppy disc, FLASH memory, RAM, ROM, magnetic platters of a hard drive, etc.) storing machine readable instructions that, when executed by one or more processors, cause a server, gateway, end device or other network device to carry out operations such as are described herein. As used herein (including the claims), a machine-readable storage medium is a physical structure that can be touched by a human A modulated signal would not by itself constitute a machine-readable storage medium.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. Additional embodiments may not perform all operations, have all features, or possess all advantages described above. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatuses, modules, systems, and machine-readable storage media. Any and all permutations of features from above-described embodiments are the within the scope of the invention.

The invention claimed is:

1. A method comprising:
    determining, by a gateway device, that a mobile device has been added to a local service domain associated with the gateway device;
    receiving, by the gateway device and from a different service domain, data indicating that the mobile device is outside a range of the local service domain and has joined the different service domain; and
    causing, by the gateway device and based on the data, removal of the mobile device from the local service domain.

2. The method of claim 1, wherein the data is received from a network device serving a wide area wireless network.

3. The method of claim 1, wherein the mobile device being added to the local service domain comprises authorizing the mobile device to:
    access one or more services available in the local service domain;
    control one or more services available in the local service domain;
    control one or more end devices in the local service domain;
    access content items from one or more content delivery networks;
    join a communication initiated by an end device in the local service domain; or
    allow an end device to initiate a communication using a communication service associated with the mobile device.

4. The method of claim 1, wherein the local service domain is associated with a premises and provides wireless communication capabilities between the mobile device and a plurality of end devices in the premises.

5. The method of claim 1, wherein the mobile device comprises a smartphone or a wireless mobile device.

6. The method of claim 1, wherein the local service domain provides wireless communication capabilities between a plurality of end devices comprising:
    one or more telecommunications handsets;
    one or more user computing devices;
    one or more set-top boxes; or
    one or more smart televisions.

7. The method of claim 1, wherein the causing removal of the mobile device from the local service domain comprises:
    sending, to the mobile device, a polling message; and
    causing, based on a determination that a reply for the polling message has not been received, removal of the mobile device.

8. The method of claim 1, wherein the causing removal of the mobile device from the local service domain is further based on determination that the mobile device has been inactive for a threshold time period.

9. A system comprising:
    a gateway device; and
    a mobile device added to a local service domain associated with the gateway device;
    wherein the mobile device is configured to:
        determine that the mobile device is outside a range of the local service domain; and
        join a different service domain, and
    wherein the gateway device is configured to:
        receive, after the mobile device has been added to the different service domain and from the different service domain, data indicating that the mobile device is outside the range of the local service domain; and cause, based on receiving the data, removal of the mobile device from the local service domain.

10. The system of claim 9, wherein the local service domain is associated with a premises and provides wireless communication capabilities between the mobile device and a plurality of end devices in the premises, and
wherein the plurality of end devices comprises:
one or more telecommunications handsets;
one or more user computing devices;
one or more set-top boxes; or
one or more smart televisions.

11. The system of claim 9, wherein the gateway is configured to cause removal of the mobile device from the local service domain further based on determination that the mobile device has been inactive for a threshold time period.

12. The system of claim 9, wherein the mobile device being added to the local service domain comprises the mobile device being authorized to:
access one or more services available in the local service domain;
control one or more services available in the local service domain;
control one or more end devices in the local service domain;
access content items from one or more content delivery networks;
join a communication initiated by an end device in the local service domain; or
allow an end device to initiate a communication using a communication service associated with the mobile device.

13. The system of claim 9, wherein the data is received from a network device serving a wide area wireless network.

14. The system of claim 9, wherein the local service domain is associated with a premises and provides wireless communication capabilities between the mobile device and a plurality of end devices in the premises.

15. The system of claim 9, wherein the gateway device is further configured to:
send, to the mobile device, a polling message; and
cause, based on a determination that a reply for the polling message has not been received, removal of the mobile device from the local service domain.

16. A gateway device comprising:
one or more processors; and
memory storing instructions that, when executed by the one or more processors, cause the gateway device to:
determine that a mobile device has been added to a local service domain associated with the gateway device;
receive, from a different service domain, data indicating that the mobile device is outside a range of the local service domain and has joined the different service domain; and
cause, based on the data, removal of the mobile device from the local service domain.

17. The gateway device of claim 16, wherein the data is received from a network device serving a wide area wireless network.

18. The gateway device of claim 16, wherein the instructions, when executed by the one or more processors, cause the gateway device to:
send, to the mobile device, a polling message; and
cause, based on a determination that a reply for the polling message has not been received, removal of the mobile device.

19. The gateway device of claim 16, wherein the instructions, when executed by the one or more processors, cause the gateway device to cause removal of the mobile device from the local service domain further based on determination that the mobile device has been inactive for a threshold time period.

20. The gateway device of claim 16, wherein the local service domain is associated with a premises and provides wireless communication capabilities between the mobile device and a plurality of end devices in the premises.

* * * * *